US012681404B2

(12) United States Patent
Torii et al.

(10) Patent No.: US 12,681,404 B2
(45) Date of Patent: *Jul. 14, 2026

(54) ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Yasuko Torii, Kanagawa (JP); Yosuke Tsurumi, Kanagawa (JP); Soichiro Arai, Kanagawa (JP)

(73) Assignee: FUJIFILM Business Innovation Corp, Tokyo (JP)

( * ) Notice: Subject to any disclaimer, the term of this patent is extended or adjusted under 35 U.S.C. 154(b) by 595 days.

This patent is subject to a terminal disclaimer.

(21) Appl. No.: 18/190,065

(22) Filed: Mar. 24, 2023

(65) Prior Publication Data

US 2024/0118643 A1 Apr. 11, 2024

(30) Foreign Application Priority Data

Sep. 22, 2022 (JP) ................................ 2022-151973

(51) Int. Cl.
*G03G 9/08* (2006.01)
*G03G 9/087* (2006.01)
(Continued)

(52) U.S. Cl.
CPC ....... *G03G 9/09725* (2013.01); *G03G 9/0819* (2013.01); *G03G 9/08711* (2013.01); *G03G 15/0865* (2013.01)

(58) Field of Classification Search
CPC ............ G03G 9/09725; G03G 9/0819; G03G 9/0711; G03G 15/0865
See application file for complete search history.

(56) References Cited

U.S. PATENT DOCUMENTS 5,426,489 A * 6/1995 Haneda .............. G03G 15/0241 399/175
5,486,443 A 1/1996 Grande et al.
(Continued)

FOREIGN PATENT DOCUMENTS

JP H08123073 5/1996
JP H08123073 A * 5/1996
(Continued)

OTHER PUBLICATIONS

JP-2004220005-A Translation (Year: 2025).*
(Continued)

*Primary Examiner* — Mark F. Huff
*Assistant Examiner* — Charles Collins Sullivan, IV
(74) *Attorney, Agent, or Firm* — JCIPRNET

(57) ABSTRACT

An electrostatic charge image developing toner contains toner particles that contain a binder resin and resin particles and silica particles (A) that are externally added to the toner particles and contain a nitrogen element-containing compound containing a molybdenum element, in which a ratio $N_{Mo}/N_{Si}$ of Net intensity $N_{Mo}$ of the molybdenum element measured by X-ray fluorescence analysis to Net intensity $N_{Si}$ of a silicon element measured by X-ray fluorescence analysis is 0.035 or more and 0.45 or less.

16 Claims, 2 Drawing Sheets

(51) Int. Cl.
*G03G 9/097* (2006.01)
*G03G 15/08* (2006.01)

(56) References Cited

U.S. PATENT DOCUMENTS

| | | | | |
|---|---|---|---|---|
| 8,741,523 | B2 | 6/2014 | Hori et al. | |
| 8,771,915 | B2 | 7/2014 | Ueda et al. | |
| 10,698,328 | B2 | 6/2020 | Kawamura et al. | |
| 11,372,363 | B2 | 6/2022 | Inoue et al. | |
| 2005/0153224 | A1* | 7/2005 | Lee | G03G 9/09725 430/108.1 |
| 2006/0204877 | A1* | 9/2006 | Kuroyama | G03G 9/09725 430/108.7 |
| 2010/0227265 | A1 | 9/2010 | Matsumoto et al. | |
| 2018/0275543 | A1* | 9/2018 | Yoshihara | G03G 9/0827 |
| 2021/0003931 | A1 | 1/2021 | Kubo et al. | |
| 2021/0253845 | A1 | 8/2021 | Nakamura et al. | |

FOREIGN PATENT DOCUMENTS

| | | | |
|---|---|---|---|
| JP | 2004220005 | A * | 8/2004 |
| JP | 2011237792 | | 11/2011 |
| JP | 2011237793 | | 11/2011 |
| JP | 2013160886 | | 8/2013 |
| JP | 2014178496 | | 9/2014 |
| JP | 2016133669 | A * | 7/2016 |
| JP | 2019144368 | | 8/2019 |
| JP | 2020042121 | | 3/2020 |
| JP | 2020042122 | | 3/2020 |
| JP | 2020106685 | | 7/2020 |
| JP | 2021092604 | | 6/2021 |
| JP | 2021127431 | | 9/2021 |
| JP | 2021151944 | | 9/2021 |

OTHER PUBLICATIONS

JP-H08123073-A Translation (Year: 2025).*
JP-2016133669-A Translation (Year: 2025).*
Aerosil, Aerosil R 972, Jul. 2009, p. 1, https://www.stobec.com/DATA/PRODUIT/1342~v~data_8056.pdf (Year: 2009).*
"Office Action of Europe Counterpart Application", issued on Feb. 5, 2025, p. 1-p. 8.
"Search Report of Europe Counterpart Application", issued on Feb. 19, 2024, pp. 1-7.

* cited by examiner

ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2022-151973 filed Sep. 22, 2022.

BACKGROUND

(i) Technical Field

The present disclosure relates to an electrostatic charge image developing toner, an electrostatic charge image developer, a toner cartridge, a process cartridge, an image forming apparatus, and an image forming method.

(ii) Related Art

JP2020-042122A discloses an electrostatic latent image developing toner that contains toner particles containing a binder resin, in which the binder resin contains an amorphous resin and a crystalline resin, and in a case where strain dispersion of dynamic viscoelasticity is measured under the conditions of a temperature of 130° C., a frequency of 1 Hz, and a strain amplitude of 1.0% to 500%, a stress integral value of a stress-strain curve at a strain amplitude of 100% is more than 0 Pa and 350,000 Pa or less, and a slope of a major axis is more than 22° and less than 90°.

JP2020-042121A discloses an electrostatic latent image developing toner that contains toner particles containing a binder resin, in which the binder resin contains an amorphous vinyl resin and a crystalline resin, and in a case where strain dispersion of dynamic viscoelasticity is measured under the conditions of a temperature of 130° C., a frequency of 1 Hz, and a strain amplitude of 1.0% to 500%, a stress integral value of a stress-strain curve at a strain amplitude of 100% is more than 0 Pa and 350,000 Pa or less, and a slope of a major axis is 0° or more and less than 10°.

JP2020-106685A discloses an electrostatic charge image developing toner that contains a binder resin and a release agent, in which the binder resin contains a crystalline resin, and a storage elastic modulus measured at a frequency of 1 Hz, 150° C., and a strain varied in a range of 0.01% to 1000% satisfies a specific relationship.

JP2019-144368A discloses an electrostatic charge image developing toner that contains toner base particles containing a binder resin and a release agent, and an external additive, in which the binder resin contains a crystalline resin, and a peak top value of a loss tangent of the electrostatic charge image developing toner measured under the conditions of a frequency of 1 Hz and a heating rate of 6° C./min at a temperature raised to 100° C. from 25° C. and a peak top value of a loss tangent of the electrostatic charge image developing toner measured under the conditions of a frequency of 1 Hz and a heating rate of 3° C./min at a temperature raised to 100° C. from 25° C. satisfy a specific relationship.

JP2013-160886A discloses an electrostatic charge image developing toner that contains a non-crystalline resin, a crystalline resin, a colorant, and a release agent, in which a rate of change in storage elastic modulus G' is more than 50% and less than 86%, a rate of change in loss elastic modulus G" is more than 50%, and a storage elastic modulus G' of the toner in a range of 1% to 50% strain at a temperature of 150° C. is $5\times10^2$ to $3.5\times10^3$ Pa·s.

JP2011-237793A and JP2011-237792A disclose an electrostatic charge image developing toner consisting of toner particles containing a binder resin, in which the electrostatic charge image developing toner has a specific structure in an elastic image by an atomic force microscope of a cross section of the toner particles.

JP2021-151944A discloses silica particles containing a quaternary ammonium salt, in which in a case where $F_{BEFORE}$ represents a maximum frequency of pores having a diameter of 2 nm or less determined from a pore size distribution curve obtained by a nitrogen gas adsorption method performed on the silica particles before washing and F AFTER represents a maximum frequency of pores having a diameter of 2 nm or less determined from a pore size distribution curve obtained by a nitrogen gas adsorption method performed on the silica particles after washing, a ratio $F_{BEFORE}/F_{AFTER}$ is 0.90 or more and 1.10 or less, and in a case where $F_{SINTERING}$ represents a maximum frequency of pores having a diameter of 2 nm or less determined from a pore size distribution curve obtained by a nitrogen gas adsorption method performed on the silica particles after the silica particles before washing is baked at 600° C., a ratio $F_{SINTERING}/F_{BEFORE}$ is 5 or more and 20 or less.

JP1996-123073A discloses an electrostatic charge image developing toner consisting of toner particles and an additive, in which the additive contains hydrophobic silica and silica treated to carry positive charge, and the amount of the hydrophobic silica added to the toner, the BET specific surface area of the hydrophobic silica, the amount of the silica treated to carry positive charge added to the toner, the BET specific surface area of the silica treated to carry positive charge, and the volume-average particle size of the toner particles satisfy Formula (1).

SUMMARY

Aspects of non-limiting embodiments of the present disclosure relate to an electrostatic charge image developing toner that has excellent fluidity, compared to an electrostatic charge image developing toner that contains silica particles externally added to toner particles containing a binder resin and resin particles and having a nitrogen element-containing compound containing a molybdenum element and in which a ratio $N_{Mo}/N_{Si}$ of Net intensity $N_{Mo}$ of the molybdenum element measured by X-ray fluorescence analysis to Net intensity $N_{Si}$ of a silicon element measured by X-ray fluorescence analysis is less than 0.035 or more than 0.45.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above-described objects include the following aspects.

According to an aspect of the present disclosure, there is provided an electrostatic charge image developing toner containing toner particles that contain a binder resin and resin particles, and silica particles (A) that are externally added to the toner particles and contain a nitrogen element-containing compound containing a molybdenum element, in which a ratio $N_{Mo}/N_{Si}$ of Net intensity $N_{Mo}$ of the molybdenum element measured by X-ray fluorescence analysis to Net intensity $N_{Si}$ of a silicon element measured by X-ray fluorescence analysis is 0.035 or more and 0.45 or less.

BRIEF DESCRIPTION OF THE DRAWINGS

Exemplary embodiment(s) of the present invention will be described in detail based on the following figures, wherein.

DETAILED DESCRIPTION

Figure 1:
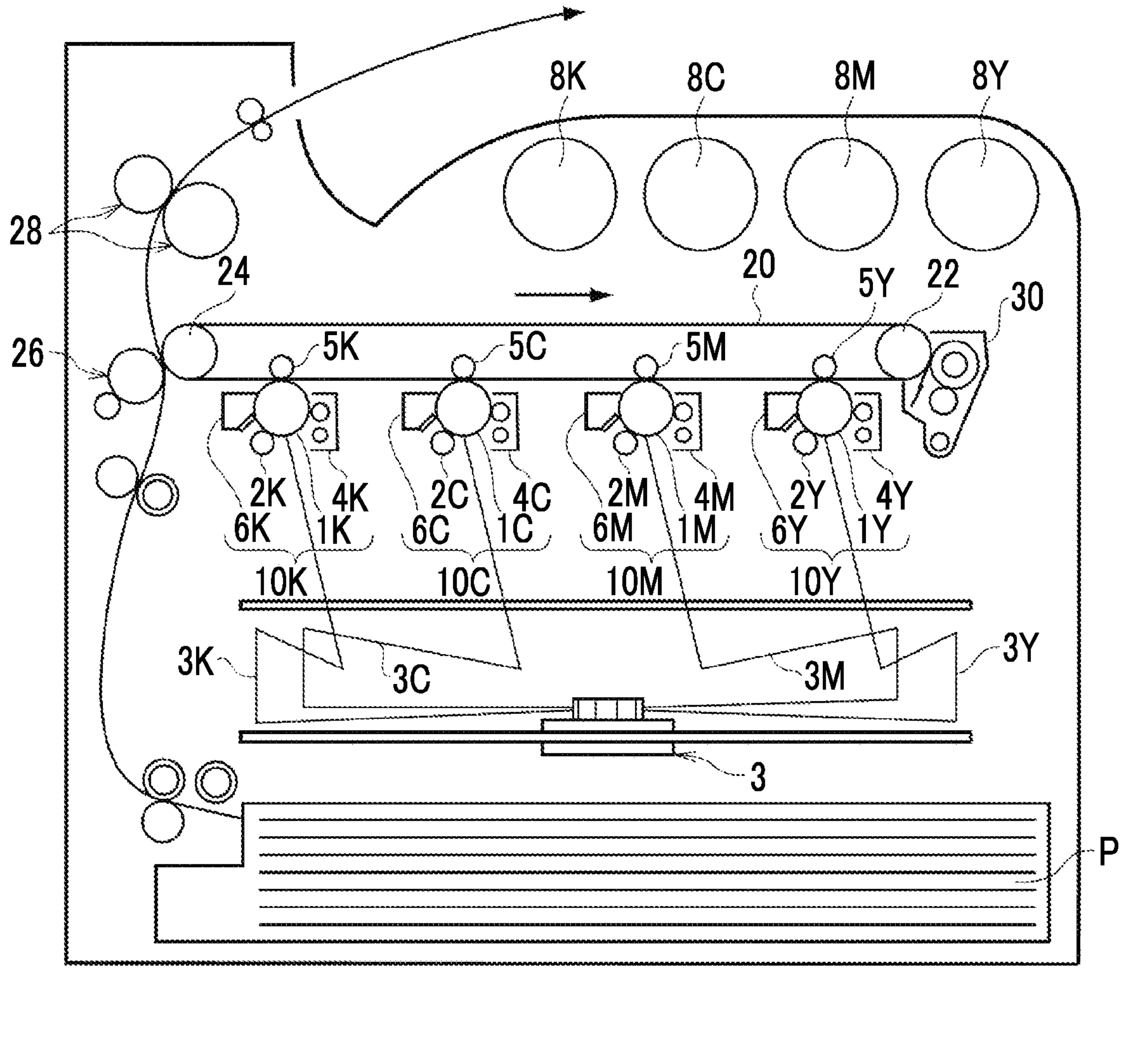
FIG. 1 is a view schematically showing the configuration of an example of an image forming apparatus according to the present exemplary embodiment.

The exemplary embodiments of the present disclosure will be described below. The following descriptions and examples merely illustrate the exemplary embodiments, and do not limit the scope of the exemplary embodiments.

In the present disclosure, a numerical range described using "to" represents a range including numerical values listed before and after "to" as the minimum value and the maximum value respectively.

Regarding the numerical ranges described in stages in the present disclosure, the upper limit or lower limit of a numerical range may be replaced with the upper limit or lower limit of another numerical range described in stages. Furthermore, in the present disclosure, the upper limit or lower limit of a numerical range may be replaced with values described in examples.

In the present disclosure, the term "step" includes not only an independent step but a step that is not clearly distinguished from other steps as long as the purpose of the step is achieved.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of corresponding substances. In a case where the amount of each component in a composition is mentioned in the present disclosure, and there are two or more kinds of substances corresponding to each component in the composition, unless otherwise specified, the amount of each component means the total amount of two or more kinds of the substances present in the composition.

In the present disclosure, each component may include two or more kinds of corresponding particles. In a case where there are two or more kinds of particles corresponding to each component in a composition, unless otherwise specified, the particle size of each component means a value for a mixture of two or more kinds of the particles present in the composition.

In the present disclosure, "(meth)acrylic" is an expression including both acrylic and methacrylic, and "(meth)acrylate" is an expression including both acrylate and methacrylate.

In the present disclosure, an "electrostatic charge image developing toner" is also referred to as "toner", an "electrostatic charge image developer" is also referred to as a "developer", and an "electrostatic charge image developing carrier" is also referred to as "carrier".

Electrostatic Charge Image Developing Toner

The toner according to the present exemplary embodiment includes toner particles containing a binder resin and resin particles and silica particles (A) externally added to the toner particles. The silica particles (A) are silica particles that contain a nitrogen element-containing compound containing a molybdenum element, in which a ratio $N_{Mo}/N_{Si}$ of Net intensity $N_{Mo}$ of the molybdenum element measured by X-ray fluorescence analysis to Net intensity $N_{Si}$ of a silicon element measured by X-ray fluorescence analysis is 0.035 or more and 0.45 or less.

The toner according to the present exemplary embodiment has excellent fluidity. The mechanism is presumed as follows.

In the related art, as a measure for improving fluidity of a toner, there is a measure for coating a surface of toner particles with an external additive having a relatively small particle size. In this case, in a case where the toner particles contain resin particles, since embedding of the external additive in the toner particles is suppressed, the effect of the external additive can be easily obtained (that is, the fluidity of the toner is improved). In a case where thermal characteristics of the resin particles contained in the toner particles are set to characteristics of melting by heating and pressurizing at the time of image fixing, the image fixing may not be hindered.

However, in a case where a toner that contains toner particles containing resin particles appropriately used for image fixing is in a high-temperature and high-humidity environment, and a strong mechanical stress is applied during toner transporting, the fluidity of the toner may decrease. In a case where the fluidity of the toner decreases, supply of the toner from a toner cartridge to a developing device is delayed, and toner concentration of the developer in the developing device decreases. It is presumed that this is because the surface of the toner particles softens in a high-temperature and high-humidity environment and a part of the external additive is embedded in the toner particles, so that the remaining external additive that has not been embedded moves due to the subsequent mechanical stress and gathers in concave portions of the toner, resulting in less external additive that functions effectively.

Therefore, in order to maintain the fluidity of the toner, the toner according to the present exemplary embodiment contains, as an external additive, the silica particles (A) that have a nitrogen element-containing compound containing a molybdenum element and in which the ratio $N_{Mo}/N_{Si}$ is 0.035 or more and 0.45 or less.

Since the silica particles (A) have a slightly positive charge relative to negative charge of the toner particles due to the ratio $N_{Mo}/N_{Si}$ of 0.035 or more and 0.45 or less, the silica particles (A) show electrostatic fixing to the toner particles. On the other hand, in the toner particles containing the resin particles, the surface of the toner particles is not in a uniform charging state due to a difference in charging characteristics by SP value difference between the resin particles and the binder resin, and a minute charging difference is distributed on the surface of the toner particles. That is, an island structure that has a strong negative charge and is formed by the resin particles with a relatively small SP value is distributed in a sea structure that has a weak negative charge and is formed by the binder resin with a relatively large SP value. Therefore, the silica particles (A) are efficiently fixed electrostatically to the surface of the toner particles containing the resin particles. Since the silica particles (A) are present on the surface of the toner particles with an electrostatic balance, the silica particles (A) are less likely to be embedded in the toner particles even in a high-temperature and high-humidity environment, and less likely to move even under strong mechanical stress.

Therefore, it is presumed that the toner according to the present exemplary embodiment is excellent in fluidity of the toner even in a case where the toner is in a high-temperature and high-humidity environment and a strong mechanical stress is applied during toner transporting.

In the present exemplary embodiment, the ratio $N_{Mo}/N_{Si}$ of the silica particles (A) is 0.035 or more and 0.45 or less.

In a case where the ratio $N_{Mo}/N_{Si}$ is less than 0.035, affinity between the silica particles (A) and the resin particles is too high, the silica particles (A) tend to electrostatically gather in the vicinity of the resin particles, and distribution of the silica particles (A) on the surface of the toner particles tends to be uneven. From the viewpoint of suppressing the problem, the ratio $N_{Mo}/N_{Si}$ is 0.035 or more, for example, preferably 0.05 or more, more preferably 0.07 or more, and even more preferably 0.10 or more.

In a case where the ratio $N_{Mo}/N_{Si}$ is more than 0.45, the affinity between the silica particles (A) and the resin particles is low, and the silica particles (A) are unevenly distributed in concave portions on the surface of the toner particles due to mechanical stress. From the viewpoint of suppressing the problem, the ratio $N_{Mo}/N_{Si}$ is 0.45 or less, for example, preferably 0.40 or less, more preferably 0.35 or less, and even more preferably 0.30 or less.

Hereinafter, components, structure, and manufacturing method of the toner according to the present exemplary embodiment will be described in detail.

Toner Particles

The toner particles contain at least a binder resin and resin particles. The toner particles may contain a colorant, a release agent, and other additives. The toner particles are, for example, preferably negatively charged.

Binder Resin

Examples of the binder resin include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these binder resins may be used alone, or two or more kinds of these binder resins may be used in combination.

For example, the binder resin preferably contains a polyester resin.

In a case where the binder resin is a polyester resin and the resin particles contained in the toner particles are styrene (meth)acrylic resin particles, for example, a difference between an SP value of the resin particles (that is, the styrene (meth)acrylic resin particles) and an SP value of the binder resin is easily controlled within a preferred numerical range. As a result, the resin particles (that is, the styrene (meth) acrylic resin particles) are easily dispersed in the toner particles.

For example, the binder resin preferably contains a polyester resin.

In a case where the binder resin is a polyester resin, a charging difference between the toner particles and the resin particles is appropriate, and the silica particles (A) are electrostatically fixed to the surface of the toner particles easily. As a result, the effect of suppressing the excessive liberation of the fatty acid metal salt through the silica particles (A) can be stably obtained.

The binder resin preferably contains, for example, a polyester resin having an aliphatic dicarboxylic acid unit (that is a constitutional unit derived from an aliphatic dicarboxylic acid).

In a case where the binder resin contains a polyester resin having an aliphatic dicarboxylic acid unit, as compared to a case where the binder resin does not contain a polyester resin having an aliphatic dicarboxylic acid unit and contains a polyester resin having an aromatic dicarboxylic acid unit, due to increased flexibility of the binder resin, it is possible to disperse the resin particles in a more uniform state inside the toner particles, and it is possible to further reduce a change width of a loss tangent tan δ, which will be described later.

The binder resin preferably contains, for example, an amorphous polyester resin having an aliphatic dicarboxylic acid unit and a crystalline polyester resin having an aliphatic dicarboxylic acid unit. In a case where the binder resin contains the amorphous polyester resin and the crystalline polyester resin, since both resins have an aliphatic dicarboxylic acid unit, the resin particles can be more uniformly dispersed in the toner particles.

As the aliphatic dicarboxylic acid, for example, a saturated aliphatic dicarboxylic acid represented by General Formula "$HOOC—(CH_2)_n—COOH$" can be preferably used. n in the general formula is, for example, preferably an integer of 4 or more and 20 or less, and more preferably an integer of 4 or more and 12 or less.

For example, it is preferable that the binder resin contains a crystalline resin and an amorphous resin.

The crystalline resin refers to a resin that exhibits a clear endothermic peak instead of showing a stepwise change in heat absorption in differential scanning calorimetry (DSC). The amorphous resin refers to a resin that does not exhibit a clear endothermic peak but exhibits a stepwise change in heat absorption in differential scanning calorimetry (DSC).

Specifically, the crystalline resin refers to a resin that has a half-width of an endothermic peak of 10° C. or less in a case where the resin is measured at a heating rate of 10° C./min, and the amorphous resin refers to a resin that has a half-width of more than 10° C. or a resin for which a clear endothermic peak is not observed.

Crystalline Resin

Examples of the crystalline resin include a crystalline polyester resin, and a crystalline vinyl resin (such as a polyalkylene resin and a long-chain alkyl (meth)acrylate resin). From the viewpoint of mechanical strength and low temperature fixability of the toner, for example, a crystalline polyester resin is preferable.

Crystalline Polyester Resin

Examples of the crystalline polyester resin include a polycondensate of polyvalent carboxylic acid and polyhydric alcohol. As the crystalline polyester resin, a commercially available product may be used, or a synthetic resin may be used.

From the viewpoint that the crystalline polyester resin easily forms a crystal structure, the crystalline polyester resin is, for example, preferably a polycondensate that is not formed of a polymerizable monomer having an aromatic ring but is formed of a linear aliphatic polymerizable monomer.

Examples of the polyvalent carboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (such as dibasic acids such as phthalic acid, isophthalic acid, terephthalic acid, and naphthalene-2,6-dicarboxylic acid), anhydrides of these dicarboxylic acids, and lower alkyl esters (for example, having 1 or more and 5 or less carbon atoms) of these dicarboxylic acids.

As the polyvalent carboxylic acid, a carboxylic acid having a valency of 3 or more, that can form a crosslinked structure or a branched structure, may be used in combination with the dicarboxylic acid. Examples of the trivalent carboxylic acids include aromatic carboxylic acid (for example, 1,2,3-benzenetricarboxylic acid, 1,2,4-benzenetricarboxylic acid, 1,2,4-naphthalenetricarboxylic acid, and the like), anhydrides of these aromatic carboxylic acids, and lower alkyl esters (for example, having 1 or more and 5 or less carbon atoms) of these aromatic carboxylic acids.

As the polyvalent carboxylic acid, a dicarboxylic acid having a sulfonic acid group or a dicarboxylic acid having an ethylenically double bond may be used in combination with the dicarboxylic acid.

One kind of polyvalent carboxylic acid may be used alone, or two or more kinds of polyvalent carboxylic acids may be used in combination.

Examples of the polyhydric alcohol include an aliphatic diol (for example, a linear aliphatic diol having 7 or more and 20 or less carbon atoms in a main chain portion). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among the aliphatic diols, for example, 1,8-octanediol, 1,9-nonanediol, or 1,10-decanediol is preferable.

As the polyhydric alcohol, an alcohol having a valency of 3 or more, that can form a crosslinked structure or a branched structure, may be used in combination with the diol. Examples of the alcohol having a valency of 3 or more include glycerin, trimethylolethane, and trimethylolpropane, pentaerythritol.

One kind of polyhydric alcohol may be used alone, or two or more kinds of polyhydric alcohols may be used in combination.

The polyhydric alcohol preferably contains, for example, an aliphatic diol. A proportion of the aliphatic diol to the polyhydric alcohol is, for example, preferably 80% by mole or more, and more preferably 90% by mole or more.

The melting temperature of the crystalline polyester resin is, for example, preferably 50° C. or higher and 100° C. or lower, more preferably 55° C. or higher and 90° C. or lower, and even more preferably 60° C. or higher and 85° C. or lower.

The melting temperature of the crystalline polyester resin is determined from a DSC curve obtained by differential scanning calorimetry (DSC) by "peak melting temperature" described in the method for determining the melting temperature in JIS K7121-1987, "Testing methods for transition temperatures of plastics".

The weight-average molecular weight (Mw) of the crystalline polyester resin is, for example, preferably 6,000 or more and 35,000 or less.

In a case where the toner particles contain a crystalline resin, a proportion of the crystalline resin to the binder resin is, for example, preferably 4% by mass or more and 50% by mass or less, more preferably 6% by mass or more and 30% by mass or less, and even more preferably 8% by mass or more and 20% by mass or less.

In a case where the toner particles contain a crystalline polyester resin, a proportion of the crystalline polyester resin to the binder resin is, for example, preferably 4% by mass or more and 50% by mass or less, more preferably 6% by mass or more and 30% by mass or less, and even more preferably 8% by mass or more and 20% by mass or less.

In a case where the mass proportion of the crystalline resin or the crystalline polyester resin to the binder resin is within the above-described range, compared to a case of being less than or more than the above-described range, (1) the embedding of the external additive in the toner particles is suppressed, (2) both storage stability and good fixability of the toner are achieved, and (3) a difference in glossiness of the fixed image due to fixing conditions (difference in temperature and pressure) is suppressed.

Amorphous Resin

Examples of the amorphous resin include an amorphous polyester resin, an amorphous vinyl resin (such as a styrene acrylic resin), an epoxy resin, a polycarbonate resin, and a polyurethane resin. Among the amorphous resins, for example, an amorphous polyester resin or an amorphous vinyl resin (particularly, a styrene acrylic resin) is preferable, and an amorphous polyester resin is more preferable.

Amorphous Polyester Resin

Examples of the amorphous polyester resin include a polycondensate of a polyvalent carboxylic acid and a polyhydric alcohol. As the amorphous polyester resin, a commercially available product may be used, or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more, that can form a crosslinked structure or a branched structure, may be used in combination with a dicarboxylic acid. Examples of the carboxylic acid having a valency of 3 or more include trimellitic acid, pyromellitic acid, anhydrides of these acids, and lower alkyl esters (for example, having 1 or more and 5 or less carbon atoms) of these acids.

One kind of polyvalent carboxylic acid may be used alone, or two or more kinds of polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among the polyhydric alcohols, for example, an aromatic diol or an alicyclic diol is preferable, and an aromatic diol is more preferable.

As the polyhydric alcohol, a polyhydric alcohol having a valency of 3 or more, that can form a crosslinked structure or a branched structure, may be used in combination with the diol. Examples of the polyhydric alcohol having three or more hydroxyl groups include glycerin, trimethylolpropane, and pentaerythritol.

One kind of polyhydric alcohol may be used alone, or two or more kinds of polyhydric alcohols may be used in combination.

The glass transition temperature (Tg) of the amorphous polyester resin is, for example, preferably 50° C. or higher and 80° C. or lower, and more preferably 50° C. or higher and 65° C. or lower.

The glass transition temperature of the amorphous polyester resin is determined from a DSC curve obtained by differential scanning calorimetry (DSC). More specifically, the glass transition temperature is determined by "extrapolated glass transition onset temperature" described in the method for determining a glass transition temperature in JIS K 7121-1987, "Testing methods for transition temperatures of plastics".

The weight-average molecular weight (Mw) of the amorphous polyester resin is, for example, preferably 5,000 or more and 1,000,000 or less, and more preferably 7,000 or more and 500,000 or less.

The number-average molecular weight (Mn) of the amorphous polyester resin is, for example, preferably 2,000 or more and 100,000 or less.

The molecular weight distribution Mw/Mn of the amorphous polyester resin is, for example, preferably 1.5 or more and 100 or less, and more preferably 2 or more and 60 or less.

The weight-average molecular weight and the number-average molecular weight of the amorphous polyester resin are measured by gel permeation chromatography (GPC). By GPC, the molecular weight is measured using GPC•HLC-8120GPC manufactured by Tosoh Corporation as a measurement device, TSKgel Super HM-M (15 cm) manufactured by Tosoh Corporation as a column, and tetrahydrofuran as a solvent. The weight-average molecular weight and the number-average molecular weight are calculated using a molecular weight calibration curve plotted using a monodisperse polystyrene standard sample from the measurement results.

The amorphous polyester resin is obtained by a known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is distilled off. In a case where a monomer with poor compatibility takes part in the reaction, for example, the monomer with poor compatibility may be condensed in advance with an acid or an alcohol that is to be polycondensed with the monomer, and then polycondensed with the main component.

The content of the binder resin with respect to the total amount of the toner particles is, for example, preferably 40% by mass or more and 95% by mass or less, more preferably 50% by mass or more and 90% by mass or less, and even more preferably 60% by mass or more and 85% by mass or less.

Resin Particles

For example, it is preferable that the resin particles are evenly contained in both a region close to the surface of the toner particles (hereinafter, also referred to as "surface region") and a region close to the center of the toner particles (hereinafter, also referred to as "central region"). Since the resin particles are contained in both the surface region and the central region, as compared to a case where the resin particles are contained in only one of the surface region or the central region, (1) the embedding of the external additive in the toner particles is suppressed, (2) both storage stability and good fixability of the toner are achieved, and (3) a difference in glossiness of the fixed image due to fixing conditions (difference in temperature and pressure) is suppressed.

The average particle size of the resin particles (referred to as "average particle size Dp" in the present disclosure) is, for example, preferably 60 nm or more and 300 nm or less, more preferably 100 nm or more and 200 nm or less, and even more preferably 130 nm or more and 170 nm or less.

In a case where the average particle size Dp is within the above-described range, compared to a case of being less than or more than the above-described range, (1) the embedding of the external additive in the toner particles is suppressed, (2) both storage stability and good fixability of the toner are achieved, and (3) a difference in glossiness of the fixed image due to fixing conditions (difference in temperature and pressure) is suppressed.

The average particle size of the resin particles is a value measured using a transmission electron microscope (TEM). As the transmission electron microscope, for example, JEM-1010 manufactured by JEOL Ltd. DATUM Solution Business Operations can be used.

The toner particles are embedded in an epoxy resin, and a section sample having a size of about 0.3 μm is produced by a microtome. A cross section of the toner particles is imaged with a transmission electron microscope at a magnification of 4,500. 1000 resin particles are randomly selected from the TEM image, the equivalent circular diameter (nm) of each particle is obtained, and an arithmetic mean of the equivalent circular diameters is defined as the average particle size (nm).

In a case where the toner particles are manufactured by an aggregation and coalescence method, the average particle size of the resin particles in the toner particles can be controlled by an average particle size of the resin particles contained in a resin particle dispersion. The average particle size of the resin particles in the toner particles is substantially equal to the average particle size of the resin particles contained in the resin particle dispersion. The average particle size of the resin particles contained in the resin particle dispersion is measured by a laser diffraction type particle size distribution analyzer (for example, LA-700 manufactured by HORIBA, Ltd.).

Examples of the resin configuring the resin particles include polyolefin (such as polyethylene and polypropylene), a styrene-based resin (such as polystyrene and α-polymethylstyrene), a (meth)acrylic resin (such as polymethyl methacrylate and polyacrylonitrile), a styrene (meth) acrylic resin, an epoxy resin, a polyurethane resin, a polyurea resin, a polyamide resin, a polycarbonate resin, a polyether resin, a polyester resin, and copolymer resins of these compounds. One kind of each of the resins may be used alone, or two or more kinds of the resins may be used in combination.

As the resin configuring the resin particles, for example, a vinyl-based resin such as polyolefin, a styrene-based resin, a (meth)acrylic resin, and a styrene (meth)acrylic resin is preferable, and a styrene (meth)acrylic resin is more preferable. That is, the resin particles are, for example, preferably vinyl-based resin particles, and more preferably styrene (meth)acrylic resin particles.

From the viewpoint of moderately hardening the surface of the toner particles for the purpose of suppressing the embedding of the external additive, the resin particles are, for example, preferably crosslinked resin particles. The "crosslinked resin particles" are resin particles containing a resin having a crosslinked structure between atoms. The crosslinked resin is, for example, a crosslinked product of the above-described resin.

Examples of the crosslinked resin particles include crosslinked resin particles crosslinked by an ionic bond (ionically crosslinked resin particles), and crosslinked resin particles crosslinked by a covalent bond (covalently crosslinked resin particles). For example, crosslinked resin particles crosslinked by a covalent bond are preferable.

In a case where the binder resin contains a polyester resin, as the crosslinked resin particles, from the viewpoint of distributing a moderately minute charging difference on the surface of the toner particles, for example, crosslinked vinyl-based resin particles configured with a crosslinked vinyl-based resin are preferable. As the crosslinked vinyl-based resin, for example, a crosslinked styrene (meth)acrylic resin is preferable. That is, as the crosslinked resin particles, for example, crosslinked styrene (meth)acrylic resin particles are more preferable. By configuring the resin particles with a crosslinked styrene (meth)acrylic resin, resin particles (S) described later are easily realized.

Examples of the styrene (meth)acrylic resin include a resin obtained by polymerizing the following styrene-based monomer and (meth)acrylic acid-based monomer by radical polymerization.

Examples of the styrene-based monomer include styrene, α-methylstyrene, vinylnaphthalene; alkyl-substituted styrene such as 2-methylstyrene, 3-methylstyrene, 4-methylstyrene, 2-ethylstyrene, 3-ethylstyrene, and 4-ethylstyrene; halogen-substituted styrene such as 2-chlorostyrene, 3-chlorostyrene, and 4-chlorostyrene; and fluorine-substituted styrene such as 4-fluorostyrene and 2,5-difluorostyrene. As the styrene-based monomer, for example, styrene or α-methylstyrene is preferable. The styrene-based monomer may be used alone or in combination of two or more kinds thereof.

Examples of the (meth)acrylic acid-based monomer include (meth)acrylic acid, methyl (meth)acrylate, ethyl (meth)acrylate, n-propyl (meth)acrylate, n-butyl (meth) acrylate, n-pentyl (meth)acrylate, n-hexyl (meth)acrylate, n-heptyl (meth)acrylate, n-octyl (meth)acrylate, n-decyl (meth)acrylate, n-dodecyl (meth)acrylate, n-lauryl (meth) acrylate, n-tetradecyl (meth)acrylate, n-hexadecyl (meth) acrylate, n-octadecyl (meth)acrylate, isopropyl (meth)acrylate, isobutyl (meth)acrylate, t-butyl (meth)acrylate, isopentyl (meth)acrylate, neopentyl (meth)acrylate, isohexyl (meth)acrylate, isoheptyl (meth)acrylate, isooctyl (meth) acrylate, 2-ethylhexyl (meth)acrylate, phenyl (meth)acrylate, biphenyl (meth)acrylate, diphenylethyl (meth)acrylate, t-butylphenyl (meth)acrylate, terphenyl (meth)acrylate, cyclohexyl (meth)acrylate, t-butyl cyclohexyl (meth)acrylate, dimethylaminoethyl (meth)acrylate, diethylaminoethyl (meth)acrylate, methoxyethyl (meth)acrylate, 2-hydroxyethyl (meth)acrylate, 2-carboxyethyl (meth)acrylate, 2-carboxypropyl (meth)acrylate, 3-carboxypropyl (meth)acrylate, 4-carboxybutyl (meth)acrylate, (meth)acrylonitrile, and (meth)acrylamide. The (meth)acrylic acid-based monomer may be used alone or in combination of two or more kinds thereof.

As the (meth)acrylic acid-based monomer, for example, a combination of a lower alkyl ester (meth)acrylate and a carboxy lower alkyl ester (meth)acrylate is preferable.

The "lower alkyl" in the lower alkyl ester (meth)acrylate means having 1 or more and 5 or less carbon atoms, and the "lower alkyl" has, for example, preferably 2 or more and 4 or less carbon atoms, and more preferably 3 or 4 carbon atoms. Examples of the lower alkyl ester (meth)acrylate include methyl (meth)acrylate, ethyl (meth)acrylate, n-propyl (meth)acrylate, n-butyl (meth)acrylate, n-pentyl (meth) acrylate, isopropyl (meth)acrylate, isobutyl (meth)acrylate, t-butyl (meth)acrylate, isopentyl (meth)acrylate, and neopentyl (meth)acrylate. Among these, for example, ethyl (meth)acrylate, n-propyl (meth)acrylate, or n-butyl (meth) acrylate is preferable, and n-butyl (meth)acrylate is particularly preferable.

The "lower alkyl" in the carboxy lower alkyl ester (meth) acrylate means 1 or more and 5 or less carbon atoms, and the "lower alkyl" has, for example, preferably 2 or more and 4 or less carbon atoms, and more preferably 2 or 3 carbon atoms. Examples of the carboxy lower alkyl ester (meth) acrylate include 2-carboxyethyl (meth)acrylate, 2-carboxypropyl (meth)acrylate, 3-carboxypropyl (meth)acrylate, 4-carboxybutyl (meth)acrylate, and 5-carboxypentyl (meth) acrylate. Among these, for example, 2-carboxyethyl (meth) acrylate, 2-carboxypropyl (meth)acrylate, or 3-carboxypropyl (meth)acrylate is preferable, and 2-carboxyethyl (meth) acrylate is particularly preferable.

As the (meth)acrylic acid-based monomer, for example, a combination of n-butyl (meth)acrylate and 2-carboxyethyl (meth)acrylate is particularly preferable.

A mass proportion of the carboxy lower alkyl ester (meth)acrylate to the total amount of the lower alkyl ester (meth)acrylate and the carboxy lower alkyl ester (meth) acrylate is, for example, preferably 0.1% by mass or more and 2.0% by mass or less, more preferably 0.2% by mass or more and 1.0% by mass or less, and even more preferably 0.4% by mass or more and 0.7% by mass or less.

The polymerization ratio of the styrene-based monomer and the (meth)acrylic acid-based monomer (based on mass, styrene-based monomer:(meth)acrylic acid-based monomer) is, for example, preferably 20:80 to 80:20, more preferably 30:70 to 70:30, and even more preferably 40:60 to 60:40.

Examples of a crosslinking agent for crosslinking the resin include aromatic polyvinyl compounds such as divinylbenzene and divinylnaphthalene; polyvinyl esters of aromatic polyvalent carboxylic acids, such as divinyl phthalate, divinyl isophthalate, divinyl terephthalate, divinyl homophthalate, divinyl trimesate, trivinyl trimesate, divinyl naphthalenedicarboxylate, and divinyl biphenylcarboxylate; divinyl esters of nitrogen-containing aromatic compounds, such as divinyl pyridine dicarboxylate; vinyl esters of unsaturated heterocyclic compound carboxylic acid, such as vinyl pyromucate, vinyl furan carboxylate, vinyl pyrrole-2-carboxylate, and vinyl thiophene carboxylate; (meth)acrylic acid esters of linear polyhydric alcohols, such as butanediol di(meth)acrylate, hexanediol di(meth)acrylate, octanediol di(meth)acrylate, nonanediol di(meth)acrylate, decanediol di(meth)acrylate, and dodecanediol di(meth)acrylate; (meth) acrylic acid esters of branched substituted polyhydric alcohols, such as neopentylglycol dimethacrylate and 2-hydroxy-1,3-diacryloxypropane; and polyvinyl esters of polyvalent carboxylic acids, such as polyethylene glycol di(meth)acrylate, polypropylene polyethylene glycol di(meth)acrylates, divinyl succinate, divinyl fumarate, vinyl maleate, divinyl maleate, divinyl diglycolate, vinyl itaconate, divinyl itaconate, divinyl acetone dicarboxylate, divinyl glutarate, 3,3'-divinylthiodipropionate, divinyl trans-aconitate, trivinyl trans-aconitate, divinyl adipate, divinyl pimelate, divinyl suberate, divinyl azelate, divinyl sebacate, divinyl dodecanedioate, and divinyl brassylate. One kind of crosslinking agent may be used alone, or two or more kinds of crosslinking agents may be used in combination.

As the crosslinking agent for crosslinking the resin, for example, a bifunctional alkyl (meth)acrylate having a long-chain alkylene chain having 6 or more carbon atoms is preferable. That is, for example, the crosslinked resin particles preferably have a constitutional unit derived from a bifunctional alkyl (meth)acrylate and have 6 or more carbon atoms in the alkylene chain in the constitutional unit. Similarly, for example, the crosslinked styrene (meth)acrylic resin particles preferably have a constitutional unit derived from a bifunctional alkyl (meth)acrylate and have 6 or more carbon atoms in the alkylene chain in the constitutional unit.

A toner, that contains the toner particles containing the crosslinked resin particles that have a constitutional unit derived from a bifunctional alkyl (meth)acrylate and have 6 or more carbon atoms in the alkylene chain in the constitutional unit, for example, tends to exhibit desired viscoelastic properties (details will be described later). For example, the toner having desired viscoelastic properties can suppress the deformation amount of the toner particles within a certain range even under high-pressure fixing conditions, and can suppress a difference in glossiness of the image. However, in a case where the elastic difference between the crosslinked resin particles and the binder resin contained in the toner particles is too large, there is a tendency that it is difficult to obtain the effect of suppressing the change in loss tangent tan δ due to the crosslinked resin particles. Therefore, for example, it is preferable to control crosslinkability such that the elasticity of the crosslinked resin particles is not too high. In a case where a crosslinking density of the crosslinked resin particles is high (that is, in a case where a distance between crosslinking points is short), the elasticity of the crosslinked resin particles is too high, but in the crosslinked resin particles that have a constitutional unit derived from a bifunctional alkyl (meth)acrylate and have 6 or more carbon atoms in the alkylene chain in the constitutional unit, the crosslinking density is moderately low (that is, the distance between crosslinking points is moderately long), and the elasticity of the crosslinked resin particles is not too high. As a result, the elastic difference between the crosslinked resin particles and the binder resin contained in the toner particles is not too large, the effect of suppressing the change in loss tangent tan δ due to the crosslinked resin particles can be obtained, and the difference in glossiness of the image can be suppressed.

From the viewpoint of adjusting the crosslinking density of the crosslinked resin configuring the crosslinked resin particles to an appropriate range, the number of carbon atoms in the alkylene chain in the bifunctional alkyl (meth) acrylate is, for example, preferably 6 or more and 20 or less, more preferably 6 or more and 12 or less, and even more preferably 8 or more and 12 or less.

Examples of the bifunctional alkyl (meth)acrylate include 1,6-hexanediol di(meth)acrylate, 1,8-octanediol di(meth) acrylate, 1,9-nonanediol di(meth)acrylate, 1,10-decanediol di(meth)acrylate, and 1,12-dodecanediol di(meth)acrylate, and for example, at least one of 1,10-decanediol diacrylate or 1,10-decanediol dimethacrylate is preferable.

In a case where the resin particles are a polymer of a composition containing the styrene-based monomer, the (meth)acrylic acid-based monomer, and the crosslinking agent, by adjusting the amount of the crosslinking agent contained in the composition, the viscoelasticity of the resin particles can be controlled. In a case where the amount of the crosslinking agent contained in the composition is high, the storage elastic modulus G' of the resin particles tends to be increased. A content of the crosslinking agent with respect to 100 parts by mass of the total amount of the styrene-based monomer, the (meth)acrylic acid-based monomer, and the crosslinking agent is, for example, preferably 0.3 parts by mass or more and 5.0 parts by mass or less, more preferably 0.5 parts by mass or more and 2.5 parts by mass or less, and even more preferably 1.0 part by mass or more and 2.0 parts by mass or less.

A proportion of the resin particles to the overall amount of the toner particles is, for example, preferably 2% by mass or more and 30% by mass or less, more preferably 5% by mass or more and 25% by mass or less, and even more preferably 8% by mass or more and 20% by mass or less.

A proportion of the crosslinked vinyl-based resin particles to the overall amount of the toner particles is, for example, preferably 2% by mass or more and 30% by mass or less, more preferably 5% by mass or more and 25% by mass or less, and even more preferably 8% by mass or more and 20% by mass or less.

A proportion of the styrene (meth)acrylic resin particles to the overall amount of the toner particles is, for example, preferably 2% by mass or more and 30% by mass or less, more preferably 5% by mass or more and 25% by mass or less, and even more preferably 8% by mass or more and 20% by mass or less.

A proportion of the crosslinked styrene (meth)acrylic resin particles to the overall amount of the toner particles is, for example, preferably 2% by mass or more and 30% by mass or less, more preferably 5% by mass or more and 25% by mass or less, and even more preferably 8% by mass or more and 20% by mass or less.

In a case where the content of the resin particles is set to 1, a content of the crystalline resin with respect to the resin particles contained in the toner particles is, for example, preferably 0.2 or more and 10 or less, and more preferably 1 or more and 5 or less.

That is, a mass-based ratio Mc/Mp of a content Mc of the crystalline resin to a content Mp of the resin particles contained in the toner particles is, for example, preferably 0.2 or more and 10 or less, and more preferably 1 or more and 5 or less.

In a case where the ratio Mc/Mp is 0.2 or more, the fixability of the image is good due to the contribution of the crystalline resin that is a component that causes a decrease in viscosity in a fixing temperature range.

In a case where the ratio Mc/Mp is 10 or less, the deformation amount of the toner during fixing is appropriately suppressed, and the difference in glossiness of the fixed image due to the fixing conditions is suppressed.

In a case where the content of the resin particles is set to 1, a content of the amorphous resin with respect to the resin particles contained in the toner particles is, for example, preferably 1.3 or more and 45 or less, and more preferably 3 or more and 15 or less.

That is, a mass-based ratio Ma/Mp of a content Ma of the amorphous resin to the content Mp of the resin particles contained in the toner particles is, for example, preferably 1.3 or more and 45 or less, and more preferably 3 or more and 15 or less.

In a case where the mass proportion of the resin particles, the crosslinked vinyl-based resin particles, the styrene (meth)acrylic resin particles, or the crosslinked styrene (meth)acrylic resin particles is within the above-described range, compared to a case of being less than or more than the above-described range, (1) the embedding of the external additive in the toner particles is suppressed, (2) both storage stability and good fixability of the toner are achieved, and (3) a difference in glossiness of the fixed image due to fixing conditions (difference in temperature and pressure) is suppressed.

As the resin particles, for example, it is preferable to be resin particles that have a storage elastic modulus G' of $1\times10^4$ Pa or more and $1\times10^6$ Pa or less in a range of 90° C. or higher and 150° C. or lower, in a dynamic viscoelasticity measurement in which the temperature is raised at a rate of 2° C./min. Hereinafter, the resin particles having the above-described characteristics will be referred to as "resin particles (S)".

The above-described storage elastic modulus G' of the resin particles (S) is $1\times10^4$ Pa or more and $1\times10^6$ Pa or less, for example, preferably $1\times10^5$ Pa or more and $8\times10^5$ Pa or less, and more preferably $1\times10^5$ Pa or more and $6\times10^5$ Pa or less.

In a case where the above-described storage elastic modulus G' of the resin particles (S) is within the above-described range, compared to a case of being less than or more than the above-described range, (1) the embedding of the external additive in the toner particles is suppressed, (2) both storage stability and good fixability of the toner are achieved, and (3) a difference in glossiness of the fixed image due to fixing conditions (difference in temperature and pressure) is suppressed.

In the resin particles (S), as compared with resin particles having a storage elastic modulus G' of less than $1\times10^4$ Pa, the glossiness of the fixed image fixed in high-temperature and high-pressure conditions is suppressed. As a result, the difference in glossiness of the fixed image due to the fixing conditions (difference in temperature and pressure) is suppressed.

In the resin particles (S), as compared with resin particles having a storage elastic modulus G' of more than $1\times10^6$ Pa, a decrease in fixability due to excessively high elasticity of the toner particles is suppressed, and good fixability is obtained.

In the dynamic viscoelasticity measurement in which the temperature is raised at a rate of 2° C./min, a loss tangent tan δ of the resin particles (S) in a range of 30° C. or higher and 150° C. or lower is, for example, preferably 0.01 or more and 2.5 or less. In this case, a loss tangent tan δ of the resin particles (S) in a range of 65° C. or higher and 150° C. or lower is, for example, more preferably 0.01 or more and 1.0 or less, and even more preferably 0.01 or more and 0.5 or less.

In a case where the loss tangent tan δ of the resin particles (S) in the range of 30° C. or higher and 150° C. or lower is within the above-described range, (1) the embedding of the external additive in the toner particles is suppressed, (2) both storage stability and good fixability of the toner are achieved, and (3) a difference in glossiness of the fixed image due to fixing conditions (difference in temperature and pressure) is suppressed.

In a case where the loss tangent tan δ of the resin particles (S) in the range of 65° C. or higher and 150° C. or lower, in which the toner particles are easily deformed, is within the above-described range, (1) the embedding of the external additive in the toner particles is suppressed, (2) both storage stability and good fixability of the toner are achieved, and (3) a difference in glossiness of the fixed image due to fixing conditions (difference in temperature and pressure) is suppressed.

The glass transition temperature Tg of the resin particles (S) is, for example, preferably 10° C. or higher and 45° C. or lower. In a case where the Tg of the resin particles (S) is 10° C. or higher and 45° C. or lower, the difference in glossiness between a fixed image in low-temperature and low-pressure conditions and a fixed image in high-temperature and high-pressure conditions is further reduced while realizing the good fixability of the toner. The Tg of the resin particles (S) is, for example, more preferably 15° C. or higher and 40° C. or lower, and even more preferably 20° C. or higher and 35° C. or lower.

In a case where the Tg of the resin particles (S) is 10° C. or higher, since the difference from the glass transition temperature of the binder resin is small, the resin particles (S) are not unevenly distributed during the manufacturing of the toner particles, dispersion uniformity of the resin particles (S) inside the toner particles is improved, and the difference in glossiness of the fixed image due to the fixing conditions is suppressed.

In a case where the Tg of the resin particles (S) is 45° C. or lower, meltability of the binder resin is not adversely affected during image fixing, and low temperature fixability of the toner is good.

The storage elastic modulus G', loss tangent tan δ, and glass transition temperature Tg of the resin particles (S) are determined by the following measurement methods.

A pressure is applied to the resin particles (S) to form a disk having a thickness of 2 mm and a diameter of 8 mm to produce a sample for measurement. Examples of a method for isolating the resin particles (S) from the toner particles include a method of immersing the toner particles in a solvent that dissolves the binder resin and does not dissolve the resin particles (S), and recovering the resin particles (S).

The sample for measurement is sandwiched between parallel plates with a diameter of 8 mm, and using a dynamic viscoelasticity measuring device (rheometer ARES-G2, manufactured by TA Instruments), the dynamic viscoelasticity measurement is performed by increasing the temperature from 10° C. to 150° C. at a rate of 2° C./min with a gap of 3 mm, a frequency of 1 Hz, and a strain of 0.1% to 100%. From each of the storage elastic modulus curve and the loss elastic modulus curve obtained by the measurement, the storage elastic modulus G' and the loss tangent tan δ are determined. The peak temperature of the loss tangent tan δ is determined as the glass transition temperature Tg.

From the viewpoint of controlling the storage elastic modulus G' in a range of 90° C. or higher and 150° C. or lower to the above-described range, the resin particles (S) are, for example, preferably crosslinked resin particles.

A proportion of the resin particles (S) to the overall amount of the toner particles is, for example, preferably 2% by mass or more and 30% by mass or less, more preferably 5% by mass or more and 25% by mass or less, and even more preferably 8% by mass or more and 20% by mass or less.

In a case where the mass proportion of the resin particles (S) is within the above-described range, compared to a case of being less than or more than the above-described range, (1) the embedding of the external additive in the toner particles is suppressed, (2) both storage stability and good fixability of the toner are achieved, and (3) a difference in glossiness of the fixed image due to fixing conditions (difference in temperature and pressure) is suppressed.

Colorant Examples of the colorant include pigments such as carbon black, chrome yellow, Hansa yellow, benzidine yellow, threne yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye; and inorganic pigments such as a titanium compound and silica.

The colorant is not limited to a substance having absorption in the visible light region. The colorant may be, for example, a substance having absorption in the near-infrared region, or may be a fluorescent colorant.

Examples of the colorant having absorption in the near-infrared region include an aminium salt-based compound, a naphthalocyanine-based compound, a squarylium-based compound, and a croconium-based compound.

Examples of the fluorescent colorant include the fluorescent colorants described in paragraph 0027 of JP2021-127431A.

The colorant may be a luminous colorant. Examples of the luminous colorant include metal powder such as aluminum, brass, bronze, nickel, stainless steel, and zinc; mica coated with titanium oxide or yellow iron oxide; a coated flaky inorganic crystal substrate such as barium sulfate, layered silicate, and silicate of layered aluminum; and monocrystal plate-shaped titanium oxide, basic carbonate, bismuth oxychloride, natural guanine, flaky glass powder, metal-deposited flaky glass powder.

One kind of colorant may be used alone, or two or more kinds of colorants may be used in combination.

As the colorant, a colorant having undergone a surface treatment as necessary may be used, or a dispersant may be used in combination with the colorant.

In the present exemplary embodiment, the toner particles may or may not contain a colorant. The toner according to the present exemplary embodiment may be a toner that does not contain a colorant in the toner particles, so-called transparent toner.

In a case where the toner particles of the present exemplary embodiment contain a colorant, the content of the colorant with respect to the total amount of the toner particles is, for example, preferably 1% by mass or more and 30% by mass or less, and more preferably 3% by mass or more and 15% by mass or less.

Release Agent

Examples of the release agent include hydrocarbon-based wax; natural wax such as carnauba wax, rice wax, and candelilla wax; synthetic or mineral•petroleum-based wax such as montan wax; and ester-based wax such as fatty acid esters and montanic acid esters. The release agent is not limited to the agents.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by "peak melting temperature" described in the method for determining the melting temperature in JIS K7121-1987, "Testing methods for transition temperatures of plastics".

The content of the release agent with respect to the total amount of the toner particles is, for example, preferably 1% by mass or more and 20% by mass or less, and more preferably 5% by mass or more and 15% by mass or less.

Other Additives

Examples of other additives include known additives such as a magnetic material, a charge control agent, and inorganic powder. The additives are incorporated into the toner particles as internal additives.

Structure, Composition, and Characteristics of Toner Particles

The toner particles may be toner particles that have a single-layer structure or toner particles having a so-called core/shell structure that is configured with a core portion (core particle) and a coating layer (shell layer) covering the core portion.

In a case where the toner particles have a core/shell structure, the toner particles may have a form in which the resin particles are contained only in the core particles, a form in which the resin particles are contained only in the shell layer, or a form in which the resin particles are contained in both the core particles, and the shell layer. In a case where the toner particles have a core/shell structure, from the viewpoint of suppressing the embedding of the external additive, for example, it is preferable that both the core particles and the shell layer contain the resin particles, and it is more preferable that both the core particles and the shell layer contain the resin particles dispersed with high uniformity.

The toner particles having the core/shell structure include, for example, core particles containing a binder resin, resin particles, a colorant, and a release agent, and a shell layer containing a binder resin and resin particles.

The volume-average particle size (D50v) of the toner particles is, for example, preferably 2 μm or more and 10 μm or less, and more preferably 4 μm or more and 8 μm or less.

The average particle size of the toner particles is measured using COULTER MULTISIZER II (manufactured by Beckman Coulter, Inc.) and using ISOTON-II (manufactured by Beckman Coulter, Inc.) as an electrolytic solution. A measurement sample in an amount of 0.5 mg or more and 50 mg or less is added to 2 ml of a 5% by mass aqueous solution of a surfactant (for example, preferably sodium alkylbenzene sulfonate), and the mixture is added to 100 ml or more and 150 ml or less of the electrolytic solution. The electrolytic solution in which the sample is added is subjected to a dispersion treatment for 1 minute with an ultrasonic disperser, and the particle size of the particles is measured in a range of 2 μm or more and 60 μm or less using COULTER MULTISIZER II with an aperture having an aperture size of 100 The number of particles to be sampled is 50,000. A volume distribution or a number distribution is drawn from a small diameter side based on the measured particle size distribution, and a particle size having a cumulative percentage of 50% is defined as the volume-average particle size D50v or the number-average particle size D50p.

The average circularity of the toner particles is, for example, preferably 0.94 or more and 1.00 or less, and more preferably 0.95 or more and 0.98 or less.

The average circularity of the toner particles is (equivalent circular perimeter)/(perimeter)=Average of (perimeter of circle having the same area as projected area of particles)/(perimeter of projected particle image).

As a particle image measuring device, a flow-type particle image analyzer (FPIA-3000 manufactured by Sysmex Corporation) is used. The number of sampled toner particles is 3,500. In a case where a toner contains external additives, the toner is dispersed in water containing a surfactant, the dispersion is treated with ultrasonic waves such that the external additives are removed, and the toner particles are collected.

SP Value Difference Between Resin Particles and Binder Resin

A difference between an SP value (referred to as SP value (S) in the present disclosure) of the resin particles and an SP value (referred to as SP value (R) in the present disclosure) of the binder resin (SP value (S)−SP value (R)) is, for example, preferably −0.32 or more and −0.12 or less, and more preferably −0.29 or more and −0.18 or less.

The inside of the toner particles includes an island structure of the resin particles and a sea structure of the binder resin. Since the resin particles have a relatively small SP value and the binder resin has a relatively large SP value, the island structure has a relatively strong negative charge and the sea structure has a relatively weak negative charge.

For example, the resin particles are preferably the resin particles (S), and the difference between the SP value (S) of the resin particles (S) and the SP value (R) of the binder resin (SP value (S)−SP value (R)) is preferably −0.32 or more and −0.12 or less, and more preferably −0.29 or more and −0.18 or less.

In a case where the binder resin is a mixed resin, an SP value of the binder resin having the highest mass-based content is defined as the SP value (R).

In a case where the difference (SP value (S)−SP value (R)) is within the above-described range, compared to a case where the difference is less than the above-described range, the affinity between the resin particles and the binder resin, that configure most of the toner particles, is maintained at an appropriate level, and the resin particles are easily dispersed in the toner particles in a nearly uniform state. Therefore, the toner tends to have similar viscoelasticity at high temperature and high strain and at low temperature and low strain, and the difference in glossiness of the fixed image due to the fixing conditions (difference in temperature and pressure) is suppressed. That is, compared to a case where the difference (SP value (S)−SP value (R)) is less than the above-described range, since the affinity between the binder resin and the resin particles is too high and the resin particles move easily in the toner particles, it is difficult for the resin particles to partially aggregate and reduce the effect of the resin particles.

In a case where the difference (SP value (S)−SP value (R)) is within the above-described range, compared to a case where the difference is more than the above-described range, excessive mixing or compatibility between the resin particles and the binder resin occurs during melting the toner, and an increase in melt viscosity of the toner as a whole is suppressed. As a result, a decrease in fixability due to excessively high viscoelasticity is suppressed, and good fixability is obtained.

The SP value (S) of the resin particles is, for example, preferably 9.00 or more and 9.15 or less, more preferably 9.03 or more and 9.12 or less, and even more preferably 9.06 or more and 9.10 or less.

The SP value (S) of the resin particles (S) is, for example, preferably 9.00 or more and 9.15 or less, more preferably 9.03 or more and 9.12 or less, and even more preferably 9.06 or more and 9.10 or less.

The SP value (S) and the SP value (R) are solubility parameters calculated by Okitsu method in units of $(cal/cm^3)^{1/2}$). Details of the Okitsu method are described in "Journal of the Adhesion Society of Japan, Vol. 29, No. 5 (1993)".

Viscoelasticity of Components (Extra Components) Excluding Resin Particles

Hereinafter, components excluding the resin particles from the toner particles are referred to as "extra components", and a temperature at which the storage elastic modulus G' reaches less than $1\times10^5$ Pa is referred to as a "specific elastic modulus reached temperature".

In the dynamic viscoelasticity measurement in which the temperature is raised at a rate of 2° C./min, the extra components preferably have, for example, a storage elastic modulus G' of $1\times10^8$ Pa or more and a specific elastic modulus reached temperature of 65° C. or higher and 90° C. or lower in a range of 30° C. or higher and 50° C. or lower.

The extra components satisfying the above-described conditions have a high elastic modulus at a low temperature, and have a low elastic modulus at 65° C. or higher and 90° C. or lower. As a result, the toner particles are easily melted by heating, and the fixability is improved.

The storage elastic modulus G' of the extra components at 30° C. or higher and 50° C. or lower is, for example, preferably $1\times10^8$ Pa or more, more preferably $1\times10^8$ Pa or more and $1\times10^9$ Pa or less, and even more preferably $2\times10^8$ Pa or more and $6\times10^8$ Pa or less.

In a case where the storage elastic modulus G' of the extra components at 30° C. or higher and 50° C. or lower is within the above-described range, compared to a case of being less than or more than the above-described range, both the storage stability of the toner and good fixability are achieved, and the difference in glossiness of the fixed image due to fixing conditions (difference in temperature and pressure) is suppressed.

The specific elastic modulus reached temperature of the extra components is, for example, preferably 65° C. or higher and 90° C. or lower, more preferably 68° C. or higher and 80° C. or lower, and even more preferably 70° C. or higher and 75° C. or lower.

In a case where the specific elastic modulus reached temperature of the extra components is within the above-described range, compared to a case of being lower than or higher than the above-described range, both the storage stability of the toner and good fixability are achieved, and the difference in glossiness of the fixed image due to fixing conditions (difference in temperature and pressure) is suppressed.

A loss tangent tan δ of the extra components at the specific elastic modulus reached temperature is, for example, preferably 0.8 or more and 1.6 or less, more preferably 0.9 or more and 1.5 or less, and even more preferably 1.0 or more and 1.4 or less.

In a case where the loss tangent tan δ of the extra components at the specific elastic modulus reached temperature is within the above-described range, compared to a case of being less than or more than the above-described range, both the storage stability of the toner and good fixability are achieved, and the difference in glossiness of the fixed image due to fixing conditions (difference in temperature and pressure) is suppressed.

The storage elastic modulus G' and the loss tangent tan δ of the extra components are determined by the following measurement methods.

The extra components are obtained by removing the resin particles from the toner particles. At normal temperature (25° C.±3° C.), the extra components are molded into a tablet shape by a press molding machine to produce a sample for measurement. The sample for measurement is sandwiched between parallel plates with a diameter of 8 mm, and using a dynamic viscoelasticity measuring device (rheometer ARES-G2, manufactured by TA Instruments), the dynamic viscoelasticity measurement is performed by increasing the temperature from 30° C. to 150° C. at a rate of 2° C./min with a gap of 3 mm, a frequency of 1 Hz, and a strain of 0.1% to 100%. From each of the storage elastic modulus curve and the loss elastic modulus curve obtained by the measurement, the storage elastic modulus G' and the loss tangent tan δ are determined.

Relationship Between Resin Particles and Extra Components

The following storage elastic modulus G' is the storage elastic modulus G' obtained by the dynamic viscoelasticity measurement in which the temperature is raised at a rate of 2° C./min, and the measurement method is as described above.

In a case where the storage elastic modulus of the resin particles in a range of 90° C. or higher and 150° C. or lower is represented by G' (p90-150), the storage elastic modulus of the toner particles in a range of 90° C. or higher and 150° C. or lower is represented by G' (t90-150), and the storage elastic modulus of the components excluding the resin particles from the toner particles in a range of 90° C. or higher and 150° C. or lower is represented by G' (r90-150), for example, it is preferable that G' (p90-150) is 1×10 4 Pa or more and 1×10 6 Pa or less, and log G' (t90-150)−log G' (r90-150) is 1.0 or more and 4.0 or less.

The value of log G' (t90-150)−log G' (r90-150) is, for example, more preferably 1.0 or more and 3.5 or less, even more preferably 1.1 or more and 3.4 or less, and particularly preferably 1.2 or more and 3.3 or less.

The value of log G' (t90-150)−log G' (r90-150) means a difference in viscoelasticity of the toner particles depending on whether or not the resin particles are added. By dispersing and encapsulating the resin particles in the toner particles in a nearly uniform state, the influence of the viscoelasticity of the resin particles on the viscoelasticity of the toner particles as a whole is suppressed. In addition, by setting the value of log G' (t90-150)−log G' (r90-150) to the above-described range, compared to a case of being less than or more than the above-described range, good fixability is realized, and the difference in glossiness of the fixed image due to the fixing conditions is reduced.

Silica Particles (A)

The silica particles (A) contain a nitrogen element-containing compound containing a molybdenum element, in which a ratio $N_{Mo}/N_{Si}$ of Net intensity $N_{Mo}$ of the molybdenum element measured by X-ray fluorescence analysis to Net intensity Ns, of a silicon element measured by X-ray fluorescence analysis is 0.035 or more and 0.45 or less.

Hereinafter, the "nitrogen element-containing compound containing a molybdenum element" is referred to as "molybdenum nitrogen-containing compound".

From the viewpoint of charge distribution narrowing and charge distribution retentivity, the Net intensity $N_{Mo}$ of the molybdenum element in the silica particles (A) is, for example, preferably 5 kcps or more and 75 kcps or less, more preferably 7 kcps or more and 55 kcps or less, even more preferably 8 kcps or more and 50 kcps or less, and still more preferably 10 kcps or more and 40 kcps or less.

The method of measuring the Net intensity $N_{Mo}$ of the molybdenum element and the Net intensity $N_{Si}$ of the silicon element in the silica particles is as follows.

Approximately 0.5 g of silica particles are compressed using a compression molding machine by being pressed under a load of 6 tons for 60 seconds, thereby preparing a disk having a diameter of 50 mm and a thickness of 2 mm. The disk is used as a sample for qualitative quantitative elemental analysis performed under the following conditions by using a scanning X-ray fluorescence analyzer (XRF-1500, manufactured by Shimadzu Corporation), and Net intensity of each of the molybdenum element and the silicon element is determined (unit: kilo counts per second, kcps).

Tube voltage: 40 kV

Tube current: 90 mA

Measurement area (analysis diameter): diameter of 10 mm

Measurement time: 30 minutes

Anticathode: rhodium

The amount of the silica particles (A) externally added with respect to 100 parts by mass of the toner particles is, for example, preferably 0.1 parts by mass or more and 3.0 parts by mass or less, more preferably 0.1 parts by mass or more and 2.0 parts by mass or less, and even more preferably 0.1 parts by mass or more and 1.0 parts by mass or less.

The silica particles (A) have a molybdenum nitrogen-containing compound. Hereinafter, the structure of the silica particles (A) will be described.

Examples of an exemplary embodiment of the silica particles (A) include silica particles in which at least a part of the surface of silica base particles is coated with a reaction product of a silane coupling agent, and a molybdenum nitrogen-containing compound has adhered to the coating structure of the reaction product. In the present exemplary embodiment, a hydrophobic structure (a structure obtained by treating silica particles with a hydrophobic agent) may additionally adhere to the coating structure of the reaction product. The silane coupling agent is, for example, preferably at least one kind of silane coupling agent selected from the group consisting of a monofunctional silane coupling agent, a bifunctional silane coupling agent, and a trifunctional silane coupling agent, and more preferably a trifunctional silane coupling agent.

Silica Base Particles

The silica base particles may be dry silica or wet silica. Examples of the dry silica include silica by a combustion method (fumed silica) obtained by combustion of a silane compound and silica by a deflagration method obtained by explosive combustion of metallic silicon powder.

Examples of the wet silica include wet silica obtained by a neutralization reaction between sodium silicate and a mineral acid (silica by a precipitation method synthesized and aggregated under alkaline conditions, silica by a gelation method synthesized and aggregated under acidic conditions), colloidal silica obtained by alkalifying and polymerizing acidic silicate, and sol-gel silica obtained by the hydrolysis of an organic silane compound (for example, alkoxysilane). As the silica base particles, from the viewpoint of charge distribution narrowing, for example, sol-gel silica is preferable.

Reaction Product of Silane Coupling Agent

The structure consisting of the reaction product of a silane coupling agent (particularly, the reaction product of a trifunctional silane coupling agent) has a pore structure and has high affinity with the molybdenum nitrogen-containing compound. Therefore, the molybdenum nitrogen-containing compound enters deeply into the pores, that makes the silica particles (A) have a relatively high content of the molybdenum nitrogen-containing compound.

The molybdenum nitrogen-containing compound that tends to be positively charged adheres to the surface of the silica base particles that tends to be negatively charged, that brings about an effect of canceling out an excess of negative charge of the silica base particles. The molybdenum nitrogen-containing compound adheres to the inside of the coating structure (that is, pore structure) consisting of the reaction product of a silane coupling agent rather than the outermost surface of the silica particles (A). Accordingly, the charge distribution of the silica particles (A) does not widen toward the positive charge side, and an excess of negative charge of the silica base particles is canceled out, whereby narrowing of the charge distribution of the silica particles (A) is realized.

The silane coupling agent is, for example, preferably a compound that does not contain N (nitrogen element). Examples of the silane coupling agent include a silane coupling agent represented by Formula (TA).

$$R^1_n\text{—}Si(OR^2)_{4-n} \qquad \text{Formula (TA)}$$

In Formula (TA), $R^1$ represents a saturated or unsaturated aliphatic hydrocarbon group having 1 or more and 20 or less carbon atoms or an aromatic hydrocarbon group having 6 or more and 20 or less carbon atoms, $R^2$ represents a halogen atom or an alkyl group, and n is 1, 2, or 3. In a case where n is 2 or 3, a plurality of $R^1$'s may be the same group or different groups. In a case where n is 1 or 2, a plurality of $R^2$'s may be the same group or different groups.

Examples of the reaction product of a silane coupling agent include a reaction product represented by Formula (TA) in which some or all of $OR^2$ are substituted with an OH group; a reaction product represented by Formula (TA) in which some or all of the groups formed by the substitution of $OR^2$ with an OH group are polycondensed; and a reaction product represented by Formula (TA) in which some or all of the groups formed by the substitution of $OR^2$ with an OH group are polycondensed with a SiOH group of the silica base particles.

The aliphatic hydrocarbon group represented by $R^1$ in Formula (TA) may be linear, branched, or cyclic. The aliphatic hydrocarbon group is, for example, preferably linear or branched. The aliphatic hydrocarbon group has, for example, preferably 1 or more and 20 or less carbon atoms, more preferably 1 or more and 18 or less carbon atoms, even more preferably 1 or more and 12 or less carbon atoms, and still more preferably 1 or more and 10 or less carbon atoms. The aliphatic hydrocarbon group may be saturated or unsaturated. The aliphatic hydrocarbon group is, for example, preferably a saturated aliphatic hydrocarbon group, and more preferably an alkyl group. The hydrogen atom of the aliphatic hydrocarbon group may be substituted with a halogen atom.

Examples of the saturated aliphatic hydrocarbon group include a linear alkyl group (such as a methyl group, an ethyl group, a propyl group, a butyl group, a pentyl group, a hexyl group, a heptyl group, an octyl group, a nonyl group, a decyl group, a dodecyl group, a hexadecyl group, and an eicosyl group), a branched alkyl group (such as an isopropyl group, an isobutyl group, an isopentyl group, a neopentyl group, a 2-ethylhexyl group, a tertiary butyl group, a tertiary pentyl group, and an isopentadecyl group), and a cyclic alkyl group (such as a cyclopropyl group, a cyclopentyl group, a cyclohexyl group, a cycloheptyl group, a cyclooctyl group, a tricyclodecyl group, a norbornyl group, and an adamantyl group).

Examples of the unsaturated aliphatic hydrocarbon group include an alkenyl group (such as a vinyl group (ethenyl group), a 1-propenyl group, a 2-propenyl group, a 2-butenyl group, a 1-butenyl group, a 1-hexenyl group, a 2-dodecenyl group, and a pentenyl group), and an alkynyl group (such as an ethynyl group, a 1-propynyl group, a 2-propynyl group, a 1-butynyl group, a 3-hexynyl group, and a 2-dodecynyl group).

The number of carbon atoms in the aromatic hydrocarbon group represented by R' in Formula (TA) is, for example, preferably 6 or more and 20 or less, more preferably 6 or more and 18 or less, even more preferably 6 or more and 12 or less, and still more preferably 6 or more and 10 or less. Examples of the aromatic hydrocarbon group include a phenylene group, a biphenylene group, a terphenylene group, a naphthalene group, an anthracene group, and the like. The hydrogen atom of the aromatic hydrocarbon group may be substituted with a halogen atom.

Examples of the halogen atom represented by $R^2$ in Formula (TA) include a fluorine atom, a chlorine atom, a bromine atom, and an iodine atom, and for example, a chlorine atom, a bromine atom, or an iodine atom is preferable.

As the alkyl group represented by $R^2$ in Formula (TA), for example, an alkyl group having 1 or more and 10 or less carbon atoms is preferable, an alkyl group having 1 or more and 8 or less carbon atoms is more preferable, and an alkyl group having 1 or more and 4 or less carbon atoms is even more preferable. Examples of the linear alkyl group having 1 or more and 10 or less carbon atoms include a methyl group, an ethyl group, a n-propyl group, a n-butyl group, a n-pentyl group, a n-hexyl group, a n-heptyl group, a n-octyl group, a n-nonyl group, and a n-decyl group. Examples of the branched alkyl group having 3 or more and 10 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group. Examples of the cyclic alkyl group having 3 or more and 10 or less carbon atoms include a cyclopropyl group, a cyclobutyl group, a cyclopentyl group, a cyclohexyl group, a cycloheptyl group, a cyclooctyl group, a cyclononyl group, a cyclodecyl group, and a polycyclic (for example, bicyclic, tricyclic, or spirocyclic) alkyl group composed of these monocyclic alkyl groups linked to each other. The hydrogen atom of the alkyl group may be substituted with a halogen atom.

n in Formula (TA) is 1, 2, or 3. For example, n is preferably 1 or 2, and more preferably 1.

The silane coupling agent represented by Formula (TA) is, for example, preferably a trifunctional silane coupling agent in which R' represents a saturated aliphatic hydrocarbon group having 1 or more and 20 or less carbon atoms, R 2 represents a halogen atom or an alkyl group having 1 or more and 10 or less carbon atoms, and n is 1.

Examples of the trifunctional silane coupling agent include vinyltrimethoxysilane, vinyltriethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, and phenyltrichlorosilane (all of these compounds are compounds represented by Formula (TA) in which $R^1$ is an unsubstituted aliphatic hydrocarbon group or an unsubstituted aromatic hydrocarbon group); and 3-glycidoxypropyltrimethoxysilane, γ-methacryloxypropyltrimethoxysilane, γ-mercaptopropyltrimethoxysilane, γ-chloropropyltrimethoxysilane, and γ-glycidyloxypropylmethyldimethoxysilane (all of these compounds are compounds represented by Formula (TA) in which $R^1$ is a substituted aliphatic hydrocarbon group or a substituted aromatic hydrocarbon group). One kind of trifunctional silane coupling agent may be used alone, or two or more kinds of trifunctional silane coupling agents may be used in combination.

As the trifunctional silane coupling agent, for example, alkyltrialkoxysilane is preferable, and alkyltrialkoxysilane represented by Formula (TA) is preferable in which $R^1$ is an alkyl group having 1 or more and 20 or less carbon atoms (for example, preferably having 1 or more and 15 or less carbon atoms, more preferably having 1 or more and 8 or less carbon atoms, even more preferably having 1 or more and 4 or less carbon atoms, and particularly preferably having 1 or 2 carbon atoms) and R 2 is an alkyl group having 1 or more and 2 or less carbon atoms.

More specifically, as the silane coupling agent configuring the coating structure on the surface of the silica base particles, for example, at least one kind of trifunctional silane coupling agent selected from the group consisting of alkyltrimethoxysilane and alkyltriethoxysilane having an alkyl group having 1 or more and 20 or less carbon atoms is preferable;

- at least one kind of trifunctional silane coupling agent selected from the group consisting of alkyltrimethoxysilane and alkyltriethoxysilane having an alkyl group having 1 or more and 15 or less carbon atoms is more preferable;
- at least one kind of trifunctional silane coupling agent selected from the group consisting of alkyltrimethoxysilane and alkyltriethoxysilane having an alkyl group having 1 or more and 8 or less carbon atoms is even more preferable;
- at least one kind of trifunctional silane coupling agent selected from the group consisting of alkyltrimethoxysilane and alkyltriethoxysilane having an alkyl group having 1 or more and 4 or less carbon atoms is still more preferable; and
- at least one kind of trifunctional silane coupling agent selected from the group consisting of methyltrimethoxysilane, ethyltrimethoxysilane, methyltriethoxysilane, and ethyltriethoxysilane is particularly preferable.

The amount of the coating structure configured with the reaction product of a silane coupling agent with respect to the total mass of the silica particles (A) is, for example, preferably 5.5% by mass or more and 30% by mass or less, and more preferably 7% by mass or more and 22% by mass or less.

Molybdenum Nitrogen-Containing Compound

The molybdenum nitrogen-containing compound is a nitrogen element-containing compound containing a molybdenum element, excluding ammonia and a compound that is in a gaseous state at a temperature of 25° C. or lower.

The molybdenum nitrogen-containing compound preferably adheres, for example, to the inside of the coating structure (that is, the inside of the pores of the pore structure) consisting of the reaction product of the silane coupling agent. One kind of molybdenum nitrogen-containing compound or two or more kinds of molybdenum nitrogen-containing compounds may be used.

From the viewpoint of charge distribution narrowing and charge distribution retentivity and viewpoint of efficiently fixing electrostatically the silica particles (A) to the surface of the toner particles containing the resin particles, the molybdenum nitrogen-containing compound is, for example, preferably at least one kind of compound selected from the group consisting of a quaternary ammonium salt containing a molybdenum element (particularly, a quaternary ammonium salt of molybdic acid) and a mixture of a quaternary ammonium salt and a metal oxide containing a molybdenum element. In the quaternary ammonium salt containing a molybdenum element, the bond between an anion containing a molybdenum element and a quaternary ammonium cation is strong. Therefore, the quaternary ammonium salt containing a molybdenum element has high charge distribution retentivity. In addition, the silica particles (A) can be efficiently fixed electrostatically to the surface of the toner particles containing the resin particles.

As the molybdenum nitrogen-containing compound, for example, a compound represented by Formula (1) is preferable.

Formula (1)

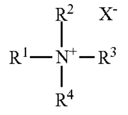

In Formula (1), $R^1$, $R^2$, $R^3$, and $R^4$ each independently represent a hydrogen atom, an alkyl group, an aralkyl group, or an aryl group, and $X^-$ represents an anion containing a molybdenum element. Here, at least one of $R^1$, $R^2$, $R^3$, or $R^4$ represents an alkyl group, an aralkyl group, or an aryl group. Furthermore, two or more of $R^1$, $R^2$, $R^3$, and $R^4$ may be linked to form an aliphatic ring, an aromatic ring, or a heterocycle. The alkyl group, the aralkyl group, and the aryl group may have a substituent.

Examples of the alkyl group represented by $R^1$ to $R^4$ include a linear alkyl group having 1 or more and 20 or less carbon atoms and a branched alkyl group having 3 or more and 20 or less carbon atoms. Examples of the linear alkyl group having 1 or more and 20 or less carbon atoms include a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, and a n-hexadecyl group. Examples of the branched alkyl group having 3 or more and 20 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

As the alkyl group represented by $R^1$ to $R^4$, for example, an alkyl group having 1 or more and 15 or less carbon atoms, such as a methyl group, an ethyl group, a butyl group, or a tetradecyl group, is preferable.

Examples of the aralkyl group represented by $R^1$ to $R^4$ include an aralkyl group having 7 or more and 30 or less carbon atoms. Examples of the aralkyl group having 7 or more and 30 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, and a phenyl-cyclopentylmethyl group.

As the aralkyl group represented by $R^1$ to $R^4$, for example, an aralkyl group having 7 or more and 15 or less carbon atoms, such as a benzyl group, a phenylethyl group, a phenylpropyl group, and a 4-phenylbutyl group, is preferable.

Examples of the aryl group represented by $R^1$ to $R^4$ include an aryl group having 6 or more and 20 or less carbon atoms. Examples of the aryl group having 6 to 20 carbon atoms include a phenyl group, a pyridyl group, and a naphthyl group.

As the aryl group represented by $R^1$ to $R^4$, for example, an aryl group having 6 or more and 10 or less carbon atoms, such as a phenyl group, is preferable.

Examples of the ring formed of two or more of $R^1$, $R^2$, $R^3$, and $R^4$ linked to each other include an alicyclic ring having 2 or more and 20 or less carbon atoms and a heterocyclic amine having 2 or more and 20 or less carbon atoms.

$R^1$, $R^2$, $R^3$, and $R^4$ may each independently have a substituent. Examples of the substituent include a nitrile group, a carbonyl group, an ether group, an amide group, a siloxane group, a silyl group, and an alkoxysilane group.

For example, it is preferable that $R^1$, $R^2$, $R^3$, and $R^4$ each independently represent an alkyl group having 1 or more and 16 or less carbon atoms, an aralkyl group having 7 or more and 10 or less carbon atoms, or an aryl group having 6 or more and 20 or less carbon atoms.

The anion containing a molybdenum element represented by $X^-$ is, for example, preferably a molybdate ion, more preferably a molybdate ion having tetravalent or hexavalent molybdenum, and even more preferably a molybdate ion having hexavalent molybdenum. Specifically, as the molybdate ion, for example, $MoO_4^{2-}$, $Mo_2O_7^{2-}$, $Mo_3O_{10}^{2-}$, $Mo_4O_{13}^{2-}$, $Mo_7O_{24}^{2-}$, or $Mo_8O_{26}^{4-}$ is preferable.

From the viewpoint of charge distribution narrowing and charge distribution retentivity, the total number of carbon atoms in the compound represented by Formula (1) is, for example, preferably 18 or more and 35 or less, and more preferably 20 or more and 32 or less.

Examples of the compound represented by Formula (1) are shown below. The present exemplary embodiment is not limited to these compounds.

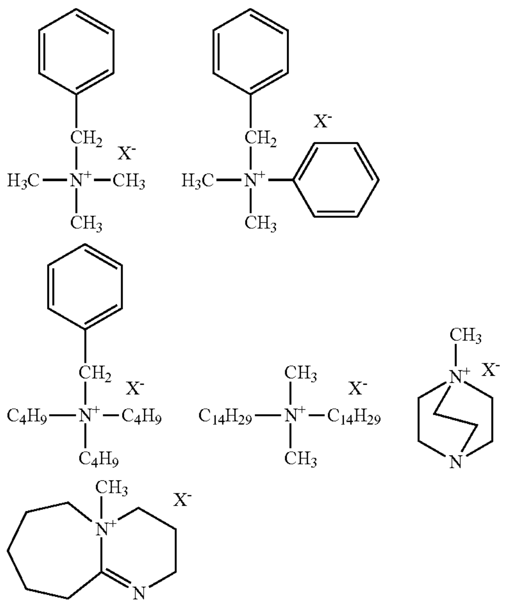

Examples of the quaternary ammonium salt containing a molybdenum element include a quaternary ammonium salt of molybdic acid, such as $[N^+(CH)_3(C_{14}C_{29})_2]_4Mo_8O_{28}^{4-}$, $[N^+(C_4H_9)_2(C_6H_6)_2]_2Mo_2O_7^{2-}$, $[N^+(CH_3)_2(CH_2C_6H_6)(CH_2)_{17}CH_3]_2MoO_4^{2-}$, and $[N^+(CH_3)_2(CH_2C_6H_6)(CH_2)_{15}CH_3]_2MoO_4^{2-}$.

Examples of the metal oxide containing a molybdenum element include a molybdenum oxide (such as molybdenum trioxide, molybdenum dioxide, and $Mo_9O_{26}$), a molybdic acid alkali metal salt (such as lithium molybdate, sodium molybdate, and potassium molybdate), a molybdenum alkaline earth metal salt (such as magnesium molybdate and calcium molybdate) and other composite oxides (such as $Bi_2O_3 \cdot 2MoO_3$ or $\gamma$-$Ce_2Mo_3O_{13}$).

In a case where the silica particles (A) are heated at a temperature in a range of 300° C. or higher and 600° C. or lower, a molybdenum nitrogen-containing compound is detected. The molybdenum nitrogen-containing compound can be detected by heating at a temperature of 300° C. or higher and 600° C. or lower in an inert gas. For example, the molybdenum nitrogen-containing compound is detected using a heating furnace-type drop-type pyrolysis gas chromatograph mass spectrometer using He as a carrier gas. Specifically, by introducing silica particles in an amount of 0.1 mg or more and 10 mg or less into a pyrolysis gas chromatograph mass spectrometer, it is possible to check whether or not the silica particles contain a molybdenum nitrogen-containing compound from the MS spectrum of the detected peak. Examples of components generated by pyrolysis from the silica particles containing a molybdenum nitrogen-containing compound include a primary, secondary, or tertiary amine represented by Formula (2) and an aromatic nitrogen compound. $R^1$, $R^2$, and $R^3$ in Formula (2) have the same definition as $R^1$, $R^2$, and $R^3$ in Formula (1), respectively. In a case where the molybdenum nitrogen-containing compound is a quaternary ammonium salt, some of the side chains of the molybdenum nitrogen-containing compound are detached by pyrolysis at 600° C., and a tertiary amine is detected.

Formula (2)

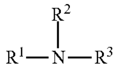

Nitrogen Element-Containing Compound that does not Contain Molybdenum Element

In the silica particles (A), a nitrogen element-containing compound that does not contain a molybdenum element may adhere to the pores of the reaction product of a silane coupling agent. Examples of the nitrogen element-containing compound that does not contain a molybdenum element include at least one kind of compound selected from the group consisting of a quaternary ammonium salt, a primary amine compound, a secondary amine compound, a tertiary amine compound, an amide compound, an imine compound, and a nitrile compound. The nitrogen element-containing compound that does not contain a molybdenum element is, for example, preferably a quaternary ammonium salt.

Specific examples of the primary amine compound include phenethylamine, toluidine, catecholamine, and 2,4,6-trimethylaniline.

Specific examples of the secondary amine compound include dibenzylamine, 2-nitrodiphenylamine, and 4-(2-octylamino)diphenylamine.

Specific examples of the tertiary amine compound include 1,8-bis(dimethylamino)naphthalene, N,N-dibenzyl-2-aminoethanol, and N-benzyl-N-methyl ethanol amine.

Specific examples of the amide compound include N-cyclohexyl-p-toluenesulfonamide, 4-acetamide-1-benzylpiperidine, and N-hydroxy-3-[1-(phenylthio)methyl-1H-1,2,3-triazol-4-yl]benzamide.

Specific examples of the imine compound include diphenylmethaneimine, 2,3-bis(2,6-diisopropylphenylimino)butane, and N,N'-(ethane-1,2-diylidene)bis(2,4,6-trimethylaniline).

Specific examples of the nitrile compound include 3-indoleacetonitrile, 4-[(4-chloro-2-pyrimidinyl)amino]benzonitrile, and 4-bromo-2,2-diphenylbutyronitrile.

Examples of the quaternary ammonium salt include a compound represented by Formula (AM). One kind of compound represented by Formula (AM) or two or more kinds of compounds represented by Formula (AM) may be used.

Formula (AM)

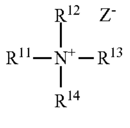

In Formula (AM), $R^{11}$, $R^{12}$, $R^{13}$, and RIA each independently represent a hydrogen atom, an alkyl group, an aralkyl group, or an aryl group, and $Z^-$ represents an anion. Here, at least one of $R^{11}$, $R^{12}$, $R^{13}$, or $R^{14}$ represents an alkyl group, an aralkyl group, or an aryl group. Furthermore, two or more of $R^{11}$, $R^{12}$, $R^{13}$, and $R^{14}$ may be linked to form an aliphatic ring, an aromatic ring, or a heterocycle. The alkyl group, the aralkyl group, and the aryl group may have a substituent.

Examples of the alkyl group represented by $R^{11}$ to $R^{14}$ include a linear alkyl group having 1 or more and 20 or less carbon atoms and a branched alkyl group having 3 or more and 20 or less carbon atoms. Examples of the linear alkyl group having 1 or more and 20 or less carbon atoms include a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, and a n-hexadecyl group. Examples of the branched alkyl group having 3 or more and 20 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

As the alkyl group represented by $R^{11}$ to $R^{14}$, for example, an alkyl group having 1 or more and 15 or less carbon atoms, such as a methyl group, an ethyl group, a butyl group, or a tetradecyl group, is preferable.

Examples of the aralkyl group represented by $R^{11}$ to $R^{14}$ include an aralkyl group having 7 or more and 30 or less carbon atoms. Examples of the aralkyl group having 7 or more and 30 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, and a phenyl-cyclopentylmethyl group.

As the aralkyl group represented by $R^{11}$ to $R^{14}$, for example, an aralkyl group having 7 or more and 15 or less carbon atoms, such as a benzyl group, a phenylethyl group, a phenylpropyl group, and a 4-phenylbutyl group, is preferable.

Examples of the aryl group represented by $R^{11}$ to $R^{14}$ include an aryl group having 6 or more and 20 or less carbon atoms. Examples of the aryl group having 6 to 20 carbon atoms include a phenyl group, a pyridyl group, and a naphthyl group.

As the aryl group represented by $R^{11}$ to $R^{14}$, for example, an aryl group having 6 or more and 10 or less carbon atoms, such as a phenyl group, is preferable.

Examples of the ring formed of two or more of $R^{11}$, $R^{12}$, $R^{13}$, and $R^{14}$ linked to each other include an alicyclic ring having 2 or more and 20 or less carbon atoms and a heterocyclic amine having 2 or more and 20 or less carbon atoms.

$R^{11}$, $R^{12}$, $R^{13}$, and $R^{14}$ may each independently have a substituent. Examples of the substituent include a nitrile group, a carbonyl group, an ether group, an amide group, a siloxane group, a silyl group, and an alkoxysilane group.

For example, it is preferable that $R^{11}$, $R^{12}$, $R^{13}$, and $R^{14}$ each independently represent an alkyl group having 1 or more and 16 or less carbon atoms, an aralkyl group having 7 or more and 10 or less carbon atoms, or an aryl group having 6 or more and 20 or less carbon atoms.

The anion represented by $Z^-$ may be any of an organic anion and an inorganic anion.

Examples of the organic anion include a polyfluoroalkylsulfonate ion, a polyfluoroalkylcarboxylate ion, a tetraphenylborate ion, an aromatic carboxylate ion, and an aromatic sulfonate ion (such as a 1-naphthol-4-sulfonate ion).

Examples of the inorganic anion include $OH^-$, $F^-$, $Fe(CN)_6^{3-}$, $Cl^-$, $Br^-$, $NO^{2-}$, $NO_3^-$, $CO_3^{2-}$, $PO_4^{3-}$, and $SO_4^{2-}$.

From the viewpoint of charge distribution narrowing and charge distribution retentivity, the total number of carbon atoms in the compound represented by Formula (AM) is, for example, preferably 18 or more and 35 or less, and more preferably 20 or more and 32 or less.

Examples of the compound represented by Formula (AM) are shown below. The present exemplary embodiment is not limited to these compounds.

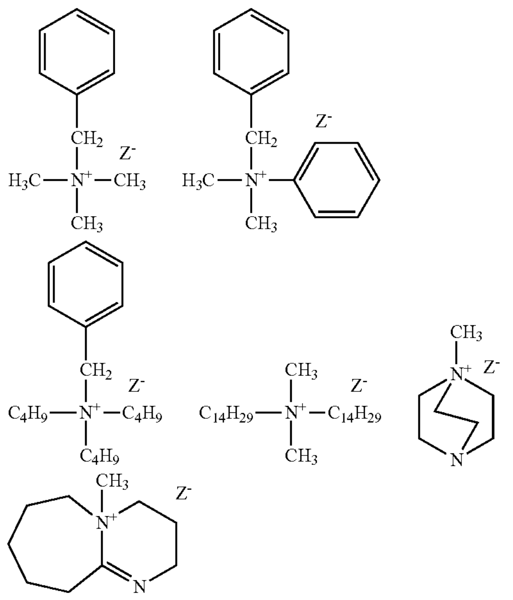

From the viewpoint of charge distribution narrowing and charge distribution retentivity, the total content of the molybdenum nitrogen-containing compound and the nitrogen element-containing compound that does not contain a molybdenum element, which are contained in the silica particles (A), the total content being expressed as a mass ratio N/Si of a nitrogen element to a silicon element, is, for example, preferably 0.005 or more and 0.50 or less, more preferably 0.008 or more and 0.45 or less, even more preferably 0.015 or more and 0.20 or less, and still more preferably 0.018 or more and 0.10 or less.

The above-described mass ratio N/Si in the silica particles (A) is measured using an oxygen and nitrogen analyzer (for example, EMGA-920 manufactured by HORIBA, Ltd.) for a total of 45 seconds, and determined as a mass ratio of N atoms to Si atoms (N/Si). As a pretreatment, the sample is dried in a vacuum at 100° C. for 24 hours or more to remove impurities such as ammonia.

A total extraction amount X of the molybdenum nitrogen-containing compound and the nitrogen element-containing compound that does not contain a molybdenum element, that are extracted from the silica particles (A) by using a mixed solution of ammonia/methanol, is, for example, preferably 0.1% by mass or more with respect to the mass of the silica particles (A). In addition, the total extraction amount X of the molybdenum nitrogen-containing compound and the nitrogen element-containing compound that does not contain a molybdenum element, which are extracted from the silica particles (A) by the mixed solution of ammonia/methanol, and a total extraction amount Y of the molybdenum nitrogen-containing compound and the nitrogen element-containing compound that does not contain a molybdenum element, which are extracted from the silica particles (A) by water (same as X, Y is a mass ratio to the mass of the silica particles (A)) preferably satisfy, for example, $Y/X<0.3$.

The above-described relationship indicates that the nitrogen element-containing compound contained in the silica particles (A) has the properties of not being easily dissolved in water, that is, the properties of not being easily adsorbed onto the moisture in the air. Therefore, in a case where the above-described relationship is satisfied, the silica particles (A) are excellent in charge distribution narrowing and charge distribution retentivity.

The extraction amount X is, for example, preferably 0.25% by mass or more and 6.5% by mass or less with respect to the mass of the silica particles (A). Ideally, the ratio Y/X of the extraction amount Y to the extraction amount X is 0.

The extraction amount X and the extraction amount Y are measured by the following method.

The silica particles are analyzed with a thermogravimetric analyzer (for example, a gas chromatograph mass spectrometer manufactured by Netch Japan Co., Ltd.) at a temperature of 400° C., the mass fractions of compounds in which a hydrocarbon having one or more carbon atoms forms a covalent bond with a nitrogen atom to the silica particles are measured, added up, and adopted as W1.

The silica particles (1 part by mass) are added to 30 parts by mass of an ammonia/methanol solution (manufactured by Sigma-Aldrich Co., LLC., mass ratio of ammonia/methanol=1/5.2) at a liquid temperature of 25° C. and treated with ultrasonic waves for 30 minutes, and then silica powder and an extract are separated. The separated silica particles are dried in a vacuum dryer at 100° C. for 24 hours. Then, by using a thermogravimetric analyzer, the mass fractions of compounds in which a hydrocarbon having one or more carbon atoms forms a covalent bond with a nitrogen atom to the silica particles are measured at 400° C., added up, and adopted as W2.

The silica particles (1 part by mass) are added to 30 parts by mass of water at a liquid temperature of 25° C. and treated with ultrasonic waves for 30 minutes, and then the silica particles and an extract are separated. The separated silica particles are dried in a vacuum dryer at 100° C. for 24 hours. Thereafter, by using a thermogravimetric analyzer, the mass fractions of compounds in which a hydrocarbon having one or more carbon atoms forms a covalent bond with a nitrogen atom to the silica particles are measured at 400° C., added up, and adopted as W3.

From W1 and W2, extraction amount $X=W1-W2$ is calculated.

From W1 and W3, extraction amount $Y=W1-W3$ is calculated.

Hydrophobic Structure

In the silica particles (A), a hydrophobic structure (a structure obtained by treating silica particles with a hydrophobic agent) may adhere to the coating structure of the reaction product of a silane coupling agent.

As the hydrophobic agent, for example, an organosilicon compound is used. Examples of the organosilicon compound include the following compounds:

- an alkoxysilane compound or a halosilane compound having a lower alkyl group, such as methyltrimethoxysilane, dimethyldimethoxysilane, trimethylchlorosilane, and trimethyl methoxy silane;
- an alkoxysilane compound having a vinyl group, such as vinyltrimethoxysilane and vinyltriethoxysilane;
- an alkoxysilane compound having an epoxy group, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane;

an alkoxysilane compound having a styryl group, such as p-styryltrimethoxysilane and p-styryltriethoxysilane;

an alkoxysilane compound having an aminoalkyl group, such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-di methyl-butylidene)propylamine, and N-phenyl-3-aminopropyltrimethoxysilane;

an alkoxysilane compound having an isocyanate alkyl group, such as 3-isocyanatepropyltrimethoxysilane and 3-isocyanatepropyltriethoxysilane; and a silazane compound such as hexamethyldisilazane and tetramethyldisilazane.

From the viewpoint of charge distribution narrowing and charge distribution retentivity, the silica particles (A) preferably have, for example, the following characteristics.

Average Circularity, Average Primary Particle Size, and Number-Based Particle Size Distribution Index The average circularity of the silica particles (A) is, for example, preferably 0.60 or more and 0.96 or less, more preferably 0.65 or more and 0.94 or less, even more preferably 0.70 or more and 0.92 or less, and still more preferably 0.75 or more and 0.90 or less.

The silica particles (A) are, for example, preferably monodisperse particles having one peak in a region of a circularity more than 0.88 in a circularity distribution of the primary particles thereof.

The average primary particle size of the silica particles (A) is, for example, preferably 10 nm or more and 120 nm or less, more preferably 20 nm or more and 100 nm or less, even more preferably 30 nm or more and 90 nm or less, and still more preferably 40 nm or more and 80 nm or less.

The number-based particle size distribution index of the silica particles (A) is, for example, preferably 1.1 or more and 2.0 or less, and more preferably 1.15 or more and 1.6 or less.

The method of measuring the average circularity, average primary particle size, and number-based particle size distribution index of the silica particles (A) is as follows.

Using a scanning electron microscope (SEM) (manufactured by Hitachi High-Tech Corporation, S-4800) equipped with an energy dispersive X-ray analyzer (EDX device) (manufactured by HORIBA, Ltd., EMAX Evolution X-Max 80 mm 2), an image of the toner is captured at a magnification of 40,000. By EDX analysis, based on the presence of a Mo element, a N element, and a Si element, 200 silica particles (A) are identified in one field of view. The image of 200 silica particles (A) is analyzed by the image processing/analysis software WinRoof (MITANI CORPORATION). For each of the primary particle images, an equivalent circular diameter, an area, and a perimeter are calculated, and circularity=4π×(area of particle image)±(perimeter of particle image) 2 is calculated. In the circularity distribution, the circularity below which the cumulative percentage of particles having a lower circularity reaches 50% is defined as an average circularity. In the distribution of equivalent circular diameter, the equivalent circular diameter below which the cumulative percentage of particles having smaller equivalent circular diameter reaches 50% is defined as an average primary particle size. In the distribution of equivalent circular diameter, the particle size below which the cumulative percentage of particles having a smaller equivalent circular diameter reaches 16% is defined as D16, the particle size below which the cumulative percentage of particles having a smaller equivalent circular diameter reaches 84% is defined as D84, and number-based particle size distribution index=$(D84/D16)^{0.5}$ is calculated.

Degree of Hydrophobicity

A degree of hydrophobicity of the silica particles (A) is, for example, preferably 10% or more and 60% or less, more preferably 20% or more and 55% or less, and even more preferably 28% or more and 53% or less.

The method of measuring the degree of hydrophobicity of the silica particles is as follows.

0.2% by mass of the silica particles is added to 50 ml of deionized water. While the mixture is stirred with a magnetic stirrer, methanol is added dropwise thereto from a burette, and the mass fraction of methanol in the mixed solution of methanol/water at a point in time when the entirety of the sample is precipitated is determined and adopted as a degree of hydrophobicity.

Volume Resistivity

A volume resistivity R of the silica particles (A) is, for example, preferably $1.0\times10^{7}$ Ω·cm or more and $1.0\times10^{12.5}$ Ω·cm or less, more preferably $1.0\times10^{7.5}$ Ω·cm or more and $1.0\times10^{12}$ Ω·cm or less, even more preferably $1.0\times10^{8}$ Ω·cm or more and $1.0\times10^{11.5}$ Ω·cm or less, and still more preferably $1.0\times10^{9}$ Ω·cm or more and $1.0\times10^{11}$ Ω·cm or less. The volume resistivity R of the silica particles (A) can be adjusted by the content of the molybdenum nitrogen-containing compound.

In a case where Ra represents a volume resistivity of the silica particles (A) before baking at 350° C. and Rb represents a volume resistivity of the silica particles (A) after baking at 350° C., a ratio Ra/Rb is, for example, preferably 0.01 or more and 0.8 or less, and more preferably 0.015 or more and 0.6 or less.

The volume resistivity Ra (having the same definition as the above-described volume resistivity R) of the silica particles (A) before baking at 350° C. is, for example, preferably $1.0\times10^{7}$ Ω·cm or more and $1.0\times10^{12.5}$ Ω·cm or less, more preferably $1.0\times10^{7.5}$ Ω·cm or more and $1.0\times10^{12}$ Ω·cm or less, even more preferably $1.0\times10^{8}$ Ω·cm or more and $1.0\times10^{11.5}$ Ω·cm or less, and still more preferably $1.0\times10^{9}$ Ω·cm or more and $1.0\times10^{11}$ Ω·cm or less.

The baking at 350° C. is a process of heating the silica particles (A) up to 350° C. at a heating rate of 10° C./min in a nitrogen environment, keeping the silica particles (A) at 350° C. for 3 hours, and cooling the silica particles (A) to room temperature (25° C.) at a cooling rate of 10° C./min.

The volume resistivity of the silica particles (A) is measured as follows in an environment at a temperature of 20° C. and a relative humidity of 50%.

The silica particles (A) are placed on the surface of a circular jig on which a 20 $cm^2$ electrode plate is disposed, such that a silica particle layer having a thickness of about 1 mm or more and 3 mm or less is formed. A 20 $cm^2$ electrode plate is placed on the silica particle layer such that the silica particle layer is interposed between the electrode plates, and in order to eliminate voids between the silica particles, a pressure of 0.4 MPa is applied on the electrode plate. A thickness L (cm) of the silica particle layer is measured. Using an impedance analyzer (manufactured by Solartron Analytical) connected to both the electrodes placed on and under the silica particle layer, a Nyquist plot in a frequency range of 10-3 Hz or more and $10^{6}$ Hz or less is obtained. On the assumption that there are three resistance components, bulk resistance, particle interface resistance, and electrode contact resistance, the plot is fitted to an equivalent circuit, and a bulk resistance R (Ω) is determined.

From the bulk resistance R (Ω) and the thickness L (cm) of the silica particle layer, a volume resistivity ρ (Ω·cm) of the silica particles is calculated by the equation of ρ=R/L.

Amount of OH Groups

The amount of OH groups in the silica particles (A) is, for example, preferably 0.05 OH groups/$nm^2$ or more and 6 OH groups/$nm^2$ or less, more preferably 0.1 OH groups/$nm^2$ or more and 5.5 OH groups/$nm^2$ or less, even more preferably 0.15 OH groups/$nm^2$ or more and 5 OH groups/$nm^2$ or less, still more preferably 0.2 OH groups/$nm^2$ or more and 4 OH groups/$nm^2$ or less, and yet more preferably 0.2 OH groups/$nm^2$ or more and 3 OH groups/$nm^2$ or less.

The amount of OH groups in the silica particles is measured as follows by the Sears method.

1.5 g of the silica particles is added to a mixed solution of 50 g of water/50 g of ethanol, and the mixture is stirred with an ultrasonic homogenizer for 2 minutes, thereby preparing a dispersion. While the dispersion is stirred in an environment at 25° C., 1.0 g of a 0.1 mol/L aqueous hydrochloric acid solution is added dropwise thereto, thereby obtaining a test liquid. The test liquid is put in an automatic titration device, potentiometric titration using a 0.01 mol/L aqueous sodium hydroxide solution is performed, and a differential curve of the titration curve is created. In the inflection point where the differential value of the titration curve is 1.8 or more, the titration amount by which the titration amount of the 0.01 mol/L aqueous sodium hydroxide solution is maximized is denoted by E.

From the following equation, a surface silanol group density ρ (number of surface silanol groups/$nm^2$) in the silica particles is calculated and adopted as the amount of OH groups in the silica particles.

$$\rho=((0.01\times E-0.1)\times NA/1{,}000)/(m\times S_{BET}\times 10^{18}) \qquad \text{Equation:}$$

E: titration amount by which the titration amount of the 0.01 mol/L aqueous sodium hydroxide solution is maximized in the inflection point where the differential value of the titration curve is 1.8 or more, NA: Avogadro's number, M: amount of silica particles (1.5 g), $S_{BET}$: BET specific surface area of silica particles ($m^2$/g) measured by the three-point nitrogen adsorption method (relative equilibrium pressure is 0.3.)

Pore Diameter

For example, in a pore size distribution curve obtained by a nitrogen gas adsorption method, the silica particles (A) preferably have a first peak in a range of pore diameter of 0.01 nm or more and 2 nm or less and a second peak in a range of pore diameter of 1.5 nm or more and 50 nm or less, more preferably have a second peak in a range of pore diameter of 2 nm or more and 50 nm or less, even more preferably have a second peak in the range of pore diameter of 2 nm or more and 40 nm or less, and particularly preferably have a second peak in a range of pore diameter of 2 nm or more and 30 nm or less.

In a case where the first peak and the second peak are in the above range, the molybdenum nitrogen-containing compound enters deeply into the pores of the coating structure, and the charge distribution is narrowed.

The method of obtaining the pore size distribution curve by the nitrogen gas adsorption method is as follows.

The silica particles are cooled to the temperature of liquid nitrogen (−196° C.), nitrogen gas is introduced, and the amount of nitrogen gas adsorbed is determined by a constant volume method or a gravimetric method. The pressure of nitrogen gas introduced is slowly increased, and the amount of nitrogen gas adsorbed is plotted for each equilibrium pressure, thereby creating an adsorption isotherm. From the adsorption isotherm, a pore size distribution curve in which the ordinate shows a frequency and the abscissa shows a pore diameter is obtained by the equation of the BJH method. From the obtained pore size distribution curve, an integrated pore volume distribution in which the ordinate shows a volume and the abscissa shows a pore diameter is obtained, and the position of the peak of the pore diameter is checked.

From the viewpoint of charge distribution narrowing and charge distribution retentivity, the silica particles (A) preferably satisfy, for example, any of the following aspects (A) and (B).

Aspect (A): an aspect in which in a case where A represents a pore volume of pores having a diameter of 1 nm or more and 50 nm or less determined from a pore size distribution curve obtained by a nitrogen gas adsorption method before baking at 350° C., and B represents a pore volume of pores having a diameter of 1 nm or more and 50 nm or less determined from a pore size distribution curve obtained by a nitrogen gas adsorption method after baking at 350° C., a ratio B/A is 1.2 or more and 5 or less, and B is 0.2 $cm^3$/g or more and 3 $cm^3$/g or less.

Hereinafter, the "pore volume A of pores having a diameter of 1 nm or more and 50 nm or less determined from a pore size distribution curve obtained by a nitrogen gas adsorption method before baking at 350° C." is referred to as "pore volume A before baking at 350° C.", and the "pore volume B of pores having a diameter of 1 nm or more and 50 nm or less determined from a pore size distribution curve obtained by a nitrogen gas adsorption method after baking at 350° C." is referred to as "pore volume B after baking at 350° C.".

The baking at 350° C. is a process of heating the silica particles (A) up to 350° C. at a heating rate of 10° C./min in a nitrogen environment, keeping the silica particles (A) at 350° C. for 3 hours, and cooling the silica particles (A) to room temperature (25° C.) at a cooling rate of 10° C./min.

The method of measuring the pore volume is as follows.

The silica particles are cooled to the temperature of liquid nitrogen (−196° C.), nitrogen gas is introduced, and the amount of nitrogen gas adsorbed is determined by a constant volume method or a gravimetric method. The pressure of nitrogen gas introduced is slowly increased, and the amount of nitrogen gas adsorbed is plotted for each equilibrium pressure, thereby creating an adsorption isotherm. From the adsorption isotherm, a pore size distribution curve in which the ordinate shows a frequency and the abscissa shows a pore diameter is obtained by the equation of the BJH method. From the obtained pore size distribution curve, an integrated pore volume distribution in which the ordinate shows a volume and the abscissa shows a pore diameter is obtained. From the obtained integrated pore volume distribution, an integral value of pore volumes of pores having a diameter in a range of 1 nm or more and 50 nm or less is calculated and adopted as the "pore volume of pores having a diameter of 1 nm or more and 50 nm or less".

The ratio B/A of the pore volume B after baking at 350° C. to the pore volume A before baking at 350° C. is, for example, preferably 1.2 or more and 5 or less, more preferably 1.4 or more and 3 or less, and even more preferably 1.4 or more and 2.5 or less.

The pore volume B after baking at 350° C. is, for example, preferably 0.2 $cm^3$/g or more and 3 $cm^3$/g or less, more preferably 0.3 $cm^3$/g or more and 1.8 $cm^3$/g or less, and even more preferably 0.6 $cm^3$/g or more and 1.5 $cm^3$/g or less.

The aspect (A) is an aspect in which a sufficient amount of the nitrogen element-containing compound is adsorbed onto at least some of the pores of the silica particles.

Aspect (B): an aspect in which in a case where C represents an integral value of signals observed in a range of chemical shift of −50 ppm or more and −75 ppm or less in a $^{29}Si$ solid-state nuclear magnetic resonance (NMR) spectrum obtained by a cross-polarization/magic angle spinning (CP/MAS) method (hereinafter, also called "Si-CP/MAS NMR spectrum"), and D represents an integral value of signals observed in a range of chemical shift of −90 ppm or more and −120 ppm or less in the same spectrum, a ratio C/D is 0.10 or more and 0.75 or less.

The Si-CP/MAS NMR spectrum can be obtained by measuring a sample by nuclear magnetic resonance spectroscopy under the following conditions.

Spectrometer: AVANCE 300 (manufactured by Bruker)
Resonance frequency: 59.6 MHz
Measurement nucleus: $^{29}Si$
Measurement method: CPMAS method (using Bruker's standard ParC sequence cp.av)
Waiting time: 4 sec
Contact time: 8 ms
Number of times of integration: 2,048
Measurement temperature: room temperature (25° C., measured temperature)
Center frequency of observation: −3975.72 Hz
MAS rotation speed: 7.0 mm-6 kHz
Reference substance: hexamethylcyclotrisiloxane The ratio C/D is, for example, preferably 0.10 or more and 0.75 or less, more preferably 0.12 or more and 0.45 or less, and even more preferably 0.15 or more and 0.40 or less.

In a case where the integral value of all signals in Si-CP/MAS NMR spectrum is regarded as 100%, the ratio of the integral value C (Signal ratio) of the signals observed in a range of chemical shift of −50 ppm or more and −75 ppm or less is, for example, preferably 5% or more, and more preferably 7% or more. The upper limit of the ratio of the integral value C of the signals is, for example, 60% or less.

The aspect (B) is an aspect having a low-density coating structure in which a sufficient amount of a nitrogen element-containing compound can be adsorbed onto at least a part of the surface of silica particles. The low-density coating structure is, for example, a coating structure consisting of a reaction product of a silane coupling agent (particularly, a trifunctional silane coupling agent), that is a $SiO_{2/3}CH_3$ layer, for example.

Manufacturing Method of Silica Particles (A)

An example of a manufacturing method of the silica particles (A) has a first step of forming a coating structure consisting of a reaction product of a silane coupling agent on at least a part of a surface of silica base particles, and a second step of attaching a molybdenum nitrogen-containing compound to the coating structure. The present manufacturing method may further have a third step of performing a hydrophobic treatment on the silica base particles having the coating structure after the second step or during the second step. Hereinafter, the above steps will be specifically described.

Silica Base Particles

The silica base particles are prepared, for example, by the following step (i) or step (ii).

Step (i): a step of mixing an alcohol-containing solvent with silica base particles to prepare a silica base particle suspension.

Step (ii): a step of granulating silica base particles by a sol-gel method to obtain a silica base particle suspension.

The silica base particles used in the step (i) may be dry silica or wet silica. Specific examples thereof include sol-gel silica, aqueous colloidal silica, alcoholic silica, fumed silica, molten silica, and the like.

The alcohol-containing solvent used in the step (i) may be a solvent composed only of an alcohol or a mixed solvent of an alcohol and other solvents. Examples of the alcohol include lower alcohols such as methanol, ethanol, n-propanol, isopropanol, and butanol. Examples of other solvents include water; ketones such as acetone, methyl ethyl ketone, and methyl isobutyl ketone; cellosolves such as methyl cellosolve, ethyl cellosolve, butyl cellosolve, and cellosolve acetate; and ethers such as dioxane and tetrahydrofuran. In the case of the mixed solvent, the proportion of the alcohol is, for example, preferably 80% by mass or more, and more preferably 85% by mass or more.

The step (ii) is, for example, preferably a sol-gel method including an alkali catalyst solution preparation step of preparing an alkali catalyst solution composed of an alcohol-containing solvent containing an alkali catalyst and a silica base particle generation step of supplying tetraalkoxysilane and an alkali catalyst to the alkali catalyst solution to generate silica base particles.

The alkali catalyst solution preparation step is, for example, preferably a step of preparing an alcohol-containing solvent and mixing the solvent with an alkali catalyst to obtain an alkali catalyst solution.

The alcohol-containing solvent may be a solvent composed only of an alcohol or a mixed solvent of an alcohol and other solvents. Examples of the alcohol include lower alcohols such as methanol, ethanol, n-propanol, isopropanol, and butanol. Examples of other solvents include water; ketones such as acetone, methyl ethyl ketone, and methyl isobutyl ketone; cellosolves such as methyl cellosolve, ethyl cellosolve, butyl cellosolve, and cellosolve acetate; and ethers such as dioxane and tetrahydrofuran. In the case of the mixed solvent, the proportion of the alcohol is, for example, preferably 80% by mass or more, and more preferably 85% by mass or more.

The alkali catalyst is a catalyst for accelerating the reaction of tetraalkoxysilane (a hydrolysis reaction and a condensation reaction). Examples thereof include basic catalysts such as ammonia, urea, and monoamine. Among these, for example, ammonia is particularly preferable.

The concentration of the alkali catalyst in the alkali catalyst solution is, for example, preferably 0.5 mol/L or more and 1.5 mol/L or less, more preferably 0.6 mol/L or more and 1.2 mol/L or less, and even more preferably 0.65 mol/L or more and 1.1 mol/L or less.

The silica base particle generation step is a step of supplying tetraalkoxysilane and an alkali catalyst to the alkali catalyst solution and reacting the tetraalkoxysilane (a hydrolysis reaction and condensation reaction) in the alkali catalyst solution to generate silica base particles.

In the silica base particle generation step, core particles are generated by the reaction of the tetraalkoxysilane at the early stage of supplying tetraalkoxysilane (core particle generation stage), and then silica base particles are generated through the growth of the core particles (core particle growth stage).

Examples of the tetraalkoxysilane include tetramethoxysilane, tetraethoxysilane, tetrapropoxysilane, and tetrabutoxysilane. From the viewpoint of controlling the reaction rate or uniformity of the shape of the silica base particles to be generated, for example, tetramethoxysilane or tetraethoxysilane is preferable.

Examples of the alkali catalyst supplied to the alkali catalyst solution include basic catalysts such as ammonia, urea, and monoamine. Among these, for example, ammonia is particularly preferable. The alkali catalyst supplied together with the tetraalkoxysilane may be of the same type as or different type from the alkali catalyst contained in the alkali catalyst solution in advance. For example, it is preferable that the alkali catalysts be of the same type.

The method for supplying the tetraalkoxysilane and the alkali catalyst to the alkali catalyst solution may be a continuous supply method or an intermittent supply method.

In the silica base particle generation step, the temperature of the alkali catalyst solution (temperature at the time of supply) is, for example, preferably 5° C. or higher and 50° C. or lower, and more preferably 15° C. or higher and 45° C. or lower.

First Step

The first step is, for example, a step of adding a silane coupling agent to the silica base particle suspension, and reacting the silane coupling agent on the surface of the silica base particles such that the coating structure consisting of a reaction product of the silane coupling agent is formed.

The reaction of the silane coupling agent is carried out, for example, by adding the silane coupling agent to the silica base particle suspension and then heating the suspension with stirring. Specifically, for example, the suspension is heated to a temperature of 40° C. or higher and 70° C. or lower, a silane coupling agent is added thereto, and then the mixture is stirred. The stirring is continued, for example, preferably for 10 minutes or more and 24 hours or less, more preferably for 60 minutes or more and 420 minutes or less, and even more preferably 80 minutes or more and 300 minutes or less.

Second Step

The second step is, for example, preferably a step of attaching a molybdenum nitrogen-containing compound to pores of the coating structure consisting of the reaction product of the silane coupling agent.

In the second step, for example, a molybdenum nitrogen-containing compound is added to a silica base particle suspension obtained after the reaction with a silane coupling agent, and the mixture is stirred at a liquid temperature kept at a temperature range of 20° C. or higher and 50° C. or lower. The molybdenum nitrogen-containing compound may be added to the silica particle suspension, as an alcohol solution containing the molybdenum nitrogen-containing compound. The alcohol may be of the same type as or different type from the alcohol contained in the silica base particle suspension. For example, it is preferable that the alcohols be of the same type. In the alcohol solution containing the molybdenum nitrogen-containing compound, the concentration of the molybdenum nitrogen-containing compound is, for example, preferably 0.05% by mass or more and 10% by mass or less, and more preferably 0.1% by mass or more and 6% by mass or less.

Third Step

The third step is a step of additionally attaching a hydrophobic structure to the coating structure consisting of the reaction product of the silane coupling agent. The third step is a hydrophobic treatment step performed after the second step or during the second step. The functional groups of the hydrophobic agent react with one another and/or react with the OH groups of the silica base particles, thereby forming a hydrophobic layer.

In the third step, for example, a molybdenum nitrogen-containing compound is added to the silica base particle suspension obtained after the reaction with the silane coupling agent, and then the hydrophobic agent is added thereto. At this time, for example, it is preferable to stir and heat the suspension. For example, the suspension is heated to a temperature of 40° C. or higher and 70° C. or lower, a hydrophobic agent is added thereto, and then the mixture is stirred. The stirring is continued, for example, preferably for 10 minutes or more and 24 hours or less, more preferably for 20 minutes or more and 120 minutes or less, and even more preferably 20 minutes or more and 90 minutes or less.

Drying Step

For example, it is preferable to perform a drying step of removing solvents from the suspension after the second or third step is performed or while the second or third step is being performed. Examples of the drying method include heat drying, spray drying, and supercritical drying.

Spray drying can be performed by a conventionally known method using a spray dryer (such as a rotary disk spray dryer or a nozzle spray dryer). For example, in a hot air stream, the silica particle suspension is sprayed at a rate of 0.2 L/hour or more and 1 L/hour or less. The temperature of hot air is set such that, for example, the inlet temperature of the spray dryer is preferably in a range of 70° C. or higher and 400° C. or lower and the outlet temperature of the spray dryer is preferably in a range of 40° C. or higher and 120° C. or lower. The inlet temperature is, for example, more preferably in a range of 100° C. or higher and 300° C. or lower. The silica particle concentration in the silica particle suspension is, for example, preferably 10% by mass or more and 30% by mass or less.

Examples of the substance used as the supercritical fluid for supercritical drying include carbon dioxide, water, methanol, ethanol, acetone, and the like. From the viewpoint of treatment efficiency and from the viewpoint of suppressing the occurrence of coarse particles, the supercritical fluid is, for example, preferably supercritical carbon dioxide. Specifically, a step of using supercritical carbon dioxide is performed, for example, by the following operation.

The suspension is put in an airtight reaction vessel, and then liquefied carbon dioxide is introduced into the reaction vessel. Thereafter, the airtight reaction vessel is heated, and the internal pressure of the airtight reaction vessel is raised using a high-pressure pump such that the carbon dioxide in the airtight reaction vessel is in a supercritical state. Then, the liquefied carbon dioxide is caused to flow into the airtight reaction vessel, and the supercritical carbon dioxide is discharged from the airtight reaction vessel, such that the supercritical carbon dioxide circulates in the suspension in the airtight reaction vessel. While the supercritical carbon dioxide circulates through the suspension, the solvent dissolves in the supercritical carbon dioxide and is removed along with the supercritical carbon dioxide discharged from the airtight reaction vessel. The internal temperature and pressure of the airtight reaction vessel are set such that the carbon dioxide is in a supercritical state. Since the critical point of carbon dioxide is 31.1° C./7.38 MPa, for example, the temperature is set to 40° C. or higher and 200° C. or lower, and the pressure is set to 10 MPa or higher and 30 MPa or lower. The flow rate of the supercritical fluid in the airtight reaction vessel is, for example, preferably 80 mL/sec or more and 240 mL/sec or less.

It is preferable that the obtained silica particles, for example, be disintegrated or sieved such that coarse particles and aggregates are removed. The silica particles are disintegrated, for example, by a dry pulverizer such as a jet mill, a vibration mill, a ball mill, or a pin mill. The silica particles are sieved, for example, by a vibrating sieve, a pneumatic sieving machine, or the like.

Silica Particles (B)

The toner according to the present exemplary embodiment preferably contains, for example, silica particles other than the silica particles (A). In the present disclosure, silica particles other than the silica particles (A) are referred to as silica particles (B).

The silica particles (B) may contain a nitrogen element-containing compound containing a molybdenum element, and in this case, a ratio $N_{Mo}/Ns$, of Net intensity $N_{Mo}$ of the molybdenum element measured by X-ray fluorescence analysis to Net intensity Ns, of a silicon element measured by X-ray fluorescence analysis is less than 0.035 or more than 0.45.

The silica particles (B) are, for example, preferably silica particles that do not contain the nitrogen element-containing compound containing a molybdenum element.

As the silica particles (B), for example, hydrophobic silica particles (B) obtained by treating the surface of silica particles, such as sol-gel silica, aqueous colloidal silica, alcoholic silica, fumed silica, and molten silica, with a hydrophobic agent (for example, hexamethyldisilazane, a silane-based coupling agent, a titanate-based coupling agent, an aluminum-based coupling agent, or a silicone oil) are preferable.

The toner according to the present exemplary embodiment preferably contains, for example at least silica particles (B) surface-treated with an oil. The silica particles function as a source of supplying a liberated oil for the toner. Details of the liberated oil will be described later.

Examples of the oil of the silica particles (B) surface-treated with an oil include a silicone oil, a paraffin oil, a fluorine oil, and a vegetable oil, and for example, a silicone oil is preferable, and dimethyl silicone oil (that is, dimethylpolysiloxane) is more preferable. That is, as the silica particles (B) surface-treated with an oil, for example, silica particles (B) surface-treated with a silicone oil are preferable, and silica particles (B) surface-treated with dimethyl silicone oil (that is, dimethylpolysiloxane) are more preferable.

The amount of the silica particles (B) surface-treated with an oil externally added with respect to 100 parts by mass of the toner particles is, for example, preferably 0.3 parts by mass or more and 3.0 parts by mass or less, more preferably 0.5 parts by mass or more and 2.5 parts by mass or less, and even more preferably 1.0 part by mass or more and 2.0 parts by mass or less.

The amount of the silica particles (B) surface-treated with dimethyl silicone oil externally added with respect to 100 parts by mass of the toner particles is, for example, preferably 0.3 parts by mass or more and 3.0 parts by mass or less, more preferably 0.5 parts by mass or more and 2.5 parts by mass or less, and even more preferably 1.0 part by mass or more and 2.0 parts by mass or less.

The toner according to the present exemplary embodiment may contain a plurality of types (for example, two types or three types) of silica particles (B) in which the types of hydrophobic agents are different from each other. Examples of a form of the toner include a toner that contains silica particles (B) surface-treated with hexamethyldisilazane and silica particles (B) surface-treated with a silicone oil; a toner that contains silica particles (B) surface-treated with a silane-based coupling agent and silica particles (B) surface-treated with a silicone oil; and a toner that contains silica particles (B) surface-treated with hexamethyldisilazane, silica particles (B) surface-treated with a silane-based coupling agent, and silica particles (B) surface-treated with a silicone oil.

From the viewpoint of being difficult to move on the surface of the toner particles, the average circularity of the silica particles (B) is, for example, preferably 0.78 or more and 0.93 or less, more preferably 0.79 or more and 0.91 or less, and even more preferably 0.80 or more and 0.90 or less.

In a case where the toner according to the present exemplary embodiment contains a plurality of types of the silica particles (B) in which the types of the hydrophobic agents are different from each other, for example, it is preferable that each silica particle (B) is within the above-described range.

The average circularity of the silica particles (B) means a circularity in which the cumulative percentage from the smaller side in the distribution of circularity is 50%. The circularity is calculated from the area and the perimeter of each of the primary particle images by an expression of circularity=$4\pi\times$(area of particle image)÷(perimeter of particle image)$^2$.

The distribution of the primary particle size of the silica particles (B) may be monomodal, bimodal, or multimodal (for example, trimodal).

In a case where the distribution of the primary particle size of the silica particles (B) is monomodal, the value of the primary particle size of the peak is, for example, preferably 20 nm or more and 150 nm or less, more preferably 30 nm or more and 140 nm or less, and even more preferably 40 nm or more and 130 nm or less.

In a case where the distribution of the primary particle size of the silica particles (B) is bimodal, the value of the primary particle size of the peak from the small size side is, for example, preferably 20 nm or more and less than 80 nm, more preferably 30 nm or more and 70 nm or less, and even more preferably 40 nm or more and 60 nm or less; and the value of the primary particle size of the peak from the large size side is, for example, preferably 80 nm or more and 150 nm or less, more preferably 90 nm or more and 140 nm or less, and even more preferably 100 nm or more and 130 nm or less.

In the distribution of the primary particle size of the silica particles (B), the toner according to the present exemplary embodiment preferably has, for example, at least one peak in a primary particle size range of 80 nm or more and 150 nm or less, which means that the toner contains silica particles (B) having a relatively large particle size. Since the silica particles (B) having a relatively large particle size function as a spacer between the toner particles, aggregation of the toner particles is suppressed, and the fluidity of the toner is maintained.

The amount of the silica particles (B), that exhibits one peak in the primary particle size range of 80 nm or more and 150 nm or less, externally added with respect to 100 parts by mass of the toner particles is, for example, preferably 0.3 parts by mass or more and 3.0 parts by mass or less, more preferably 0.5 parts by mass or more and 2.5 parts by mass or less, and even more preferably 1.0 part by mass or more and 2.0 parts by mass or less.

In a case where the amount of the silica particles (B) externally added, that produces one peak in the primary particle size range of 80 nm or more and 150 nm or less, is within the above-described range, the silica particles (A) are more efficiently fixed electrostatically to the surface of the toner particles containing the resin particles.

The method for obtaining the particle size distribution of the silica particles (B) is as follows.

Using a scanning electron microscope (SEM) (manufactured by Hitachi High-Tech Corporation, S-4800) equipped with an energy dispersive X-ray analyzer (EDX device) (manufactured by HORIBA, Ltd., EMAX Evolution X-Max 80 $mm^2$), an image of the toner is captured at a magnification of 40,000. By EDX analysis, based on the presence of a Mo element, a N element, and a Si element, the silica particles (A) are excluded, and 1000 silica particles (B) that are silica particles other than the silica particles (A) are identified in one field of view. The image of 1000 silica particles (B) is analyzed by the image processing/analysis software WinRoof (MITANI CORPORATION). The equivalent circular diameter of each of the primary particle images is obtained, and a histogram is created from the small size side of the equivalent circular diameter.

The average primary particle size means an equivalent circular diameter in which the cumulative percentage from the small size side in the distribution of the equivalent circular diameter is 50%. In a case where the distribution of the primary particle size is bimodal, the average primary particle size can be obtained for each peak.

The total amount of the silica particles (B) externally added with respect to 100 parts by mass of the toner particles is, for example, preferably 0.5 parts by mass or more and 10 parts by mass or less, more preferably 1 part by mass or more and 8 parts by mass or less, and even more preferably 2 parts by mass or more and 6 parts by mass or less.

Strontium Titanate Particles

The toner according to the present exemplary embodiment may contain strontium titanate particles.

The strontium titanate particles have a perovskite structure as a crystal structure, and usually have a cubic or rectangular particle shape. In the present exemplary embodiment, the shape of the strontium titanate particles is, for example, preferably a roundish shape rather than a cubic or rectangular shape for reasons 1 and 2 below. By doping the strontium titanate particles with a metal element (dopant) other than titanium and strontium, the roundish shape can be obtained.

Reason 1: in a case of a roundish shape, the strontium titanate particles are less likely to be embedded on the surface of the toner particles and are easily fixed.

Reason 2: in cubic or rectangular strontium titanate particles, that is, strontium titanate particles with corners, it is considered that electric charge concentrates on the corners, and a large electrostatic repulsive force acts locally between the corners of the strontium titanate particles and the silica particles (A), that tends to cause uneven distribution of the silica particles (A). In order not to cause the uneven distribution of the silica particles (A), the shape of the strontium titanate particles is, for example, preferably a shape having few corners, that is, the roundish shape.

In the strontium titanate particles, a half-width of a peak at a (110) plane obtained by X-ray diffraction method is, for example, preferably 0.2° or more and 2.0° or less, and more preferably 0.2° or more and 1.0° or less.

The peak at the (110) plane of the strontium titanate particles, obtained by X-ray diffraction method, is a peak appearing in the vicinity of a diffraction angle of 2θ=32°. The peak corresponds to a peak at a (110) plane of a perovskite crystal.

Strontium titanate particles having a particle shape of a cubic or rectangular shape have high crystallinity of perovskite crystals, and the half-width of the peak at the (110) plane is usually less than 0.2°. For example, in an analysis of SW-350 (strontium titanate particles in which a major particle shape is a cube) manufactured by Titan Kogyo, Ltd., the half-width of the peak at the (110) plane is 0.15°.

On the other hand, in the strontium titanate particles having a roundish shape, the crystallinity of perovskite crystals is relatively low, and the half-width of the peak at the (110) plane is widened.

For example, the strontium titanate particles preferably have a roundish shape, and as one of indexes of the roundish shape, the half-width of the peak at the (110) plane is, for example, preferably 0.2° or more and 2.0° or less, more preferably 0.2° or more and 1.0° or less, and even more preferably 0.2° or more and 0.5° or less.

The X-ray diffraction of the strontium titanate particles is measured using an X-ray diffractometer (for example, trade name RINT Ultima-III manufactured by Rigaku Corporation). As measurement settings, radiation source: CuKα, voltage: 40 kV, current: 40 mA, sample rotation speed: no rotation, divergence slit: 1.00 mm, divergence longitudinal limiting slit: 10 mm, scattering slit: open, receiving slit: open, scanning mode: FT, counting time: 2.0 seconds, step width: 0.0050°, and operation axis: 10.0000° to 70.0000°. In the present disclosure, the half-width of the peak in the X-ray diffraction pattern is a full width at half maximum.

The strontium titanate particles are, for example, preferably doped with a metal element other than titanium and strontium (dopant). In a case where the strontium titanate particles contain the dopant, crystallinity of a perovskite structure is reduced, and the strontium titanate particles have a roundish shape.

The dopant of the strontium titanate particles is not particularly limited as long as the dopant is a metal element other than titanium and strontium. One kind of dopant may be used alone, or two or more kinds of dopants may be used in combination.

The dopant of the strontium titanate particles is, for example, preferably a metal element having an ionic radius, that can enter the crystal structure configuring the strontium titanate particles in a case of being ionized. From this viewpoint, the dopant of the strontium titanate particles is, for example, preferably a metal element having an ionic radius of 40 pm or more and 200 μm or less, and more preferably a metal element having an ionic radius of 60 pm or more and 150 μm or less in a case of being ionized.

Specifically, examples of the dopant of the strontium titanate particles include lanthanoid, silica, aluminum, magnesium, calcium, barium, phosphorus, sulfur, vanadium, chromium, manganese, iron, cobalt, nickel, copper, gallium, yttrium, zinc, niobium, molybdenum, ruthenium, rhodium, palladium, silver, indium, tin, antimony, tantalum, tungsten, rhenium, osmium, iridium, platinum, and bismuth. As lanthanoid, for example, lanthanum or cerium is preferable. Among these, from the viewpoint of ease of doping and ease of control of the shape of the strontium titanate particles, for example, lanthanum is preferable.

As the dopant of the strontium titanate particles, from the viewpoint of not excessively negatively charging the strontium titanate particles, for example, a metal element having an electronegativity of 2.0 or less is preferable, and a metal element having an electronegativity of 1.3 or less is more preferable. The electronegativity in the present exemplary embodiment is Allred-Rochow electronegativity. Examples of the metal element having an electronegativity of 2.0 or less include lanthanum (electronegativity: 1.08), magnesium (1.23), aluminum (1.47), silica (1.74), calcium (1.04), vanadium (1.45), chromium (1.56), manganese (1.60), iron (1.64), cobalt (1.70), nickel (1.75), copper (1.75), zinc (1.66), gallium (1.82), yttrium (1.11), zirconium (1.22), niobium (1.23), silver (1.42), indium (1.49), tin (1.72), barium (0.97), tantalum (1.33), rhenium (1.46), and cerium (1.06).

From the viewpoint of allowing the strontium titanate particles to have the perovskite crystal structure and a roundish shape, in the strontium titanate particles, the amount of the dopant with respect to strontium is, for example, preferably in a range of 0.1 mol % or more and 20 mol % or less, more preferably in a range of 0.1 mol % or more and 15 mol % or less, even more preferably in a range of 0.1 mol % or more and 10 mol % or less, and still more preferably in a range of 0.2 mol % or more and 5 mol % or less.

From the viewpoint of improving the action of the strontium titanate particles, the strontium titanate particles are, for example, preferably strontium titanate particles with surface having undergone a hydrophobic treatment, and more preferably strontium titanate particles with surface having undergone a hydrophobic treatment using a silicon-containing organic compound.

The strontium titanate particles preferably have, for example, an average primary particle size of 10 mm or more and 100 nm or less. In a case where the average primary particle size of the strontium titanate particles is 10 nm or more, the strontium titanate particles are less likely to be embedded in the toner particles. In a case where the average primary particle size of the strontium titanate particles is 100 nm or less, uniformity is high and the particles are easily dispersed on the surface of the toner particles.

From the above-described viewpoints, the average primary particle size of the strontium titanate particles is, for example, more preferably 20 nm or more and 90 nm or less, even more preferably 25 nm or more and 80 nm or less, and still more preferably 40 nm or more and 70 nm or less.

The average primary particle size of the strontium titanate particles is measured by the following method.

Using a scanning electron microscope (SEM) (manufactured by Hitachi High-Tech Corporation, S-4800) equipped with an energy dispersive X-ray analyzer (EDX device) (manufactured by HORIBA, Ltd., EMAX Evolution X-Max 80 $mm^2$), a toner containing the strontium titanate particles is imaged at a magnification of 40,000. By EDX analysis, 1000 primary strontium titanate particles are identified based on the presence of Ti element and Sr element in one field of view. By the analysis of the 1000 strontium titanate particles with the image processing/analysis software WinRoof (MITANI CORPORATION), the equivalent circular diameter of each of the primary particle images is determined. In the distribution of equivalent circular diameter, the equivalent circular diameter below which the cumulative percentage of particles having smaller equivalent circular diameter reaches 50% is defined as an average primary particle size.

The average primary particle size of the strontium titanate particles can be controlled, for example, by various conditions adopted in manufacturing the strontium titanate particles by a wet manufacturing method.

The amount of the strontium titanate particles externally added with respect to 100 parts by mass of the toner particles is, for example, preferably 0.1 parts by mass or more and 3.0 parts by mass or less, more preferably 0.2 parts by mass or more and 2.0 parts by mass or less, and even more preferably 0.3 parts by mass or more and 1.0 part by mass or less.

The amount of the lanthanum-doped strontium titanate particles externally added with respect to 100 parts by mass of the toner particles is, for example, preferably 0.1 parts by mass or more and 3.0 parts by mass or less, more preferably 0.2 parts by mass or more and 2.0 parts by mass or less, and even more preferably 0.3 parts by mass or more and 1.0 part by mass or less.

From the viewpoint of improving dispersibility of both particles and improving the fluidity of the toner, a mass-based ratio M1/M2 of a content M2 of the strontium titanate particles to a content M1 of the silica particles (A) contained in the toner is, for example, preferably 0.5 or more and 1.5 or less, more preferably 0.7 or more and 1.3 or less, and even more preferably 0.9 or more and 1.1 or less.

From the viewpoint of improving dispersibility of both particles and improving the fluidity of the toner, a mass-based ratio M1/M2 of a content M2 of the lanthanum-doped strontium titanate particles to a content M1 of the silica particles (A) contained in the toner is, for example, preferably 0.5 or more and 1.5 or less, more preferably 0.7 or more and 1.3 or less, and even more preferably 0.9 or more and 1.1 or less.

Manufacturing Method of Strontium Titanate Particles

The strontium titanate particles may be strontium titanate particles themselves, or may be particles obtained by hydrophobizing a surface of the strontium titanate particles. The manufacturing method of the strontium titanate particles is not particularly limited, but from the viewpoint of controlling the particle size and shape, the manufacturing method is preferably a wet manufacturing method.

The wet manufacturing method of the strontium titanate particles is, for example, a manufacturing method of causing a reaction in a state of adding an alkaline aqueous solution to a mixed solution of a titanium oxide source and a strontium source, and then performing an acid treatment. In this manufacturing method, the particle size of the strontium titanate particles is controlled by a mixing proportion of the titanium oxide source and the strontium source, the concentration of the titanium oxide source at the initial state of reaction, the temperature during the addition of the alkaline aqueous solution, the addition rate of the alkaline aqueous solution, and the like.

As the titanium oxide source, for example, a substance that is obtained by deflocculating a titanium compound hydrolysate by a mineral acid is preferable. Examples of the strontium source include strontium nitrate and strontium chloride.

The mixing proportion of the titanium oxide source and the strontium source is, for example, preferably 0.9 or more and 1.4 or less, and more preferably 1.05 or more and 1.20 or less in terms of $SrO/TiO_2$ molar ratio. The concentration of the titanium oxide source, that is $TiO_2$, at the initial state of reaction is, for example, preferably 0.05 mol/L or more and 1.3 mol/L or less, and more preferably 0.5 mol/L or more and 1.0 mol/L or less.

From the viewpoint of allowing the strontium titanate particles to have a roundish shape instead of a cubic or rectangular shape, for example, it is preferable to add a dopant source to the mixed solution of the titanium oxide source and the strontium source. Examples of the dopant source include oxides of metals other than titanium and strontium. The metal oxide as a dopant source is added, for example, as a solution obtained by dissolving the metal oxide in nitric acid, hydrochloric acid, or sulfuric acid. The amount of the dopant source added with respect to 100 mol of strontium contained in the strontium source is, for example, preferably an amount that a metal content in the dopant source is 0.1 mol or more and 20 mol or less, more preferably an amount that a metal content in the dopant source is 0.1 mol or more and 15 mol or less, even more preferably an amount that a metal content in the dopant source is 0.1 mol or more and 10 mol or less, and still more preferably an amount that a metal content in the dopant source is 0.2 mol or more and 5 mol or less.

As the alkaline aqueous solution, for example, an aqueous sodium hydroxide solution is preferable. As the temperature of the reaction solution during the addition of the alkaline aqueous solution is higher, strontium titanate particles having better crystallinity are obtained. From the viewpoint of allowing the strontium titanate particles to have the perovskite crystal structure and the roundish shape, the temperature of the reaction solution during the addition of the alkaline aqueous solution is, for example, preferably in a range of 60° C. or higher and 100° C. or lower. In regard to the addition rate of the alkaline aqueous solution, strontium titanate particles with a larger particle size are obtained as the addition rate decreases, and strontium titanate particles with a smaller particle size are obtained as the addition rate increases. The addition rate of the alkaline aqueous solution is, for example, 0.001 equivalents/h or more and 1.2 equivalents/h or less with respect to the prepared raw materials. A proper addition rate of the alkaline aqueous solution is 0.002 equivalents/h or more and 1.1 equivalents/h or less.

After the addition of the alkaline aqueous solution, an acid treatment is performed for the purpose of removing the unreacted strontium source. In the acid treatment, for example, by using hydrochloric acid, the pH of the reaction solution is adjusted to 2.5 to 7.0, preferably to 4.5 to 6.0. After the acid treatment, the reaction solution is solid-liquid separated, and the solid content is subjected to a drying treatment, thereby obtaining strontium titanate particles.

The surface treatment for the strontium titanate particles is performed, for example, by preparing a treatment liquid obtained by mixing a silicon-containing organic compound as a hydrophobic agent with a solvent, mixing the treatment liquid with the strontium titanate particles under stirring, and continuing stirring. After the surface treatment, for the purpose of removing the solvent in the treatment liquid, a drying treatment is performed.

Examples of the silicon-containing organic compound used in the surface treatment for the strontium titanate particles include an alkoxysilane compound, a silazane compound, and a silicone oil.

Examples of the alkoxysilane compound used in the surface treatment for the strontium titanate particles include tetramethoxysilane, tetraethoxysilane; methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane; dimethyldimethoxysilane, dimethyldiethoxysilane, methylvinyldimethoxysilane, methylvinyldiethoxysilane, diphenyldimethoxysilane, diphenyldiethoxysilane; and trimethylmethoxysilane and trimethylethoxysilane.

Examples of the silazane compound used in the surface treatment for the strontium titanate particles include dimethyldisilazane, trimethyldisilazane, tetramethyldisilazane, pentamethyldisilazane, and hexamethyldisilazane.

Examples of the silicone oil used in the surface treatment for the strontium titanate particles include silicone oils such as dimethylpolysiloxane, diphenylpolysiloxane, and phenylmethylpolysiloxane; and reactive silicone oils such as amino-modified polysiloxane, epoxy-modified polysiloxane, carboxyl-modified polysiloxane, carbinol-modified polysiloxane, fluorine-modified polysiloxane, methacryl-modified polysiloxane, mercapto-modified polysiloxane, and phenol-modified polysiloxane.

The solvent used for preparing the above-described treatment liquid is, for example, preferably an alcohol (for example, methanol, ethanol, propanol, or butanol) in a case where the silicon-containing organic compound is an alkoxysilane compound or a silazane compound, or preferably hydrocarbons (for example, benzene, toluene, normal hexane, and normal heptane) in a case where the silicon-containing organic compound is a silicone oil.

In the above-described treatment liquid, the concentration of the silicon-containing organic compound is, for example, preferably 1% by mass or more and 50% by mass or less, more preferably 5% by mass or more and 40% by mass or less, and even more preferably 10% by mass or more and 30% by mass or less.

The amount of the silicon-containing organic compound used in the surface treatment is, for example, preferably 1 part by mass or more and 50 parts by mass or less, more preferably 5 parts by mass or more and 40 parts by mass or less, and even more preferably 5 parts by mass or more and 30 parts by mass or less with respect to 100 parts by mass of the strontium titanate particles.

Other External Additives

The toner according to the present exemplary embodiment may be externally added with an external additive other than the silica particles (A), the silica particles (B), and the strontium titanate particles. Examples of the other external additives include inorganic particles such as $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)_n$, $Al_2O_3{\cdot}2SiO_2$, $CaCO_3$, $MgCO_3$, $BaSO_4$, and $MgSO_4$; hydrophobized inorganic particles obtained by surface-treating these inorganic particles with a hydrophobic agent; and resin particles such as polystyrene, polymethyl methacrylate, and a melamine resin.

Liberated Oil

An example of the toner according to the present exemplary embodiment includes a liberated oil. The liberated oil contained in the toner may be oil added as an external additive, or oil liberated from particles that are external additives. From the viewpoint of easily adjusting the content of the liberated oil, for example, a form in which the toner contains the liberated oil by externally adding oil-treated particles to the toner is preferable.

Examples of the liberated oil include a silicone oil, a paraffin oil, a fluorine oil, and a vegetable oil. The liberated oil may be one kind or a plurality of kinds. Among these oils, for example, a silicone oil is preferable, and dimethyl silicone oil (that is, dimethylpolysiloxane) is more preferable.

From the viewpoint of suppressing aggregation of the toner and improving the fluidity of the toner, the content of the liberated oil with respect to the overall amount of the toner is, for example, preferably 0.01% by mass or more and 0.1% by mass or less, more preferably 0.03% by mass or more and 0.08% by mass or less, and even more preferably 0.05% by mass or more and 0.07% by mass or less.

The amount (%) of the liberated oil with respect to the overall amount of the toner is obtained by the following method.

The toner to which an external additive has been externally added is dispersed in hexane so that the toner concentration reaches 5% by mass, ultrasonic waves (output of 20 W and frequency of 20 kHz) are applied to the toner for 20 minutes, and the supernatant and the solids are centrifugally separated. In a case where the mass of the toner as a sample is defined as Wb and the amount of solids after the centrifugal separation is defined as Wa, the amount (%) of the liberated oil with respect to the overall amount of the toner is expressed by the following expression.

$$\text{Amount of liberated oil (\%)}=(Wb-Wa)\div Wb\times 100$$

Examples of the oil-treated particles include inorganic particles ($SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, $MgSO_4$, or the like) treated with an oil, and resin particles (resin particles such as polystyrene, polymethyl methacrylate, and a melamine resin) treated with an oil. As the oil-treated particles, for example, oil-treated silica particles are preferable.

The oil treatment of the particles is carried out, for example, by a method of stirring and mixing an organic solvent, particles, and an oil, and then distilling off the organic solvent using an evaporator and drying the resultant. Examples of the oil include a silicone oil, a paraffin oil, a fluorine oil, and a vegetable oil, and among these oils, for example, a silicone oil is preferable, and dimethyl silicone oil (that is, dimethylpolysiloxane) is more preferable.

The amount of the liberated oil in the oil-treated particles is measured by the following method.

The oil-treated particles are dispersed in hexane so that the toner concentration reaches 5% by mass, ultrasonic waves (output of 20 W and frequency of 20 kHz) are applied to the toner for 20 minutes, and the supernatant and the solids are centrifugally separated. In a case where the mass of the oil-treated particles as a sample is defined as Wb and the amount of solids after the centrifugal separation is defined as Wa, the amount (% by mass) of the liberated oil with respect to the oil-treated particles is expressed by the following expression.

$$\text{Amount of liberated oil (\% by mass)}=(Wb-Wa)\div Wb\times 100$$

Structure and Characteristics of Toner

Relationship Between Toner Particles and External Additive

A ratio Dp/Da of the average particle size of the resin particles contained in the toner particles (referred to as "average particle size Dp" in the present disclosure) to the average primary particle size of the silica particles (A) externally added to the toner particles (referred to as "average primary particle size Da" in the present disclosure) is, for example, preferably 0.75 or more and 15 or less.

In a case where the ratio Dp/Da is 15 or less, the silica particles (A) are less likely to be embedded in the resin particles contained in the toner particles. From the viewpoint, the ratio Dp/Da is, for example, more preferably 10 or less, and even more preferably 5 or less.

In a case where the ratio Dp/Da is 0.75 or more, the silica particles (A) are less likely to be embedded in the binder resin contained in the toner particles. From the viewpoint, the ratio Dp/Da is, for example, more preferably 1.0 or more, and even more preferably 1.5 or more.

For example, a measuring method and preferred range of the average particle size of the resin particles and a measuring method and preferred range of the average primary particle size of the silica particles (A) are as described above.

From the viewpoint of improving the fluidity of the toner by coating the surface of the toner particles with high uniformity and an appropriate degree of coverage, a surface coverage of the toner particles by the silica particles (A) (referred to as "surface coverage C1" in the present disclosure) is, for example, preferably 10% or more and 60% or less, more preferably 15% or more and 55% or less, and even more preferably 20% or more and 50% or less.

In a case where the toner according to the present exemplary embodiment contains inorganic particles other than the silica particles (A) (for example, the silica particles (B) and/or the strontium titanate particles), a ratio C1/C2 of the surface coverage of the toner particles by the silica particles (A) (referred to as "surface coverage C1" in the present disclosure) to a surface coverage of the toner particles by inorganic particles other than the silica particles (A), the inorganic particles having a primary particle size of 80 nm or more and 150 nm or less, (referred to as "surface coverage C2" in the present disclosure) is, for example, preferably 0.2 or more and 1.5 or less.

In a case where the ratio C1/C2 is within the above-described range, the silica particles (A) and the inorganic particles having a primary particle size of 80 nm or more and 150 nm or less are evenly distributed on the surface of the toner particles, and the inorganic particles functioning as spacers between the toner particles are evenly distributed on the surface of the toner particles, so that the fluidity of the toner is more excellent.

From the above-described viewpoint, the ratio C1/C2 is, for example, more preferably 0.4 or more and 1.2 or less, and even more preferably 0.6 or more and 1.0 or less.

The surface coverage C1 and the surface coverage C2 are measured by the following method.

Using a scanning electron microscope (SEM) (manufactured by Hitachi High-Tech Corporation, S-4800) equipped with an energy dispersive X-ray analyzer (EDX device) (manufactured by HORIBA, Ltd., EMAX Evolution X-Max 80 $mm^2$), an image of the entire toner is captured at a magnification of 40,000. Based on the presence of a Mo element, a N element, and a Si element, the external additives present on the surface of one toner are sorted into the silica particles (A) and the inorganic particles other than the silica particles (A) by EDX analysis. Furthermore, inorganic particles having an equivalent circular diameter of 80 nm or more and 150 nm or less are extracted from the inorganic particles other than the silica particles (A).

An image of one toner is analyzed by image processing/analysis software WinRoof (MITANI CORPORATION), and the area of one toner, the total area of the silica particles (A) present on one toner, and the total area of the inorganic particles other than the silica particles (A), having an equivalent circular diameter of 80 nm or more and 150 nm or less, present on one toner are determined. The image analysis is performed on 100 toners, and the total area of 100 toners, the total area of the silica particles (A) present on 100 toners, and the total area of the inorganic particles other than the silica particles (A), having an equivalent circular diameter of 80 nm or more and 150 nm or less, present on 100 toners are determined. The surface coverage C1 and the surface coverage C2 are calculated from the following equations.

$$\text{Surface coverage } C1(\%)=(\text{Total area of silica particles } (A) \text{ present on 100 toners/Total area of 100 toners})\times 100$$

$$\text{Surface coverage } C2(\%)=(\text{Total area of inorganic particles other than silica particles } (A)\text{, having equivalent circular diameter of 80 nm or more and 150 nm or less, present on 100 toners/Total area of 100 toners})\times 100$$

Viscoelasticity of Toner

In the toner according to the present exemplary embodiment, in a case where a loss tangent tan δ of the electrostatic charge image developing toner determined by dynamic viscoelasticity measurement at a temperature of 90° C. and a strain of 1% is represented by D1 (90), a loss tangent tan δ of the electrostatic charge image developing toner determined by dynamic viscoelasticity measurement at a temperature of 90° C. and a strain of 50% is represented by D50 (90), a loss tangent tan δ of the electrostatic charge image developing toner determined by dynamic viscoelasticity measurement at a temperature of 150° C. and a strain of 1% is represented by D1 (150), and a loss tangent tan δ of the electrostatic charge image developing toner determined by dynamic viscoelasticity measurement at a temperature of 150° C. and a strain of 50% is represented by D50 (150), for example, it is preferable that each of D1 (90), D50 (90), D1 (150), and D50 (150) is 0.5 or more and 2.5 or less, a value of D50 (150)−D1 (150) is less than 1.5, and a value of D50 (90)−D1 (90) is less than 1.0.

D1 (90), D50 (90), D1 (150), and D50 (150) of the toner are obtained by the following measurement methods.

At normal temperature (25° C.±3° C.), the toner is molded into a tablet shape by a press molding machine to produce a sample for measurement. The sample for measurement is sandwiched between parallel plates with a diameter of 8 mm, and using a dynamic viscoelasticity measuring device (rheometer ARES-G2, manufactured by TA Instruments), the dynamic viscoelasticity measurement is performed at a temperature of 90° C. or 150° C. with a gap of 3 mm, a frequency of 1 Hz, and a strain of 1% or 50%, the storage elastic modulus curve and the loss elastic modulus curve are obtained to determine the loss tangent tan δ.

Here, the strain of 1% in the dynamic viscoelasticity measurement means applying 1% of displacement with respect to a height (that is, a gap) of the sample. That is, the strain of 1% corresponds to the application of a displacement having a small magnitude, and corresponds to a case where a fixing pressure is low in the toner fixing step. On the other hand, the strain of 50% corresponds to a case where the fixing pressure is high in the toner fixing step. The temperature of 90° C. and strain of 1% correspond to a fixing condition at a low temperature and a low pressure, the temperature of 150° C. and strain of 50% correspond to a fixing condition at a high temperature and a high pressure, and each loss tangent tan δ corresponds to the deformation amount of the toner under each fixing condition. By controlling the difference between the loss tangent tan δ at a strain of 1% and the loss tangent tan δ at a strain of 50% within a certain range, it is presumed that, even in a case where the fixing pressure is changed, the deformation amount of the toner can be suppressed within a certain range, and the difference in glossiness can be suppressed.

In the above-described measurement method, the loss tangent tan δ is obtained in a combination of high temperature (150° C.), low temperature (90° C.), high strain (50%), and low strain (1%). Since the viscoelasticity is less likely to appear in a case where the measurement temperature is too low, the measurement is performed at 150° C. and 90° C.

Since the toner according to the present exemplary embodiment has the above-described dynamic viscoelastic properties, the external additive is less likely to be embedded even in a case where the toner is in a high-temperature and high-humidity environment and a strong mechanical stress is applied. Therefore, the toner according to the present exemplary embodiment has the above-described dynamic viscoelastic properties, so that the fluidity of the toner is more excellent.

In addition, the toner according to the present exemplary embodiment has the above-described dynamic viscoelastic properties, the difference in glossiness between the fixed image in low-temperature and low-pressure conditions and the fixed image in high-temperature and high-pressure conditions is reduced while exhibiting good fixability. The reason is presumed as follows.

A toner that is easily melted by heating generally has good fixing properties. However, in an image formed of the toner that is easily melted by heating, the difference in glossiness of the fixed image may be large depending on the fixing conditions.

On the other hand, the toner having the dynamic viscoelastic properties according to the present exemplary embodiment has a small change in loss tangent with respect to a change in strain at both 90° C. and 150° C. Since the toner has similar viscoelasticity at high temperature and high strain conditions and at low temperature and low strain conditions, it is presumed that the difference in glossiness of the fixed image due to the fixing conditions is small.

Furthermore, in the present exemplary embodiment, all of D1 (90), D50 (90), D1 (150), and D50 (150) are 0.5 or more. Therefore, compared to a toner in which any of D1 (90), D50 (90), D1 (150), and D50 (150) is less than 0.5, the toner is easily melted by heating during fixing, and good fixability is obtained.

Each of D1 (90), D50 (90), D1 (150), and D50 (150) is, for example, preferably 0.5 or more and 2.5 or less, more preferably 0.5 or more and 2.0 or less, even more preferably 0.6 or more and 1.8 or less, and still more preferably 0.8 or more and 1.6 or less. In a case where all of D1 (90), D50 (90), D1 (150), and D50 (150) are within the above-described range, good fixability is obtained compared to a case of being less than the above-described range, and the difference in glossiness is reduced compared to a case of being more than the above-described range.

A value of D50 (150)−D1 (150) is, for example, preferably less than 1.5, more preferably 1.2 or less, and even more preferably 1.0 or less. In a case where the value of D50 (150)−D1 (150) is within the above-described range, the difference in glossiness is reduced compared to a case of being more than the above-described range. From the viewpoint of reducing the difference in glossiness, for example, it is preferable that the value of D50 (150)−D1 (150) is smaller. The lower limit of the value of D50 (150)−D1 (150) is not limited.

A value of D50 (90)−D1 (90) is, for example, preferably less than 1.0, more preferably less than 0.5, even more preferably 0.4 or less, and still more preferably 0.3 or less. In a case where the value of D50 (90)−D1 (90) is within the above-described range, the difference in glossiness is reduced compared to a case of being more than the above-described range. From the viewpoint of reducing the difference in glossiness, for example, it is preferable that the value of D50 (90)−D1 (90) is smaller. The lower limit of the value of D50 (90)−D1 (90) is not limited.

In the dynamic viscoelasticity measurement in which the temperature is raised at a rate of 2° C./min, the toner according to the present exemplary embodiment preferably has, for example, a storage elastic modulus G' of $1\times10^8$ Pa or more and a temperature at which the storage elastic modulus G' reaches less than $1\times10^5$ Pa of 65° or higher and 90° C. or lower, in a range of 30° C. or higher and 50° C. or lower. The toner having the characteristics has a high elastic modulus at a low temperature, and has a low elastic modulus at 65° C. or higher and 90° C. or lower. Compared to a case where the temperature at which the storage elastic modulus G' reaches less than $1\times10^5$ Pa is higher than 90° C., the toner having the characteristics is easily melted by heating, and the fixability is good.

With regard to the toner according to the present exemplary embodiment, in the dynamic viscoelasticity measurement in which the temperature is raised at a rate of 2° C./min, the storage elastic modulus G' at a temperature of 30° C. or higher and 50° C. or lower is, for example, preferably $1\times10^8$ Pa or more, more preferably $1\times10^8$ Pa or more and $1\times10^9$ Pa or less, and even more preferably $2\times10^8$ Pa or more and $6\times10^8$ Pa or less. The toner having the characteristics has both storage stability of the toner and good fixability at the same time.

With regard to the toner according to the present exemplary embodiment, in the dynamic viscoelasticity measurement in which the temperature is raised at a rate of 2° C./min, the temperature at which the storage elastic modulus G' reaches less than $1\times10^5$ Pa is, for example, preferably 65° C. or higher and 90° C. or lower, more preferably 70° C. or higher and 87° C. or lower, and even more preferably 75° C. or higher and 84° C. or lower. The toner having the characteristics has both storage stability of the toner and good fixability at the same time.

The storage elastic modulus G' of the toner and the temperature at which the storage elastic modulus G' reaches less than $1\times10^5$ Pa are determined by the following measurement method.

At normal temperature (25° C.±3° C.), the toner is molded into a tablet shape by a press molding machine to produce a sample for measurement. The sample for measurement is sandwiched between parallel plates with a diameter of 8 mm, and using a dynamic viscoelasticity measuring device (rheometer ARES-G2, manufactured by TA Instruments), the dynamic viscoelasticity measurement is performed by increasing the temperature from 30° C. to 150° C. at a rate of 2° C./min with a gap of 3 mm, a frequency of 1 Hz, and a strain of 0.1% to 100%. From the storage elastic modulus curve obtained by the measurement, the storage elastic modulus G' and the temperature at which the storage elastic modulus G' reaches less than $1\times10^5$ Pa are determined.

Each of the above-described viscoelastic properties can be controlled by the type and degree of dispersion of the resin particles contained in the toner particles. For example, by evenly containing the resin particles (for example, preferably the resin particles (S)) in both the region near the surface of the toner particles and the region near the center of the toner particles, each of the above-described viscoelastic properties is realized.

In order to encapsulate the resin particles in the toner particles, for example, it is preferable that the resin particles have a high affinity with the binder resin. Examples of a method for increasing the affinity between the resin particles and the binder resin include controlling the SP value and using a surfactant as a dispersant for the resin particles.

However, since the resin particles are configured with an organic polymer unlike inorganic particles, carbon black, and metal particles, the resin particles having a high affinity with the binder resin are likely to be compatible with the binder resin, and may have low dispersibility inside the toner particles. On the other hand, resin particles having a low affinity with the binder resin are difficult to be encapsulated in the toner particles, and may be discharged to the surface of the toner particles or the outside of the toner particles. Resin particles having a medium affinity with the binder resin are likely to be encapsulated and dispersed in the toner particles.

On the other hand, in a case where the resin particles come into contact with each other in the process of manufacturing the toner particles, the resin particles may be unevenly distributed inside the toner particles while maintaining a state in which the resin particles are in contact with each other. One reason is considered to be that polymer chains of the resin configuring the resin particles are entangled with each other. In a case where the resin particles are the crosslinked resin particles, entanglement of the polymer chains of the resin is less likely to occur, the resin particles are less likely to remain in contact with each other, and the resin particles are likely to be evenly distributed in the toner particles.

In the toner according to the present exemplary embodiment, for example, it is preferable that a number-average molecular weight of tetrahydrofuran (THF)-soluble components of the toner particles is 5,000 or more and 15,000 or less. Within the range, good fixability can be realized even with a highly viscoelastic toner in which a change in loss tangent with respect to a change in strain is small, that is, with a toner in which the deformation amount is suppressed. In a case where the number-average molecular weight of the THF-soluble components of the toner particles is too small, since low-molecular-weight components are largely contained in the toner, the deformation amount of the toner particles in high-temperature and high-pressure fixing conditions tends to increase, and the difference in glossiness of the image tends to increase. In a case where the number-average molecular weight of the THF-soluble components of the toner particles is too large, since high-molecular-weight components are largely contained in the toner, the deformation amount of the toner is suppressed, but low-temperature fixability tends to be deteriorated. The number-average molecular weight of the THF-soluble components of the toner particles is, for example, more preferably 7,000 or more and 10,000 or less.

The number-average molecular weight of the THF-soluble components in the toner particles is measured by preparing THF-soluble components of the toner particles using two "HLC-8120GPC, SC-8020 (6.0 mmID×15 cm, manufactured by Tosoh Corporation)" and tetrahydrofuran (THF) as an eluent.

Specifically, 0.5 mg of the toner particles to be measured are dissolved in 1 g of THF, and after ultrasonic dispersion is applied, preparation is performed so that the concentration is 0.5% by mass.

The measurement is performed using an RI detector under the conditions of a sample concentration of 0.5% by mass, a flow rate of 0.6 ml/min, a sample injection amount of 10 μl, and a measurement temperature of 40° C.

A calibration curve is created from 10 samples of "Polystyrene standard sample TSK standard" manufactured by Tosoh Corporation: "A-500", "F-1", "F-10", "F-80", "F-380", "A-2500", "F-4", "F-40", "F-128", and "F-700".

In a case of obtaining the toner particles from an externally added toner, for example, the toner is dispersed in an aqueous solution of 0.2% by mass of polyoxyethylene (10) octylphenyl ether so that the concentration is 10% by mass, and the external additive is liberated by applying ultrasonic vibration (frequency: 20 kHz, output: 30 W) for 60 minutes while maintaining a temperature or 30° C. or lower. The toner particles from which the external additive is removed are obtained by filtering out the toner particles from the obtained dispersion and washing the toner particles.

Manufacturing Method of Toner

The toner according to the present exemplary embodiment is obtained by manufacturing toner particles and then externally adding external additives to the toner particles.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). These manufacturing methods are not limited, and known manufacturing methods are adopted. Among the above methods, for example, the aggregation and coalescence method may be used for obtaining toner particles.

Specifically, in a case where the toner particles are manufactured by the aggregation and coalescence method, for example, the toner particles are manufactured through a step of preparing a resin particle dispersion (1) in which resin particles (1) to be a binder resin are dispersed and a resin particle dispersion (2) in which resin particles (2) to be resin particles are dispersed (a resin particle dispersion-preparing step), a step of allowing the resin particles (1) and the resin particles (2) (and other particles as necessary) to be aggregated in a dispersion in which the resin particle dispersion (1) and the resin particle dispersion (2) are mixed (and mixed with another particle dispersion as necessary) so as to form aggregated particles (aggregated particle-forming step), and a step of heating an aggregated particle dispersion in which the aggregated particles are dispersed to allow the aggregated particles to undergo coalescence and to form toner particles (coalescence step).

Hereinafter, each of the steps will be specifically described.

In the following section, a method for obtaining toner particles containing a colorant and a release agent will be described. The colorant and the release agent are used as necessary. Naturally, other additives different from the colorant and the release agent may also be used.

Resin Particle Dispersion-Preparing Step

The resin particle dispersion (1) is prepared, for example, by dispersing the resin particles (1) in a dispersion medium by using a surfactant.

Examples of the dispersion medium used for the resin particle dispersion (1) include an aqueous medium.

Examples of the aqueous medium include distilled water, water such as deionized water, alcohols, and the like. One kind of each of the media may be used alone, or two or more kinds of the media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, an anionic surfactant and a cationic surfactant are particularly mentioned. The nonionic surfactant may be used in combination with an anionic surfactant or a cationic surfactant. One kind of surfactant may be used alone, or two or more kinds of surfactants may be used in combination.

As for the resin particle dispersion (1), examples of the method for dispersing resin particles (1) in the dispersion medium include general dispersion methods such as a rotary shearing homogenizer, a ball mill having media, a sand mill, and a dyno mill. Depending on the type of resin particles (1), the resin particles (1) may be dispersed in the dispersion medium by using a transitional phase inversion emulsification method. The transitional phase inversion emulsification method is a method of dissolving a resin to be dispersed in a hydrophobic organic solvent in which the resin is soluble, adding a base to an organic continuous phase (0 phase) for causing neutralization, and then adding an aqueous medium (W phase), such that the resin undergoes phase transition from W/O to O/W and is dispersed in the aqueous medium in the form of particles.

The volume-average particle size of the resin particles (1) dispersed in the resin particle dispersion (1) is, for example, preferably 0.01 μm or more and 1 μm or less, more preferably 0.08 μm or more and 0.8 μm or less, and even more preferably 0.1 μm or more and 0.6 μm or less.

For determining the volume-average particle size of the resin particles (1), a particle size distribution is measured using a laser diffraction type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles (1) contained in the resin particle dispersion (1) is, for example, preferably 5% by mass or more and 50% by mass or less, and more preferably 10% by mass or more and 40% by mass or less.

For example, a colorant particle dispersion and a release agent particle dispersion are prepared in the same manner as that adopted for preparing the resin particle dispersion (1). That is, the volume-average particle size of particles, the dispersion medium, the dispersion method, and the particle content in the resin particle dispersion (1) are also applied to the colorant particles to be dispersed in the colorant particle dispersion and the release agent particles to be dispersed in the release agent particle dispersion.

As a method for preparing the resin particle dispersion (2), for example, a known method such as an emulsion polymerization method, a melt-kneading method using a Banbury mixer or a kneader, a suspension polymerization method, and a spray drying method is adopted. Among the methods, for example, an emulsion polymerization method is preferable.

For example, from the viewpoint of maintaining the storage elastic modulus G' and the loss tangent tan δ of the resin particles within the preferred range, for example, it is preferable to use a styrene-based monomer and a (meth) acrylic acid-based monomer as monomers and carry out emulsion polymerization in the presence of a crosslinking agent. The emulsion polymerization is, for example, preferably carried out in a plurality of times.

The method for preparing the resin particle dispersion (2) preferably includes, for example, a step of obtaining an emulsion containing a monomer, a crosslinking agent, a surfactant, and water (emulsion-preparing step); a step of adding a polymerization initiator to the emulsion and then heating to polymerize the monomers (first emulsion polymerization step); and a step of adding an emulsion containing a monomer and a crosslinking agent to the reaction solution after the first emulsion polymerization step, and then heating to polymerize the monomer (second emulsion polymerization step).

Emulsion-Preparing Step

For example, it is preferable to obtain the emulsion by emulsifying a monomer, a crosslinking agent, a surfactant, and water by using an emulsifying machine. Examples of the emulsifying machine include a rotary stirrer equipped with a propeller type, anchor type, paddle type, or turbine type stirring blade, a stationary mixer such as a static mixer, and a rotor and stator type emulsifying machine such as a homogenizer or Clare mix, a mill type emulsifying machine having grinding function, a high-pressure emulsifying machine such as a Munton Gorlin-type pressure emulsifying machine, a high-pressure nozzle type emulsifying machine that causes cavitation under high pressure, a high-pressure impact-type emulsifying machine, such as a microfluidizer, that generates shearing force by causing collision of liquids under high pressure, an ultrasonic emulsifying machine that causes cavitation by using ultrasonic waves, and a membrane emulsifying machine that performs uniform emulsification through pores.

As the monomers, for example, it is preferable to use a styrene-based monomer and a (meth)acrylic acid-based monomer. As the crosslinking agent, the above-described compound is adopted.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. The nonionic surfactant may be used in combination with an anionic surfactant or a cationic surfactant. Among these surfactants, for example, an anionic surfactant is preferable. One kind of surfactant may be used alone, or two or more kinds of surfactants may be used in combination.

The emulsion may contain a chain transfer agent. Examples of the chain transfer agent include a compound having a thiol component. Specifically, for example, alkyl mercaptans such as hexyl mercaptan, heptyl mercaptan, octyl mercaptan, nonyl mercaptan, decyl mercaptan, and dodecyl mercaptan are preferable.

For example, from the viewpoint of maintaining the storage elastic modulus G' and the loss tangent tan δ of the resin particles within the preferred range, a mass ratio of the styrene-based monomer to the (meth)acrylic acid-based monomer in the emulsion (styrene-based monomer/(meth) acrylic acid-based monomer) is, for example, preferably 0.2 or more and 1.1 or less. For example, from the viewpoint of maintaining the storage elastic modulus G' and the loss tangent tan δ of the resin particles within the preferred range, a proportion of the crosslinking agent to the overall amount of the emulsion is, for example, preferably 0.5% by mass or more and 3% by mass or less.

First Emulsion Polymerization Step

The step is adding a polymerization initiator to the emulsion and then heating to polymerize the monomer.

As the polymerization initiator, for example, it is preferable to use ammonium persulfate. The viscoelasticity of the resin particles may be controlled by adjusting the amount of the polymerization initiator added. For example, by reducing the amount of the polymerization initiator added, it is easy to obtain resin particles having a high storage elastic modulus G'.

In polymerizing the monomer, for example, it is preferable to stir the emulsion (reaction solution) containing the polymerization initiator with a stirrer. Examples of the stirrer include a rotary stirrer equipped with a propeller type, anchor type, paddle type, or turbine type stirring blade.

Second Emulsion Polymerization Step

The step is adding an emulsion containing a monomer to the reaction solution obtained after the first emulsion polymerization step, and then heating to polymerize the monomer. The emulsion to be added is, for example, preferably obtained by emulsifying the monomer, the surfactant, and water with an emulsifying machine. In polymerizing the monomer, for example, it is preferable to stir the reaction solution in the same manner as in the first emulsion polymerization step.

By adjusting the time required for adding the emulsion containing the monomer, the viscoelasticity of the resin particles may be controlled. For example, by increasing the time required for adding the emulsion containing the monomer, it is easy to obtain resin particles having a high storage elastic modulus G'. The time required for adding the emulsion containing the monomer is, for example, in a range of 2 hours or more and 5 hours or less.

By adjusting the temperature at which the reaction solution is stirred, the viscoelasticity of the resin particles may be controlled. For example, by reducing the temperature at which the reaction solution is stirred, it is easy to obtain resin particles having a high storage elastic modulus G'. The temperature at which the reaction solution is stirred is, for example, in a range of 55° C. or higher and 75° C. or lower.

Aggregated Particle-Forming Step

Next, the resin particle dispersion (1), the resin particle dispersion (2), the colorant particle dispersion, and the release agent particle dispersion are mixed with each other. Thereafter, in the mixed dispersion, the resin particles (1), the resin particles (2), the colorant particles, and the release agent particles are hetero-aggregated so that aggregated particles having a diameter close to the diameter of the target toner particles are formed.

Specifically, for example, an aggregating agent is added to the mixed dispersion, the pH of the mixed dispersion is adjusted such that the dispersion is acidic (for example, pH of 2 or higher and 5 or lower), and a dispersion stabilizer is added thereto as necessary. Thereafter, the dispersion is heated to a temperature close to the glass transition temperature of the resin particles (1) (specifically, for example, to a temperature equal to or higher than the glass transition temperature of the resin particles (1)−30° C. and equal to or lower than the glass transition temperature of the resin particles (1)−10° C.) such that the particles dispersed in the mixed dispersion are aggregated, thereby forming aggregated particles. In the aggregated particle-forming step, for example, in a state where the mixed dispersion is stirred with a rotary shearing homogenizer, the aggregating agent may be added thereto at room temperature (for example, 25° C.), the pH of the mixed dispersion may be adjusted such that the dispersion is acidic (for example, pH of 2 or higher and 5 or lower), a dispersion stabilizer may be added to the dispersion as necessary, and then the dispersion may be heated.

By adjusting the temperature of the mixed dispersion in a case of adding the aggregating agent, the dispersion state of the resin particles in the obtained toner particles may be controlled. For example, by reducing the temperature of the mixed dispersion, the dispersibility of the resin particles is good. The temperature of the mixed dispersion is, for example, in a range of 5° C. or higher and 40° C. or lower.

By adjusting the stirring rate after adding the aggregating agent, the dispersion state of the resin particles in the obtained toner particles may be controlled. For example, by increasing the stirring rate after adding the aggregating agent, the dispersibility of the resin particles is good.

Examples of the aggregating agent include a surfactant having polarity opposite to the polarity of the surfactant contained in the mixed dispersion, an inorganic metal salt, and a metal complex having a valency of 2 or higher. In a case where a metal complex is used as the aggregating agent, the amount of the surfactant used is reduced, and the charging characteristics are improved.

In addition to the aggregating agent, an additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may also be used. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Coalescence Step

The aggregated particle dispersion in which the aggregated particles are dispersed is then heated to, for example, a temperature equal to or higher than the glass transition temperature of the resin particles (1) (for example, a temperature higher than the glass transition temperature of the resin particles (1) by 10° C. to 30° C.) such that the aggregated particles coalesce, thereby forming toner particles.

Toner particles are obtained through the above steps.

The toner particles may be manufactured through a step of, after obtaining the aggregated particle dispersion, mixing the resin particle dispersion (1) and the resin particle dispersion (2) in the aggregated particle dispersion, and aggregating the resin particles (1) and the resin particles (2) so as to adhere to the surface of the aggregated particles to form the second aggregated particles, and a step of heating the second aggregated particle dispersion in which the second aggregated particles are dispersed to allow the second aggregated particles to undergo coalescence and to form toner particles having a core/shell structure.

In the step of forming the second aggregated particles, the resin particle dispersion (1) and the resin particle dispersion (2) may be added in a plurality of times. Accordingly, the toner particles in which the resin particles are uniformly dispersed and contained in both the core particles and the shell layer are obtained.

After the coalescence step ends, the toner particles in the dispersion are subjected to known washing step, solid-liquid separation step, and drying step, thereby obtaining dry toner particles. As the washing step, from the viewpoint of charging properties, for example, displacement washing may be thoroughly performed using deionized water. As the solid-liquid separation step, from the viewpoint of productivity, for example, suction filtration, pressure filtration, or the like may be performed. As the drying step, from the viewpoint of productivity, for example, freeze drying, flush drying, fluidized drying, vibratory fluidized drying, or the like may be performed.

For example, by adding an external additive to the obtained dry toner particles and mixing the external additive and the toner particles together, the toner according to the present exemplary embodiment is manufactured. The mixing may be performed, for example, using a V blender, a Henschel mixer, a Lödige mixer, or the like. Coarse particles of the toner may be removed as necessary by using a vibratory sieving machine, a pneumatic sieving machine, or the like.

Electrostatic Charge Image Developer

The electrostatic charge image developer according to the present exemplary embodiment contains at least the toner according to the present exemplary embodiment.

The electrostatic charge image developer according to the present exemplary embodiment may be a one-component developer that contains only the toner according to the present exemplary embodiment or a two-component developer which is obtained by mixing the toner and a carrier together.

The carrier is not particularly limited, and examples thereof include known carriers. Examples of the carrier include a coated carrier obtained by coating the surface of a core material consisting of magnetic powder with a resin; a magnetic powder dispersion-type carrier obtained by dispersing magnetic powder in a matrix resin and mixing the powder and the resin together; and a resin impregnation-type carrier obtained by impregnating porous magnetic powder with a resin.

Each of the magnetic powder dispersion-type carrier and the resin impregnation-type carrier may be a carrier obtained by coating the surface of a core material, that is particles configuring the carrier, with a resin.

Examples of the magnetic powder include magnetic metals such as iron, nickel, and cobalt; and magnetic oxides such as ferrite and magnetite.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, and an epoxy resin. The coating resin and the matrix resin may contain other additives such as conductive particles. Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a resin, for example, by a coating method using a solution for forming a coating layer obtained by dissolving the coating resin and various additives (used as necessary) in an appropriate solvent, and the like. The solvent is not particularly limited, and may be selected in consideration of the type of the resin used, coating suitability, and the like.

Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; and a kneader coater method of mixing the core material of the carrier with the solution for forming a coating layer in a kneader coater and then removing solvents.

The mixing ratio (mass ratio) between the toner and the carrier, represented by toner:carrier, in the two-component developer is, for example, preferably 1:100 to 30:100, and more preferably 3:100 to 20:100.

Image Forming Apparatus and Image Forming Method

The image forming apparatus and image forming method according to the present exemplary embodiment will be described.

The image forming apparatus according to the present exemplary embodiment includes an image holder, a charging unit that charges the surface of the image holder, an electrostatic charge image forming unit that forms an electrostatic charge image on the charged surface of the image holder, a developing unit that contains an electrostatic charge image developer and develops the electrostatic charge image formed on the surface of the image holder as a toner image by using the electrostatic charge image developer, a transfer unit that transfers the toner image formed on the surface of the image holder to the surface of a recording medium, and a fixing unit that fixes the toner image transferred to the surface of the recording medium. As the electrostatic charge image developer, the electrostatic charge image developer according to the present exemplary embodiment is used.

In the image forming apparatus according to the present exemplary embodiment, an image forming method (image forming method according to the present exemplary embodiment) is performed which has a charging step of charging the surface of the image holder, an electrostatic charge image forming step of forming an electrostatic charge image on the charged surface of the image holder, a developing step of developing the electrostatic charge image formed on the surface of the image holder as a toner image by using the electrostatic charge image developer according to the present exemplary embodiment, a transfer step of transferring the toner image formed on the surface of the image holder to the surface of a recording medium, and a fixing step of fixing the toner image transferred to the surface of the recording medium.

As the image forming apparatus according to the present exemplary embodiment, known image forming apparatuses are used, such as a direct transfer-type apparatus that transfers a toner image formed on the surface of the image holder directly to a recording medium; an intermediate transfer-type apparatus that performs primary transfer by which the toner image formed on the surface of the image holder is transferred to the surface of an intermediate transfer member and secondary transfer by which the toner image transferred to the surface of the intermediate transfer member is transferred to the surface of a recording medium; an apparatus including a cleaning unit that cleans the surface of the image holder before charging after the transfer of the toner image; and an apparatus including a charge neutralizing unit that neutralizes charge by irradiating the surface of the image holder with charge neutralizing light before charging after the transfer of the toner image.

In the case where the image forming apparatus according to the present exemplary embodiment is the intermediate transfer-type apparatus, for example, a configuration is adopted which has an intermediate transfer member with surface on which the toner image will be transferred, a primary transfer unit that performs primary transfer to transfer the toner image formed on the surface of the image holder to the surface of the intermediate transfer member, and a secondary transfer unit that performs secondary transfer to transfer the toner image transferred to the surface of the intermediate transfer member to the surface of a recording medium.

In the image forming apparatus according to the present exemplary embodiment, for example, a portion including the developing unit may be a cartridge structure (process cartridge) detachable from the image forming apparatus. As the process cartridge, for example, a process cartridge is suitably used which includes a developing unit that contains the electrostatic charge image developer according to the present exemplary embodiment.

An example of the image forming apparatus according to the present exemplary embodiment will be shown below, but the present invention is not limited thereto. Hereinafter, among the parts shown in the drawings, main parts will be described, and others will not be described.

FIG. 1 is a view schematically showing the configuration of the image forming apparatus according to the present exemplary embodiment.

The image forming apparatus shown in FIG. 1 includes first to fourth image forming units 10Y, 10M, 10C, and 10K (image forming means) adopting an electrophotographic method that output images of colors, yellow (Y), magenta (M), cyan (C), and black (K), based on color-separated image data. These image forming units (hereinafter, simply called "units" in some cases) 10Y, 10M, 10C, and 10K are arranged in a row in the horizontal direction in a state of being spaced apart by a predetermined distance. The units 10Y, 10M, 10C, and 10K may be process cartridges that are detachable from the image forming apparatus.

An intermediate transfer belt (an example of the intermediate transfer member) 20 passing through above the units 10Y, 10M, 10C, and 10K extends under the units. The intermediate transfer belt 20 is looped around a driving roll 22 and a support roll 24, and runs toward the fourth unit 10K from the first unit 10Y. Force is applied to the support roll 24 in a direction away from the driving roll 22 by a spring or the like (not shown in the drawing). Tension is applied to the intermediate transfer belt 20 looped over the two rolls. An intermediate transfer member cleaning device 30 facing the driving roll 22 is provided on the surface of the intermediate transfer belt 20 on the image holder side.

Yellow, magenta, cyan, and black toners contained in containers of toner cartridges 8Y, 8M, 8C, and 8K are supplied to developing devices (developing units) 4Y, 4M, 4C, and 4K of the units 10Y, 10M, 10C, and 10K, respectively.

The first to fourth units 10Y, 10M, 10C, and 10K have the same configuration and operation. Therefore, in the present specification, as a representative, the first unit 10Y will be described which is placed on the upstream side of the running direction of the intermediate transfer belt and forms a yellow image.

The first unit 10Y has a photoreceptor 1Y that acts as an image holder. Around the photoreceptor 1Y, a charging roll (an example of the charging unit) 2Y that charges the surface of the photoreceptor 1Y at a predetermined potential, an exposure device (an example of the electrostatic charge image forming unit) 3 that exposes the charged surface to a laser beam 3Y based on color-separated image signals to form an electrostatic charge image, a developing device (an example of the developing unit) 4Y that develops the electrostatic charge image by supplying a charged toner to the electrostatic charge image, a primary transfer roll (an example of the primary transfer unit) 5Y that transfers the developed toner image onto the intermediate transfer belt 20, and a photoreceptor cleaning device (an example of the cleaning unit) 6Y that removes the residual toner on the surface of the photoreceptor 1Y after the primary transfer are arranged in this order.

The primary transfer roll 5Y is disposed on the inner side of the intermediate transfer belt 20, at a position facing the photoreceptor 1Y. A bias power supply (not shown in the drawing) for applying a primary transfer bias is connected to primary transfer rolls 5Y, 5M, 5C, and 5K of each unit. Each bias power supply changes the transfer bias applied to each primary transfer roll under the control of a control unit not shown in the drawing.

Hereinafter, the operation that the first unit 10Y carries out to form a yellow image will be described.

First, prior to the operation, the surface of the photoreceptor 1Y is charged to a potential of −600 V to −800 V by the charging roll 2Y.

The photoreceptor 1Y is formed of a photosensitive layer laminated on a conductive (for example, volume resistivity at 20° C.: $1\times10^{-6}$ Ω·cm or less) substrate. The photosensitive layer has properties in that although this layer usually has a high resistance (resistance of a general resin), in a case where the photosensitive layer is irradiated with the laser beam, the specific resistance of the portion irradiated with the laser beam changes. From the exposure device 3, the laser beam 3Y is radiated to the surface of the charged photoreceptor 1Y according to the image data for yellow transmitted from the control unit not shown in the drawing. As a result, an electrostatic charge image of the yellow image pattern is formed on the surface of the photoreceptor 1Y.

The electrostatic charge image is an image formed on the surface of the photoreceptor 1Y by charging. This image is a so-called negative latent image formed in a manner in which the charges with which the surface of the photoreceptor 1Y is charged flow due to the reduction in the specific resistance of the portion of the photosensitive layer irradiated with the laser beam 3Y, but the charges in a portion not being irradiated with the laser beam 3Y remain.

The electrostatic charge image formed on the photoreceptor 1Y rotates to a predetermined development position as the photoreceptor 1Y runs. At the development position, the electrostatic charge image on the photoreceptor 1Y is developed as a toner image by the developing device 4Y and visualized.

The developing device 4Y contains, for example, an electrostatic charge image developer that contains at least a yellow toner and a carrier. By being agitated in the developing device 4Y, the yellow toner undergoes triboelectrification, carries charges of the same polarity (negative polarity) as the charges with which the surface of the photoreceptor 1Y is charged, and is held on a developer roll (an example of a developer holder). As the surface of the photoreceptor 1Y passes through the developing device 4Y, the yellow toner electrostatically adheres to the neutralized latent image portion on the surface of the photoreceptor 1Y, and the latent image is developed by the yellow toner. The photoreceptor 1Y on which the yellow toner image is formed keeps on running at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and electrostatic force heading for the primary transfer roll 5Y from the photoreceptor 1Y acts on the toner image. As a result, the toner image on the photoreceptor 1Y is transferred onto the intermediate transfer belt 20. The transfer bias applied at this time has a polarity (+) opposite to the polarity (−) of the toner. In the first unit 10Y, the transfer bias is set, for example, to +10 μA under the control of the control unit (not shown in the drawing).

The residual toner on the photoreceptor 1Y is removed by a photoreceptor cleaning device 6Y and collected.

The primary transfer bias applied to the primary transfer rolls 5M, 5C, and 5K following the second unit 10M is also controlled according to the first unit.

In this way, the intermediate transfer belt 20 to which the yellow toner image is transferred in the first unit 10Y is sequentially transported through the second to fourth units 10M, 10C, and 10K, and the toner images of each color are superimposed and transferred in layers.

The intermediate transfer belt 20, to which the toner images of four colors are transferred in layers through the first to fourth units, reaches a secondary transfer portion configured with the intermediate transfer belt 20, the support roll 24 in contact with the inner surface of the intermediate transfer belt, and a secondary transfer roll 26 (an example of a secondary transfer unit) disposed on the image holding surface side of the intermediate transfer belt 20. On the other hand, through a supply mechanism, recording paper P (an example of recording medium) is supplied at a predetermined timing to the gap between the secondary transfer roll 26 and the intermediate transfer belt 20 that are in contact with each other. Furthermore, secondary transfer bias is applied to the support roll 24. The transfer bias applied at this time has the same polarity (−) as the polarity (−) of the toner. The electrostatic force heading for the recording paper P from the intermediate transfer belt 20 acts on the toner image, that makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

Thereafter, the recording paper P is transported into a pressure contact portion (nip portion) of a pair of fixing rolls in the fixing device 28 (an example of fixing unit), the toner image is fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet, in addition to the recording paper P.

In order to further improve the smoothness of the image surface after fixing, for example, it is preferable that the surface of the recording paper P is also smooth. For example, coated paper prepared by coating the surface of plain paper with a resin or the like, art paper for printing, and the like are suitably used.

The recording paper P on which the colored image has been fixed is transported to an output portion, and a series of colored image forming operations is finished.

Process Cartridge and Toner Cartridge

The process cartridge according to the present exemplary embodiment will be described.

The process cartridge according to the present exemplary embodiment includes a developing unit that contains the electrostatic charge image developer according to the present exemplary embodiment and develops an electrostatic charge image formed on the surface of an image holder as a toner image by using the electrostatic charge image developer. The process cartridge is detachable from the image forming apparatus.

The process cartridge according to the present exemplary embodiment is not limited to the above configuration. The process cartridge may be configured with a developing unit and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawings, main parts will be described, and others will not be described.

Figure 2:
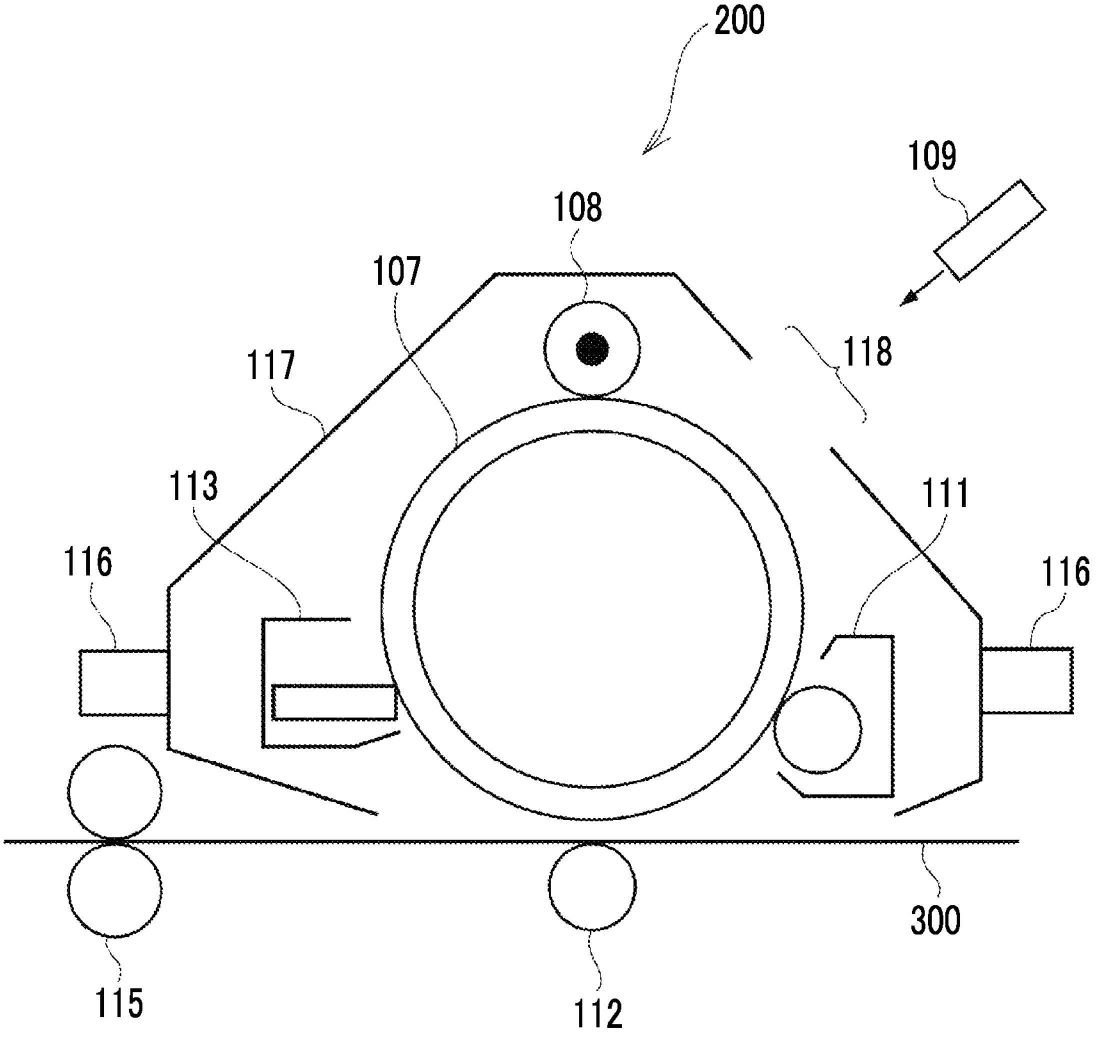
FIG. 2 is a view schematically showing the configuration of an example of a process cartridge detachable from the image forming apparatus according to the present exemplary embodiment.

FIG. 2 is a view schematically showing the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of image holder), a charging roll 108 (an example of charging unit) that is provided on the periphery of the photoreceptor 107, a developing device 111 (an example of developing unit), a photoreceptor cleaning device 113 (an example of cleaning unit), that are integrally combined and held in the housing 117. The process cartridge 200 forms a cartridge in this way.

In FIG. 2, 109 represents an exposure device (an example of electrostatic charge image forming unit), 112 represents a transfer device (an example of transfer unit), 115 represents a fixing device (an example of fixing unit), and 300 represents recording paper (an example of recording medium).

Next, the toner cartridge according to the present exemplary embodiment will be described.

The toner cartridge according to the present exemplary embodiment is a toner cartridge including a container that contains the toner according to the present exemplary embodiment and is detachable from the image forming apparatus. The toner cartridge includes a container that contains a replenishing toner to be supplied to the developing unit provided in the image forming apparatus.

The image forming apparatus shown in FIG. 1 is an image forming apparatus having a configuration that enables toner cartridges 8Y, 8M, 8C, and 8K to be detachable from the apparatus. The developing devices 4Y, 4M, 4C, and 4K are connected to toner cartridges corresponding to the respective developing devices (colors) by a toner supply pipe not shown in the drawing. In a case where the amount of the toner contained in the container of the toner cartridge is low, the toner cartridge is replaced.

EXAMPLES

Hereinafter, exemplary embodiments of the invention will be specifically described based on examples. However, the exemplary embodiments of the invention are not limited to the examples.

In the following description, unless otherwise specified, "parts" and "%" are based on mass.

Unless otherwise specified, synthesis, treatment, manufacturing, and the like are carried out at room temperature (25° C.±3° C.).

Preparation of Particle Dispersion

Preparation of Amorphous Resin Particle Dispersion (1-1)

Terephthalic acid: 28 parts
Fumaric acid: 164 parts
Adipic acid: 10 parts
Ethylene oxide (2 mol) adduct of bisphenol A: 26 parts
Propylene oxide (2 mol) adduct of bisphenol A: 542 parts The above-described materials are put in a reaction vessel equipped with a stirrer, a nitrogen introduction tube, a temperature sensor, and a rectifying column, the temperature is raised to 190° C. for 1 hour, and dibutyltin oxide is added to the mixture in an amount of 1.2 parts with respect to 100 parts of the above-described materials. While the generated water is distilled off, the temperature is raised to 240° C. for 6 hours, a dehydrocondensation reaction is continued for 3 hours in the reaction solution retained at 240° C., and then the reactant is cooled.

The reactant in a molten state is transferred to CAVITRON CD1010 (manufactured by Eurotech Ltd.) at a rate of 100 g/min. At the same time, separately prepared aqueous ammonia having a concentration of 0.37% is transferred to CAVITRON CD1010 at a rate of 0.1 L/min in a state of being heated at 120° C. with a heat exchanger. The CAVITRON CD1010 is operated under the conditions of a rotation speed of a rotor of 60 Hz and a pressure of 5 kg/$cm^2$, thereby obtaining a resin particle dispersion in which resin particles of an amorphous polyester resin having a volume-average particle size of 169 nm are dispersed. Deionized water is added to the resin particle dispersion to adjust the solid content to 20%, thereby obtaining an amorphous resin particle dispersion (1-1). The SP value (R) of the amorphous polyester resin is 9.41.

Preparation of Amorphous Resin Particle Dispersion (1-2)

Styrene: 72 parts
n-Butyl acrylate: 27 parts
2-Carboxyethyl acrylate: 1.3 parts
Dodecanethiol: 2 parts In a flask, a mixture obtained by mixing and dissolving the above-described materials is dispersed and emulsified in a surfactant solution prepared by dissolving 1.2 parts of an anionic surfactant (TaycaPower, manufactured by Tayca Corporation) in 100 parts of deionized water. Next, an aqueous solution obtained by dissolving 6 parts of ammonium persulfate in 50 parts of deionized water is added to the solution for 20 minutes while the solution in the flask is stirred. Next, nitrogen purging is performed, and in a state where the content in the flask is stirred, the flask is heated in an oil bath until the temperature of the content reaches 75° C., and the temperature is kept at 75° C. for 4 hours so that emulsion polymerization continues. In this way, a resin particle dispersion is obtained in which resin particles of an amorphous styrene acrylic resin having a volume-average particle size of 160 nm and a weight-average molecular weight of 56,000 are dispersed. Deionized water is added to the above-described resin particle dispersion to adjust the solid content to 31.4%, thereby obtaining an amorphous resin particle dispersion (1-2). The SP value (R) of the amorphous styrene acrylic resin is 9.14.

Preparation of Amorphous Resin Particle Dispersion (1-3)

Terephthalic acid: 28 parts
Fumaric acid: 174 parts
Ethylene oxide (2 mol) adduct of bisphenol A: 26 parts
Propylene oxide (2 mol) adduct of bisphenol A: 542 parts The above-described materials are put in a reaction vessel equipped with a stirrer, a nitrogen introduction tube, a temperature sensor, and a rectifying column, the temperature is raised to 190° C. for 1 hour, and dibutyltin oxide is added to the mixture in an amount of 1.2 parts with respect to 100 parts of the above-described materials. While the generated water is distilled off, the temperature is raised to 240° C. for 6 hours, a dehydrocondensation reaction is continued for 3 hours in the reaction solution retained at 240° C., and then the reactant is cooled.

The reactant in a molten state is transferred to CAVITRON CD1010 (manufactured by Eurotech Ltd.) at a rate of 100 g/min. At the same time, separately prepared aqueous ammonia having a concentration of 0.37% is transferred to CAVITRON CD1010 at a rate of 0.1 L/min in a state of being heated at 120° C. with a heat exchanger. The CAVITRON CD1010 is operated under the conditions of a rotation speed of a rotor of 60 Hz and a pressure of 5 kg/$cm^2$, thereby obtaining a resin particle dispersion in which resin particles of an amorphous polyester resin having a volume-average particle size of 175 nm are dispersed. Deionized water is added to the resin particle dispersion to adjust the solid content to 20%, thereby obtaining an amorphous resin particle dispersion (1-3). The SP value (R) of the amorphous polyester resin is 9.43.

Preparation of Crystalline Resin Particle Dispersion (1-4)

1,10-Dodecanedioic acid: 225 parts
1,6-Hexanediol: 143 parts

The above-described materials are put in a reaction vessel equipped with a stirrer, a nitrogen introduction tube, a temperature sensor, and a rectifying column, the temperature is raised to 160° C. for 1 hour, and 0.8 parts of dibutyltin oxide is added to the mixture. While the generated water is distilled off, the temperature is raised to 180° C. for 6 hours, and a dehydrocondensation reaction is continued for 5 hours in the reaction solution retained at 180° C. Next, the temperature is slowly raised to 230° C. under reduced pressure, and the reaction solution is stirred for 2 hours in a state of being retained at 230° C. Next, the reaction product is cooled, solid-liquid separation is performed, and the solids are dried to obtain a crystalline polyester resin.

Crystalline polyester resin: 100 parts
Methyl ethyl ketone: 40 parts
Isopropyl alcohol: 30 parts
10% aqueous ammonia solution: 6 parts The above-described materials are put in a jacketed reaction vessel equipped with a condenser, a thermometer, a water dripping device, and an anchor blade, and in a state in which the reaction vessel is retained at a temperature of 80° C. in a water-circulation type thermostatic bath, the resin is dissolved while stirring and mixing the mixture at 100 rpm. Next, the water-circulation type thermostatic bath is set to 50° C., and a total of 400 parts of deionized water retained at 50° C. is added dropwise to the reaction vessel at a rate of 7 parts/min to obtain an emulsion. 576 parts of the emulsion and 500 parts of deionized water are added to an eggplant flask, and the eggplant flask is set through a trap ball in an evaporator equipped with a vacuum control unit. While being rotated, the eggplant flask is heated in a hot water bath at 60° C., and the pressure is reduced to 7 kPa with care to sudden boiling, thereby removing the solvent. The volume-average particle size of the resin particles in the dispersion is 185 nm. Deionized water is added to the dispersion to obtain a crystalline resin particle dispersion (1-4) having a solid content of 22.1%.

Preparation of Resin Particle Dispersion (2-1)

Styrene: 47.9 parts
n-Butyl acrylate: 51.8 parts
2-Carboxyethyl acrylate: 0.3 parts
1,10-Decanediol diacrylate: 1.65 parts
Anionic surfactant (Dowfax2A1 manufactured by The Dow Chemical Company): 0.8 parts The above-described materials are put in a flask and then mixed and dissolved, 60 parts of deionized water is further added to the mixture, and the mixture is subjected to a dispersion treatment to produce an emulsion. 1.3 parts of the anionic surfactant (Dowfax2A1 manufactured by The Dow Chemical Company) is dissolved in 90 parts of deionized water, 1 part of the emulsion is added to the mixture, and a solution in which 5.4 parts of ammonium persulfate is dissolved in 10 parts of deionized water is further added to the mixture. Next, the rest of the emulsion is added to the mixture over 180 minutes. Next, nitrogen purging in the flask is performed, and the liquid temperature is raised to 65° C. in an oil bath while stirring the solution in the flask. Stirring is continued for 500 minutes while keeping the liquid temperature at 65° C. for emulsion polymerization. Next, the solid content is adjusted to 24.5% with deionized water to obtain a resin particle dispersion (2-1).

Preparation of Resin Particle Dispersions (2-2) to (2-12), (2-C1), and (2-C2)

Resin particle dispersions (2-2) to (2-12), (2-C1), and (2-C2) are prepared in the same manner as the resin particle dispersion (2-1), except that the amount of the monomers, the type and amount of the crosslinking agent, the total amount of the surfactant, the amount of ammonium persulfate, the temperature heated by the oil bath ("Polymerization temperature" in the table), the time required for adding the rest of the emulsion ("Addition time" in the table), and the time to continue the emulsion polymerization ("Holding time" in the table) are changed as shown in Table 1.

TABLE 1

| | Materials | | | | | Crosslinking agent | | | Formulation | | | |
|---|---|---|---|---|---|---|---|---|---|---|---|---|
| Resin particle dispersion Name | Styrene Part | n-Butyl acrylate Part | Acrylic acid Part | 2-Carboxyethyl acrylate Part | Surfactant Part | Addition amount Part | Type of compound — | Number of carbon atoms in alkylene chain — | Ammonium persulfate Part | Polymerization temperature ° C. | Addition time min | Holding time min |
| (2-1) | 47.9 | 51.8 | 0 | 0.3 | 2.1 | 1.65 | 1,10-Decanediol diacrylate | 10 | 5.4 | 65 | 180 | 500 |
| (2-2) | 54.5 | 44.6 | 0 | 0.84 | 1.26 | 1.65 | 1,10-Decanediol diacrylate | 10 | 5.4 | 65 | 180 | 500 |
| (2-3) | 34.8 | 64.1 | 0 | 0.84 | 1.26 | 1.65 | 1,10-Decanediol diacrylate | 10 | 5.4 | 65 | 180 | 500 |

TABLE 1-continued

| | Materials | | | | | Crosslinking agent | | | Formulation | | | |
|---|---|---|---|---|---|---|---|---|---|---|---|---|
| Resin particle dispersion Name | Styrene Part | n-Butyl acrylate Part | Acrylic acid Part | 2-Carboxyethyl acrylate Part | Surfactant Part | Addition amount Part | Type of compound — | Number of carbon atoms in alkylene chain — | Ammonium persulfate Part | Polymerization temperature ° C. | Addition time min | Holding time min |
| (2-4) | 47.9 | 51.8 | 0 | 0.3 | 2.5 | 1.65 | 1,10-Decanediol diacrylate | 10 | 11.2 | 75 | 180 | 350 |
| (2-5) | 47.9 | 51.8 | 0 | 0.3 | 2.3 | 3.1 | 1,10-Decanediol diacrylate | 10 | 6.1 | 65 | 180 | 500 |
| (2-6) | 47.9 | 51.8 | 0 | 0.3 | 1.2 | 1.65 | 1,10-Decanediol diacrylate | 10 | 5.4 | 65 | 180 | 500 |
| (2-7) | 47.9 | 51.8 | 0 | 0.3 | 2.9 | 1.65 | 1,10-Decanediol diacrylate | 10 | 5.4 | 65 | 180 | 500 |
| (2-8) | 47.9 | 51.8 | 0 | 0.3 | 1 | 1.65 | 1,10-Decanediol diacrylate | 10 | 5.4 | 65 | 180 | 500 |
| (2-9) | 47.9 | 51.8 | 0 | 0.3 | 3.1 | 1.65 | 1,10-Decanediol diacrylate | 10 | 5.4 | 65 | 180 | 500 |
| (2-10) | 46.8 | 48.9 | 2 | 0.3 | 2.1 | 1.65 | 1,10-Decanediol diacrylate | 10 | 5.4 | 65 | 180 | 500 |
| (2-11) | 47.9 | 51.8 | 0 | 0.84 | 1.26 | 1.65 | 1,6-Hexanediol diacrylate | 6 | 5.4 | 65 | 180 | 500 |
| (2-12) | 47.9 | 51.8 | 0 | 0.84 | 1.26 | 1.65 | 1,4-Butanediol diacrylate | 4 | 5.4 | 65 | 180 | 500 |
| (2-C1) | 53.8 | 45.9 | 0 | 0.3 | 2.1 | 0.36 | 1,10-Decanediol diacrylate | 10 | 11 | 75 | 120 | 300 |
| (2-C2) | 42.9 | 56.8 | 0 | 0.3 | 1.8 | 0.67 | 1,10-Decanediol diacrylate | 10 | 5.7 | 60 | 240 | 700 |

Table 2 shows physical properties of the crosslinked resin particles contained in the resin particle dispersion (2-1) and the like. Abbreviations in Table 2 have the following meanings.

Tg: glass transition temperature

G'90-150 (small): minimum value of storage elastic modulus G'(p90-150) in a range of 90° C. or higher and 150° C. or lower G'90-150 (large): maximum value of storage elastic modulus G'(p90-150) in a range of 90° C. or higher and 150° C. or lower tan δ 30-150 (small): minimum value of loss tangent tan δ in a range of 30° C. or higher and 150° C. or lower tan δ 30-150 (large): maximum value of loss tangent tan δ in a range of 30° C. or higher and 150° C. or lower tan δ 65-150 (small): minimum value of loss tangent tan δ in a range of 65° C. or higher and 150° C. or lower tan δ 65-150 (large): maximum value of loss tangent tan δ in a range of 65° C. or higher and 150° C. or lower

TABLE 2

| Resin particle dispersion Name | Tg ° C. | G'90-50 (small) Pa | G'90-150 (large) Pa | Tanδ 30-150 (small) — | Tanδ 30-150 (large) — | Tanδ 65-150 (small) — | Tanδ 65-150 (large) — | Average particle size nm | SP value $(cal/cm^3)^{1/2}$ |
|---|---|---|---|---|---|---|---|---|---|
| (2-1) | 32.1 | $2.6 \times 10^5$ | $5.1 \times 10^5$ | 0.028 | 2.35 | 0.028 | 0.203 | 153 | 9.07 |
| (2-2) | 44.3 | $3.8 \times 10^5$ | $5.9 \times 10^5$ | 0.028 | 2.41 | 0.028 | 0.411 | 163 | 9.09 |
| (2-3) | 12.5 | $3.3 \times 10^5$ | $5.7 \times 10^5$ | 0.029 | 2.49 | 0.029 | 0.237 | 159 | 9.01 |
| (2-4) | 29.8 | $2.7 \times 10^5$ | $6.1 \times 10^5$ | 0.043 | 2.45 | 0.043 | 0.401 | 112 | 9.07 |
| (2-5) | 23.7 | $3.1 \times 10^5$ | $5.8 \times 10^5$ | 0.014 | 2.37 | 0.014 | 0.189 | 135 | 9.07 |
| (2-6) | 32.4 | $2.8 \times 10^5$ | $5.9 \times 10^5$ | 0.031 | 2.29 | 0.031 | 0.245 | 291 | 9.07 |
| (2-7) | 32.1 | $2.7 \times 10^5$ | $6.2 \times 10^5$ | 0.033 | 2.31 | 0.033 | 0.239 | 64 | 9.07 |
| (2-8) | 32.5 | $3.0 \times 10^5$ | $7.1 \times 10^5$ | 0.029 | 2.32 | 0.029 | 0.226 | 305 | 9.07 |
| (2-9) | 32.8 | $3.0 \times 10^5$ | $7.1 \times 10^5$ | 0.034 | 2.36 | 0.034 | 0.228 | 57 | 9.07 |
| (2-10) | 31.5 | $2.7 \times 10^5$ | $7.2 \times 10^5$ | 0.031 | 2.39 | 0.031 | 0.214 | 162 | 9.13 |
| (2-11) | 34.1 | $3.6 \times 10^5$ | $5.8 \times 10^5$ | 0.029 | 2.25 | 0.028 | 0.197 | 165 | 9.07 |
| (2-12) | 35.2 | $4.6 \times 10^5$ | $6.6 \times 10^5$ | 0.021 | 2.29 | 0.021 | 0.189 | 159 | 9.07 |

TABLE 2-continued

| Resin particle dispersion Name | Tg ° C. | G'90-50 (small) Pa | G'90-150 (large) Pa | Tanδ 30-150 (small) — | Tanδ 30-150 (large) — | Tanδ 65-150 (small) — | Tanδ 65-150 (large) — | Average particle size nm | SP value (cal/cm³)^1/2 |
|---|---|---|---|---|---|---|---|---|---|
| (2-C1) | 39.8 | $2.9 \times 10^5$ | $6.9 \times 10^5$ | 0.026 | 2.45 | 0.026 | 0.221 | 165 | 9.10 |
| (2-C2) | 22.6 | $3.4 \times 10^5$ | $6.3 \times 10^5$ | 0.090 | 2.32 | 0.033 | 0.631 | 190 | 9.09 |

Preparation of Colorant Particle Dispersion (1)

Cyan pigment (PigmentBlue 15:3, manufactured by Dainichiseika Color & Chemicals Mfg. Co., Ltd.): 98 parts Anionic surfactant (manufactured by Tayca Corporation, TaycaPower): 2 parts Deionized water: 420 parts The above-described materials are mixed together and dispersed for 10 minutes with a homogenizer (IKA ULTRA-TURRAX), thereby obtaining a colorant particle dispersion (1) having a volume-average particle size of 164 nm and a solid content of 21.1%.

Preparation of Release Agent Particle Dispersion (1)

Synthetic wax (FNP92, manufactured by NIPPON SEIRO CO., LTD.): 50 parts

Anionic surfactant (manufactured by Tayca Corporation, TaycaPower): 1 part

Deionized water: 200 parts

The above-described materials are mixed and heated to 130° C., subjected to a dispersion treatment with a homogenizer (ULTRA-TURRAX T50, manufactured by IKA), and then subjected to a dispersion treatment with a pressure jet-type homogenizer. At a point in time when the volume-average particle size reaches 200 nm, the dispersed resultant is collected, thereby obtaining a release agent particle dispersion (1) having a solid content of 20%.

Manufacturing of Toner Particles

Manufacturing of Toner Particles (1)

Amorphous resin particle dispersion (1-1): 169 parts

Crystalline resin particle dispersion (1-4): 53 parts

Resin particle dispersion (2-1): 33 parts

Colorant dispersion (1): 33 parts

Release agent dispersion (1): 25 parts

Anionic surfactant (Dowfax2A1 manufactured by The Dow Chemical Company): 4.8 parts The above-described materials with a liquid temperature adjusted to 10° C. are put in a cylindrical stainless steel container, and dispersed and mixed together for 2 minutes in a state where a shearing force is applied at 4,000 rpm by a homogenizer (ULTRA-TURRAX T50 manufactured by IKA). Next, 1.75 parts of a 10% aqueous nitric acid solution of aluminum sulfate as an aggregating agent is slowly added dropwise to the mixture, and dispersed for 10 minutes by the homogenizer at a rotation speed of 10,000 rpm, thereby obtaining a raw material dispersion.

The raw material dispersion is transferred to a reaction vessel equipped with a stirrer having a stirrer blade of two paddles, and a thermometer. While stirring at a rotation speed of 550 rpm, heating is started with a mantle heater to raise the liquid temperature to 40° C., pH of the raw material dispersion is controlled in a range of 2.2 to 3.5 with 0.3 M of nitric acid and 1 M aqueous sodium hydroxide solution, and the temperature and pH are maintained for about 2 hours to grow aggregated particles. Next, a dispersion obtained by mixing 21 parts of the amorphous resin particle dispersion (1-1) and 8 parts of the resin particle dispersion (2-1) is additionally added to the mixture, and the mixture is retained for 60 minutes to adhere the amorphous resin particles and crosslinked resin particles to the surface of the aggregated particles. Next, the liquid temperature is raised to 53° C., 21 parts of the amorphous resin particle dispersion (1-1) is additionally added to the mixture, and the mixture is retained for 60 minutes to further adhere the amorphous resin particles to the surface of the aggregated particles.

The aggregated particles are prepared in a state in which the size and morphology of the particles are checked using an optical microscope and a particle size measuring device. Next, pH is adjusted to 7.8 using a 5% aqueous sodium hydroxide solution, and the dispersion is retained for 15 minutes. Next, the pH is raised to 8.0 using the 5% aqueous sodium hydroxide solution, and the liquid temperature is raised to 85° C. After confirming by the optical microscope that the aggregated particles coalesce, the heating is stopped after 2 hours, and the mixture is cooled at a rate of 1.0° C./min. After solid-liquid separation with a 20 μm mesh and repeated washing with water, the mixture is dried in a vacuum dryer to obtain toner particles (1). The volume-average particle size of the toner particles (1) is 5.3 μm.

Manufacturing of Toner Particles (2) to (15), (17), (18), (23) to (30), (C1), and (C2)

Each toner particle is manufactured in the same manner as in the manufacturing of the toner particles (1), except that, using resin particle dispersions of the types described in Tables 3-1 to 3-3, each of the amounts of resin particle dispersion added is adjusted such that the contents of crystalline resin and resin particles are as shown in Tables 3-1 to 3-3.

Manufacturing of Toner Particles (16)

Toner particles (16) are manufactured in the same manner as in the manufacturing of the toner particles (1), except that the rotation speed of the homogenizer in preparing the raw material dispersion is changed from 10,000 rpm to 5,000 rpm.

Manufacturing of Toner Particles (19)

Toner particles (19) are manufactured in the same manner as in the manufacturing of the toner particles (1), except that the pH at which the aggregated particles coalesce is changed from 8.0 to 9.0.

Manufacturing of Toner Particles (20)

Toner particles (20) are manufactured in the same manner as in the manufacturing of the toner particles (1), except that the pH at which the aggregated particles coalesce is changed from 8.0 to 5.5.

Manufacturing of Toner Particles (21)

Toner particles (21) are manufactured in the same manner as in the manufacturing of the toner particles (1), except that each of the amounts of resin particle dispersion added is adjusted such that the contents of crystalline resin and resin particles are as shown in Table 3-2, and the pH at which the aggregated particles coalesce is changed from 8.0 to 9.5.

Manufacturing of Toner Particles (22)

Toner particles (22) are manufactured in the same manner as in the manufacturing of the toner particles (1), except that each of the amounts of resin particle dispersion added is adjusted such that the contents of crystalline resin and resin particles are as shown in Table 3-2, and the pH at which the aggregated particles coalesce is changed from 8.0 to 6.0.

Manufacturing of Toner Particles (C3)

Amorphous resin particle dispersion (1-1): 169 parts
Crystalline resin particle dispersion (1-4): 53 parts
Resin particle dispersion (2-1): 33 parts
Colorant dispersion (1): 33 parts
Release agent dispersion (1): 25 parts
Anionic surfactant (Dowfax2A1 manufactured by The Dow Chemical Company): 4.8 parts The above-described materials with a liquid temperature adjusted to 30° C. are put in a cylindrical stainless steel container, and dispersed and mixed together for 2 minutes in a state where a shearing force is applied at 4,000 rpm by a homogenizer (ULTRA-TURRAX T50 manufactured by IKA). Next, 1.75 parts of a 10% aqueous nitric acid solution of aluminum sulfate as an aggregating agent is slowly added dropwise to the mixture, and dispersed for 3 minutes by the homogenizer at a rotation speed of 4,000 rpm, thereby obtaining a raw material dispersion.

The raw material dispersion is transferred to a reaction vessel equipped with a stirrer having a stirrer blade of two paddles, and a thermometer. While stirring at a rotation speed of 550 rpm, heating is started with a mantle heater to raise the liquid temperature to 40° C., pH of the raw material dispersion is controlled in a range of 2.2 to 3.5 with 0.3 M of nitric acid and 1 M aqueous sodium hydroxide solution, and the temperature and pH are maintained for about 2 hours to grow aggregated particles. Next, a dispersion obtained by mixing 21 parts of the amorphous resin particle dispersion (1-1) and 8 parts of the resin particle dispersion (2-1) is additionally added to the mixture, and the mixture is retained for 60 minutes to adhere the amorphous resin particles and crosslinked resin particles to the surface of the aggregated particles. Next, the liquid temperature is raised to 53° C., 21 parts of the amorphous resin particle dispersion (1-1) is additionally added to the mixture, and the mixture is retained for 60 minutes to further adhere the amorphous resin particles to the surface of the aggregated particles.

The aggregated particles are prepared in a state in which the size and morphology of the particles are checked using an optical microscope and a particle size measuring device. Next, pH is adjusted to 7.8 using a 5% aqueous sodium hydroxide solution, and the dispersion is retained for 15 minutes. Next, the pH is raised to 8.0 using the 5% aqueous sodium hydroxide solution, and the liquid temperature is raised to 85° C. After confirming by the optical microscope that the aggregated particles coalesce, the heating is stopped after 2 hours, and the mixture is cooled at a rate of 1.0° C./min. After solid-liquid separation with a 20 μm mesh and repeated washing with water, the mixture is dried in a vacuum dryer to obtain toner particles (C3).

Manufacturing of Toner Particles (C4)

Amorphous resin particle dispersion (1-1): 169 parts
Crystalline resin particle dispersion (1-4): 53 parts
Resin particle dispersion (2-1): 41 parts
Colorant dispersion (1): 33 parts
Release agent dispersion (1): 25 parts
Anionic surfactant (Dowfax2A1 manufactured by The Dow Chemical Company): 4.8 parts The above-described materials with a liquid temperature adjusted to 30° C. are put in a cylindrical stainless steel container, and dispersed and mixed together for 2 minutes in a state where a shearing force is applied at 4,000 rpm by a homogenizer (ULTRA-TURRAX T50 manufactured by IKA). Next, 1.75 parts of a 10% aqueous nitric acid solution of aluminum sulfate as an aggregating agent is slowly added dropwise to the mixture, and dispersed for 3 minutes by the homogenizer at a rotation speed of 4,000 rpm, thereby obtaining a raw material dispersion.

The raw material dispersion is transferred to a reaction vessel equipped with a stirrer having a stirrer blade of two paddles, and a thermometer. While stirring at a rotation speed of 550 rpm, heating is started with a mantle heater to raise the liquid temperature to 40° C., pH of the raw material dispersion is controlled in a range of 2.2 to 3.5 with 0.3 M of nitric acid and 1 M aqueous sodium hydroxide solution, and the temperature and pH are maintained for about 2 hours to grow aggregated particles. Next, 42 parts of the amorphous resin particle dispersion (1-1) is additionally added to the mixture, and the mixture is retained for 60 minutes to adhere the amorphous resin particles to the surface of the aggregated particles.

The aggregated particles are prepared in a state in which the size and morphology of the particles are checked using an optical microscope and a particle size measuring device. Next, pH is adjusted to 7.8 using a 5% aqueous sodium hydroxide solution, and the dispersion is retained for 15 minutes. Next, the pH is raised to 8.0 using the 5% aqueous sodium hydroxide solution, and the liquid temperature is raised to 85° C. After confirming by the optical microscope that the aggregated particles coalesce, the heating is stopped after 2 hours, and the mixture is cooled at a rate of 1.0° C./min. After solid-liquid separation with a 20 μm mesh and repeated washing with water, the mixture is dried in a vacuum dryer to obtain toner particles (C4).

Manufacturing of Toner Particles (C5)

Amorphous resin particle dispersion (1-1): 169 parts
Crystalline resin particle dispersion (1-4): 53 parts
Colorant dispersion (1): 33 parts
Release agent dispersion (1): 25 parts
Anionic surfactant (Dowfax2A1 manufactured by The Dow Chemical Company): 4.8 parts The above-described materials with a liquid temperature adjusted to 30° C. are put in a cylindrical stainless steel container, and dispersed and mixed together for 2 minutes in a state where a shearing force is applied at 4,000 rpm by a homogenizer (ULTRA-TURRAX T50 manufactured by IKA). Next, 1.75 parts of a 10% aqueous nitric acid solution of aluminum sulfate as an aggregating agent is slowly added dropwise to the mixture, and dispersed for 3 minutes by the homogenizer at a rotation speed of 4,000 rpm, thereby obtaining a raw material dispersion.

The raw material dispersion is transferred to a reaction vessel equipped with a stirrer having a stirrer blade of two paddles, and a thermometer. While stirring at a rotation speed of 550 rpm, heating is started with a mantle heater to raise the liquid temperature to 40° C., pH of the raw material dispersion is controlled in a range of 2.2 to 3.5 with 0.3 M of nitric acid and 1 M aqueous sodium hydroxide solution, and the temperature and pH are maintained for about 2 hours to grow aggregated particles. Next, a dispersion obtained by mixing 42 parts of the amorphous resin particle dispersion (1-1) and 41 parts of the resin particle dispersion (2-1) is divided in half and additionally added to the mixture in two portions, and the mixture is retained for 60 minutes to adhere the amorphous resin particles and crosslinked resin particles to the surface of the aggregated particles.

The aggregated particles are prepared in a state in which the size and morphology of the particles are checked using an optical microscope and a particle size measuring device. Next, pH is adjusted to 7.8 using a 5% aqueous sodium hydroxide solution, and the dispersion is retained for 15 minutes. Next, the pH is raised to 8.0 using the 5% aqueous sodium hydroxide solution, and the liquid temperature is raised to 85° C. After confirming by the optical microscope that the aggregated particles coalesce, the heating is stopped after 2 hours, and the mixture is cooled at a rate of 1.0° C./min. After solid-liquid separation with a 20 μm mesh and repeated washing with water, the mixture is dried in a vacuum dryer to obtain toner particles (C5).

Manufacturing of Toner Particles (C6)

Toner particles (C6) are manufactured in the same manner as in the manufacturing of the toner particles (1), except that the resin particle dispersion (2-1) is not used.

Tables 3-1 to 3-3 show the types of dispersions used to manufacture the toner particles, the average particle size Dp of the resin particles in the toner particles, the proportion of the resin particles to the toner particles, the proportion of the crystalline resin to the binder resin, the volume-average particle size of the toner particles, and the like.

Abbreviations in Tables 3-1 to 3-3 have the following meanings.

Crystalline resin/resin particles: mass-based content of crystalline resin with respect to content of resin particles Amorphous resin/resin particles: mass-based content of amorphous resin with respect to content of resin particles THF-soluble component Mn: number-average molecular weight of tetrahydrofuran-soluble components of toner particles SP value difference: SP value (S)–SP value (R)

30-50G': storage elastic modulus G' of extra components of toner particles in a range of 30° C. or higher and 50° C. or lower Reached temperature: temperature at which the storage elastic modulus G' of extra components of toner particles reaches less than $1\times10^5$ Pa tan δ: loss tangent tan δ at the above-described reached temperature

TABLE 3-1

| Toner particles Name | Amorphous resin particle dispersion (1) Name | Resin particle dispersion (2) Name | Average particle size of resin particles Dp nm | Proportion of resin particles to toner particles % by mass | Proportion of crystalline resin to binder resin % by mass | Crystalline resin/resin particles — | Amorphous resin/resin particles — | THF-soluble component Mn — | SP value difference (cal/cm$^3$)$^{1/2}$ | Extra component 30-50G' Pa | Extra component Reached temperature ° C. | Extra component tanδ — | Volume-average particle size μm |
|---|---|---|---|---|---|---|---|---|---|---|---|---|---|
| (1) | (1-1) | (2-1) | 153 | 10 | 15 | 1.35 | 7.65 | 8891 | −0.26 | $3.0\times10^8$-$5.3\times10^8$ | 72 | 1.40 | 5.3 |
| (2) | (1-1) | (2-2) | 163 | 10 | 15 | 1.35 | 7.65 | 8351 | −0.26 | $3.0\times10^8$-$5.3\times10^8$ | 72 | 1.40 | 4.5 |
| (3) | (1-1) | (2-3) | 159 | 10 | 15 | 1.35 | 7.65 | 8931 | −0.26 | $3.0\times10^8$-$5.3\times10^8$ | 72 | 1.4 | 4.3 |
| (4) | (1-1) | (2-4) | 112 | 10 | 15 | 1.35 | 7.65 | 9021 | −0.28 | $3.0\times10^8$-$5.3\times10^8$ | 72 | 1.40 | 5.6 |
| (5) | (1-1) | (2-5) | 135 | 10 | 15 | 1.35 | 7.65 | 10751 | −0.28 | $3.0\times10^8$-$5.3\times10^8$ | 72 | 1.40 | 4.2 |
| (6) | (1-1) | (2-6) | 291 | 10 | 15 | 1.35 | 7.65 | 7370 | −0.28 | $3.0\times10^8$-$5.3\times10^8$ | 72 | 1.40 | 4.4 |
| (7) | (1-1) | (2-7) | 64 | 10 | 15 | 1.35 | 7.65 | 9511 | −0.28 | $3.0\times10^8$-$5.3\times10^8$ | 72 | 1.40 | 4.5 |
| (8) | (1-1) | (2-8) | 305 | 10 | 15 | 1.35 | 7.65 | 9617 | −0.28 | $3.0\times10^8$-$5.3\times10^8$ | 72 | 1.40 | 4.7 |
| (9) | (1-1) | (2-9) | 57 | 10 | 15 | 1.35 | 7.65 | 7404 | −0.28 | $3.0\times10^8$-$5.3\times10^8$ | 72 | 1.40 | 4.4 |
| (10) | (1-1) | (2-1) | 153 | 29 | 15 | 0.37 | 2.08 | 8436 | −0.26 | $3.0\times10^8$-$5.3\times10^8$ | 72 | 1.40 | 4.8 |
| (11) | (1-1) | (2-1) | 153 | 2 | 15 | 7.35 | 41.65 | 11166 | −0.26 | $3.0\times10^8$-$5.3\times10^8$ | 72 | 1.40 | 4.2 |
| (12) | (1-1) | (2-1) | 153 | 4 | 49 | 11.76 | 12.24 | 8192 | −0.13 | $9.1\times10^7$-$2.3\times10^8$ | 69 | 1.52 | 4.5 |

TABLE 3-2

| Toner particles Name | Amorphous resin particle dispersion (1) Name | Resin particle dispersion (2) Name | Average particle size of resin particles Dp nm | Proportion of resin particles to toner particles % by mass | Proportion of crystalline resin to binder resin % by mass | Crystalline resin/resin particles — | Amorphous resin/resin particles — | THF-soluble component Mn — | SP value difference (cal/cm$^3$)$^{1/2}$ | Extra component 30-50G' Pa | Extra component Reached temperature ° C. | Extra component tanδ — | Volume-average particle size μm |
|---|---|---|---|---|---|---|---|---|---|---|---|---|---|
| (13) | (1-1) | (2-1) | 153 | 10 | 4 | 0.36 | 8.64 | 9224 | −0.30 | $3.8\times10^8$-$6.0\times10^8$ | 77 | 1.21 | 4.5 |
| (14) | (1-1) | (2-10) | 162 | 10 | 0 | 0.00 | 9.00 | 9683 | −0.28 | $5.5\times10^8$-$7.0\times10^8$ | 86 | 1.55 | 4.4 |

TABLE 3-2-continued

| Toner particles Name | Amorphous resin particle dispersion (1) Name | Resin particle dispersion (2) Name | Average particle size of resin particles Dp nm | Proportion of resin particles to toner particles % by mass | Proportion of crystalline resin to binder resin % by mass | Crystalline resin/resin particles — | Amorphous resin/resin particles — | THF-soluble component Mn — | SP value difference $(cal/cm^3)^{1/2}$ | Extra component | | | Volume-average particle size μm |
|---|---|---|---|---|---|---|---|---|---|---|---|---|---|
| | | | | | | | | | | 30-50G' Pa | Reached temperature ° C. | tanδ — | |
| (15) | (1-2) | (2-1) | 153 | 10 | 10 | 1.35 | 7.65 | 8942 | −0.18 | $4.3 \times 10^8$-$6.1 \times 10^8$ | 81 | 1.51 | 5.1 |
| (16) | (1-1) | (2-1) | 153 | 10 | 15 | 1.35 | 7.65 | 9834 | −0.26 | $3.0 \times 10^8$-$5.3 \times 10^8$ | 72 | 1.40 | 4.9 |
| (17) | (1-1) | (2-1) | 153 | 10 | 5 | 0.45 | 8.55 | 8805 | −0.30 | $3.7 \times 10^8$-$5.9 \times 10^8$ | 90 | 1.24 | 5.1 |
| (18) | (1-1) | (2-1) | 153 | 15 | 23 | 1.30 | 4.36 | 7608 | −0.23 | $1.2 \times 10^8$-$4.5 \times 10^8$ | 68 | 1.43 | 5.5 |
| (19) | (1-1) | (2-1) | 153 | 10 | 15 | 1.35 | 7.65 | 7786 | −0.26 | $3.0 \times 10^8$-$5.3 \times 10^8$ | 71 | 1.57 | 4.9 |
| (20) | (1-1) | (2-1) | 153 | 10 | 15 | 1.35 | 7.65 | 9421 | −0.26 | $3.0 \times 10^8$-$5.3 \times 10^8$ | 76 | 0.85 | 4.5 |
| (21) | (1-1) | (2-1) | 153 | 3 | 15 | 4.85 | 27.48 | 9207 | −0.26 | $3.0 \times 10^8$-$5.3 \times 10^8$ | 71 | 1.51 | 4.3 |
| (22) | (1-1) | (2-1) | 153 | 19 | 15 | 0.64 | 3.62 | 7815 | −0.26 | $3.0 \times 10^8$-$5.3 \times 10^8$ | 75 | 0.92 | 4.7 |
| (23) | (1-1) | (2-3) | 159 | 5 | 25 | 4.75 | 14.25 | 7780 | −0.24 | $3.0 \times 10^8$-$5.3 \times 10^8$ | 72 | 1.40 | 4.4 |
| (24) | (1-1) | (2-1) | 153 | 1 | 15 | 14.85 | 84.15 | 7624 | −0.26 | $3.0 \times 10^8$-$5.3 \times 10^8$ | 72 | 1.40 | 4.8 |

TABLE 3-3

| Toner particles Name | Amorphous resin particle dispersion (1) Name | Resin particle dispersion (2) Name | Average particle size of resin particles Dp nm | Proportion of resin particles to toner particles % by mass | Proportion of crystalline resin to binder resin % by mass | Crystalline resin/resin particles — | Amorphous resin/resin particles — | THF-soluble component Mn — | SP value difference $(cal/cm^3)^{1/2}$ | Extra component | | | Volume-average particle size μm |
|---|---|---|---|---|---|---|---|---|---|---|---|---|---|
| | | | | | | | | | | 30-50G' Pa | Reached temperature ° C. | tanδ — | |
| (25) | (1-1) | (2-1) | 153 | 31 | 15 | 0.33 | 1.89 | 9673 | −0.26 | $3.0 \times 10^8$-$5.3 \times 10^8$ | 72 | 1.40 | 4.7 |
| (26) | (1-1) | (2-2) | 163 | 10 | 4 | 0.36 | 8.64 | 7743 | −0.32 | $3.0 \times 10^8$-$5.3 \times 10^8$ | 72 | 1.40 | 4.7 |
| (27) | (1-1) | (2-10) | 162 | 10 | 49 | 4.41 | 4.59 | 8596 | −0.09 | $3.0 \times 10^8$-$5.3 \times 10^8$ | 72 | 1.40 | 4.8 |
| (28) | (1-3) | (2-1) | 153 | 10 | 15 | 1.35 | 7.65 | 9201 | −0.22 | $3.4 \times 10^8$-$5.5 \times 10^8$ | 71 | 1.42 | 4.7 |
| (29) | (1-1) | (2-11) | 165 | 10 | 15 | 1.35 | 7.65 | 8657 | −0.26 | $3.0 \times 10^8$-$5.3 \times 10^8$ | 72 | 1.40 | 4.4 |
| (30) | (1-1) | (2-12) | 159 | 10 | 15 | 1.35 | 7.65 | 9524 | −0.26 | $3.0 \times 10^8$-$5.3 \times 10^8$ | 72 | 1.40 | 4.4 |
| (C1) | (1-1) | (2-C1) | 165 | 10 | 15 | 1.35 | 7.65 | 7400 | −0.25 | $3.0 \times 10^8$-$5.3 \times 10^8$ | 72 | 1.40 | 4.3 |
| (C2) | (1-1) | (2-C2) | 190 | 10 | 15 | 1.35 | 7.65 | 7892 | −0.26 | $3.0 \times 10^8$-$5.3 \times 10^8$ | 72 | 1.40 | 4.2 |
| (C3) | (1-1) | (2-1) | 153 | 10 | 15 | 1.35 | 7.65 | 8858 | −0.26 | $3.0 \times 10^8$-$5.3 \times 10^8$ | 72 | 1.40 | 4.8 |
| (C4) | (1-1) | (2-1) | 153 | 10 | 15 | 1.35 | 7.65 | 8209 | −0.26 | $3.0 \times 10^8$-$5.3 \times 10^8$ | 72 | 1.40 | 4.3 |
| (C5) | (1-1 | (2-1) | 153 | 10 | 15 | 1.35 | 7.65 | 8429 | −0.26 | $3.0 \times 10^8$-$5.3 \times 10^8$ | 72 | 1.40 | 4.6 |
| (C6) | (1-1) | — | — | 0 | 15 | — | — | 9015 | — | $3.0 \times 10^8$-$5.3 \times 10^8$ | 72 | 1.40 | 4.9 |

Manufacturing of Silica Particles (A)

Preparation of Alkali Catalyst Solution

Methanol and aqueous ammonia in amounts and concentrations shown in Table 4 are put into a glass reaction vessel equipped with a metal stirring rod, a dripping nozzle, and a thermometer, and stirred and mixed together, thereby obtaining an alkali catalyst solution.

Granulation of Silica Base Particles by Sol-Gel Method

The temperature of the alkali catalyst solution is adjusted to 40° C., and the alkali catalyst solution is subjected to nitrogen purging. While the alkali catalyst solution is stirred at a liquid temperature kept at 40° C., tetramethoxysilane (TMOS) in the amount shown in Table 4 and 124 parts of aqueous ammonia having a catalyst ($NH_3$) concentration of 7.9% are simultaneously added dropwise to the solution, thereby obtaining a silica base particle suspension.

Addition of Silane Coupling Agent

While the silica base particle suspension is stirred at a liquid temperature kept at 40° C., methyltrimethoxysilane (MTMS) in the amount shown in Table 4 is added thereto.

X-Ray Fluorescence Analysis

X-ray fluorescence analysis is performed on the silica particles (A) according to the measurement method described above, the Net intensity $N_{Mo}$ of a molybdenum element and the Net intensity $N_{Si}$ of a silicon element are determined, and the Net intensity ratio $N_{Mo}/N_{Si}$ is calculated.

Table 4 shows the average primary particle size and Net intensity ratio of the silica particles (A1) to (A13).

TABLE 4

| Silica particles (A) Name — | Granulation of silica base particles: Methanol Part by mass | Aqueous ammonia Part by mass | Ammonia concentration % by mass | TMOS Part by mass | Surface coating MTMS Part by mass | Molybdenum nitrogen-containing compound: Substance name — | Addition amount Part by mass | Silica particles: Average primary particle size nm | $N_{Mo}$ kcps | $N_{Mo}/N_{Si}$ — |
|---|---|---|---|---|---|---|---|---|---|---|
| (A9) | 950 | 166 | 9.6 | 1000 | 10 | TP-415 | 0.5 | 61 | 6 | 0.030 |
| (A1) | 950 | 166 | 9.6 | 1000 | 22 | TP-415 | 1 | 61 | 8 | 0.035 |
| (A2) | 950 | 166 | 9.6 | 1000 | 30 | TP-415 | 4 | 61 | 22 | 0.10 |
| (A3) | 950 | 166 | 9.6 | 1000 | 50 | Ditetrakis(dibutyldibenzylammonium) molybdate | 5 | 62 | 31 | 0.18 |
| (A4) | 950 | 166 | 9.6 | 1000 | 170 | TP-415 | 20 | 62 | 58 | 0.25 |
| (A5) | 950 | 166 | 9.6 | 1000 | 180 | TP-415 | 30 | 62 | 65 | 0.30 |
| (A6) | 950 | 166 | 9.6 | 1000 | 190 | TP-415 | 45 | 62 | 74 | 0.35 |
| (A7) | 950 | 166 | 9.6 | 1000 | 230 | TP-415 | 50 | 62 | 86 | 0.40 |
| (A8) | 950 | 166 | 9.6 | 1000 | 240 | TP-415 | 50 | 62 | 94 | 0.45 |
| (A10) | 950 | 166 | 9.6 | 1000 | 250 | TP-415 | 50 | 62 | 97 | 0.50 |
| (A11) | 950 | 220 | 9.1 | 1000 | 50 | TP-415 | 4 | 80 | 24 | 0.12 |
| (A12) | 950 | 160 | 9.4 | 1000 | 175 | TP-415 | 25 | 50 | 59 | 0.25 |
| (A13) | 950 | 150 | 9.2 | 1000 | 180 | TP-415 | 30 | 40 | 60 | 0.25 |

After completion of the addition, the obtained suspension is stirred for 120 minutes, such that MTMS reacts and at least a part of the surface of the silica base particles is coated with the reaction product of MTMS.

Addition of Molybdenum Nitrogen-Containing Compound

The molybdenum nitrogen-containing compound in the amount shown in Table 4 is diluted with butanol, thereby producing an alcohol solution. The alcohol solution is added to the silica base particle suspension obtained after the reaction with the silane coupling agent, and the mixture is stirred for 100 minutes at a liquid temperature kept at 30° C. The amount of the alcohol solution added is set such that the number of parts of the molybdenum nitrogen-containing compound is as shown in Table 4 with respect to 100 parts by mass of the solids of the silica base particle suspension. "TP-415" in Table 4 is a Quaternary Ammonium Salt of Molybdic Acid (Hodogaya Chemical Co., Ltd.).

Drying

The suspension obtained after the addition of the molybdenum nitrogen-containing compound is moved to a reaction vessel for drying. While the suspension is stirred, liquefied carbon dioxide is injected into the reaction vessel, the internal temperature and internal pressure of the reaction vessel are raised to 150° C. and 15 MPa respectively, and the suspension is continuously stirred in a state where the temperature and pressure are kept and the supercritical state of the carbon dioxide is maintained. The carbon dioxide is flowed in and out at a flow rate of 5 L/min, and the solvent is removed for 120 minutes, thereby obtaining silica particles (A). Silica particles (A1) to (A13) are separately prepared by adjusting the amounts of aqueous ammonia, a silane coupling agent, and a molybdenum nitrogen-containing compound added.

Manufacturing of Silica Particles (B)

Manufacturing of Silica Particles (B1)

Silica particles having an average primary particle size of 80 nm, 120 nm, and 150 nm are manufactured by a known sol-gel method, respectively. The silica particles are surface-treated with 1,1,1,3,3,3-hexamethyldisilazane (HMDS) to obtain three types of silica particles (B1), having different average primary particle sizes.

Manufacturing of Silica Particles (B2)

Silica particles having an average primary particle size of 55 nm are manufactured by a known sol-gel method. 100 parts of the silica particles and 500 parts of toluene are put into an evaporator, and the mixture is stirred for 15 minutes while maintaining the temperature at 40° C. Next, 10 parts of dimethyl silicone oil is added to 100 parts of the silica particles and stirred for 15 minutes, and then 20 parts of dimethyl silicone oil is additionally added to the mixture and stirred for 15 minutes. The temperature is raised to 90° C., and the toluene is dried under reduced pressure. Next, the treated product is taken out and dried in a vacuum at a temperature of 120° C. for 30 minutes to obtain silica particles (B2).

Manufacturing of Strontium Titanate Particles

Manufacturing of Strontium Titanate Particles (1)

Metatitanic acid that is a desulfurized and deflocculated titanium source is collected in an amount of 0.7 mol as $TiO_2$ and put in a reaction vessel. Next, 0.77 mol of an aqueous strontium chloride solution is added to the reaction vessel such that the molar ratio of $SrO/TiO_2$ is 1.1. Thereafter, a solution obtained by dissolving lanthanum oxide in nitric acid is added to the reaction vessel, in an amount that makes the amount of lanthanum (La) be 0.5 mol with respect to 100 mol of strontium. The initial $TiO_2$ concentration in the mixed solution of the three materials is adjusted to 0.75 mol/L.

Next, the mixed solution is stirred and heated to 92° C., 153 mL of a 10N aqueous sodium hydroxide solution is added thereto for 3 hours in a state where the mixed solution is stirred at a liquid temperature kept at 92° C., and the obtained reaction solution is continuously stirred for 1 hour at a liquid temperature kept at 92° C. Next, the reaction solution is cooled to 40° C., hydrochloric acid is added thereto until the pH reaches 5.4, and the reaction solution is stirred for 1 hour. Next, decantation and redispersion in water are repeated to wash the precipitate. Hydrochloric acid is added to the slurry containing the washed precipitate such that the pH is adjusted to 6.5, solid-liquid separation is performed by filtration, and the solids are dried. i-Butyltrimethoxysilane (i-BTMS) in an ethanol solution is added to the dried solids, in an amount that makes the amount of the i-BTMS be 20 parts with respect to 100 parts of the solids, followed by stirring for 1 hour. Solid-liquid separation is performed by filtration, and the solids are dried in the air at 130° C. for 7 hours, thereby obtaining strontium titanate particles (1).

Manufacturing of Strontium Titanate Particles (2) to (8)

Strontium titanate particles (2) to (8) are obtained in the same manner as in the manufacturing of the strontium titanate particles (1), except that the time taken for adding 10N aqueous sodium hydroxide solution dropwise is changed.

Table 5 shows the average primary particle size of the strontium titanate particles (1) to (8).

TABLE 5

| Strontium titanate particles | | | | |
|---|---|---|---|---|
| Name — | Dopant Type | Doped amount mol | Dropwise addition time of NaOH Hour | Average primary particle size nm |
| (1) | La | 0.5 | 2.5 | 20 |
| (2) | La | 0.5 | 3.5 | 30 |
| (3) | La | 0.5 | 4 | 40 |
| (4) | La | 0.5 | 4.5 | 50 |
| (5) | La | 0.5 | 5 | 60 |
| (6) | La | 0.5 | 5.5 | 70 |
| (7) | La | 0.5 | 6 | 80 |
| (8) | La | 0.5 | 6.5 | 85 |

Manufacturing of Carrier

Cyclohexyl methacrylate resin (weight-average molecular weight: 50,000): 54 parts Carbon black (manufactured by Cabot Corporation, VXC72): 6 parts Toluene: 250 parts Isopropyl alcohol: 50 parts The above-described materials and glass beads (diameter 1 mm, the same amount as toluene) are put in a sand mill and stirred at a rotation speed of 190 rpm for 30 minutes, thereby obtaining a coating agent.

Ferrite particles (1,000 parts, volume-average particle size of 35 μm) and 150 parts of the coating agent are put in a kneader and mixed together at room temperature (25° C.) for 20 minutes. Next, the mixture is heated to 70° C. and dried under reduced pressure. The dried product is cooled to room temperature (25° C.), taken out of the kneader, and sieved with a mesh having an opening size of 75 μm to remove coarse powder, thereby obtaining a carrier.

Manufacturing of Toner and Two-Component Developer

Examples 1 to 34 and Comparative Examples 1 and 2

100 parts of the toner particles (1), any of the silica particles (A1) to (A13), any of the strontium titanate particles (1) to (8), any of the three types of the silica particles (B1), having different average primary particle sizes, and the silica particles (B2) are mixed with a Henschel mixer in amounts shown in Table 6-1 and the like, and each of the obtained mixtures is sieved with a vibrating sieve having an opening size of 45 μm, thereby obtaining toners. 8 parts of the toner and 100 parts of the carrier are put in a V blender, stirred, and sieved with a sieve having an opening size of 212 μm, thereby obtaining a two-component developer.

Examples 35 to 68 and Comparative Example 3

Toners and two-component developers are manufactured in the same manner as in Example 4, except that 100 parts of the toner particles (1) is changed to 100 parts of any of toner particles (2) to (30) and (C1) to (C6).

Performance Evaluation

Fluidity of Toner

An image forming apparatus DocuCenter-V C7775 (manufactured by FUJIFILM Business Innovation Corp.) and a detachable toner cartridge container for the image forming apparatus are prepared. The image forming apparatus includes a pipe having a relatively small diameter and being bent into an L shape in a toner transport path from the toner cartridge to a developing device. That is, in the image forming apparatus, relatively strong mechanical stress is applied to the toner in the toner transport path.

Each toner of the examples and the comparative examples is contained in the toner cartridge container to form a toner cartridge. The toner cartridge is placed vertically, and placed in an environment of a temperature of 32° C. and a relative humidity of 95% for 7 days. Thereafter, a weight is dropped from a height of 10 cm in the vertical orientation, and the process is repeated 50 times. Thereafter, the toner cartridge is attached to the above-described image forming apparatus. The developing device of the image forming apparatus is filled with each developer of the examples and the comparative examples. A developer toner concentration is measured before operation.

In an environment of a temperature of 28° C. and a relative humidity of 85%, a full-page halftone image having a density of 5% is continuously printed on 10,000 sheets of plain paper of A3 size. Thereafter, the toner concentration in the developer is measured, and the difference in toner concentration before and after the image formation is classified as follows. The results are shown in Table 6-1 and the like and Table 7-1 and the like.

A: difference in toner concentration is less than 0.5%.

A−: difference in toner concentration is 0.5% or more and less than 0.8%.

B: difference in toner concentration is 0.8% or more and less than 1.5%.

C: difference in toner concentration is 1.5% or more and less than 2.0%.

D: difference in toner concentration is 2.0% or more and less than 2.5%.

E: difference in toner concentration is 2.5% or more.

Difference in Glossiness

Each developer of Examples and Comparative Examples is filled into a developing device of an image forming apparatus ApeosPortIV C3370 (manufactured by FUJIFILM Business Innovation Corp.) from which a fixing device is taken out.

The fixing device taken out from the image forming apparatus is modified to prepare a fixing device capable of arbitrarily changing the fixing temperature and the nip pressure.

An unfixed image of 50 mm×50 mm with a toner application amount of 0.45 mg/cm$^2$ is output on A4 size OS-coated W paper (basis weight: 127 g/m$^2$, FUJIFILM Business Innovation Corp.).

The unfixed image is fixed using the fixing device at a process speed of 175 mm/sec under two conditions of a low-temperature and low-pressure condition (fixing device temperature of 120° C. and nip pressure of 1.6 kgf/cm$^2$) and a high-temperature and high-pressure condition (fixing device temperature of 180° C. and nip pressure of 6.0 kgf/cm$^2$), thereby obtaining fixed images.

The glossiness of the fixed image is measured at a measurement angle of 60° using a glossmeter (micro-TRI-gloss, manufactured by BYK). The difference in glossiness between the fixed image in the low-temperature and low-pressure condition and the fixed image in the high-temperature and high-pressure condition is obtained. The results are shown in Table 7-1 and the like.

Fixability

The fixed image in the low-temperature and low-pressure condition in the evaluation of the difference in glossiness is bent, and a weight is placed on the bent image. The bent portion is opened, the image of the bent portion is visually observed, and the image defects are classified as follows. The results are shown in Table 7-1 and the like.

G1: no image defect is observed.

G2: image defect is observed, but the image defect is slight.

G3: slight image defect is observed, but the image defect is within an allowable range.

G4: image defect is observed.

"Addition amount" shown in Tables 6-1 and 6-2 is parts by mass with respect to 100 parts by mass of the toner particles.

TABLE 6-1

| | | Silica particles (A) | | | | Strontium titanate particles | | | Silica particles (B1) |
|---|---|---|---|---|---|---|---|---|---|
| | Toner particles Name — | Name — | $N_{Mo}/N_{Si}$ — | Average primary particle size nm | Addition amount Part | Name — | Average primary particle size nm | Addition amount Part | Average primary particle size nm |
| Comparative Example 1 | (1) | (A9) | 0.030 | 61 | 0.7 | (4) | 50 | 0.8 | 120 |
| Example 1 | (1) | (A1) | 0.035 | 61 | 0.7 | (4) | 50 | 0.8 | 120 |
| Example 2 | (1) | (A2) | 0.10 | 61 | 0.7 | (4) | 50 | 0.8 | 120 |
| Example 3 | (1) | (A3) | 0.18 | 62 | 0.7 | (4) | 50 | 0.8 | 120 |
| Example 4 | (1) | (A4) | 0.25 | 62 | 0.7 | (4) | 50 | 0.8 | 120 |
| Example 5 | (1) | (A5) | 0.30 | 62 | 0.7 | (4) | 50 | 0.8 | 120 |
| Example 6 | (1) | (A6) | 0.35 | 62 | 0.7 | (4) | 50 | 0.8 | 120 |
| Example 7 | (1) | (A7) | 0.40 | 62 | 0.7 | (4) | 50 | 0.8 | 120 |
| Example 8 | (1) | (A8) | 0.45 | 62 | 0.7 | (4) | 50 | 0.8 | 120 |
| Comparative Example 2 | (1) | (A10) | 0.50 | 62 | 0.7 | (4) | 50 | 0.8 | 120 |
| Example 9 | (1) | (A11) | 0.12 | 80 | 0.7 | (4) | 50 | 0.8 | 120 |
| Example 10 | (1) | (A12) | 0.25 | 50 | 0.7 | (4) | 50 | 0.8 | 120 |
| Example 11 | (1) | (A13 | 0.25 | 40 | 0.7 | (4) | 50 | 0.8 | 120 |
| Example 12 | (1) | (A4) | 0.25 | 62 | 0.7 | (1) | 20 | 0.8 | 120 |
| Example 13 | (1) | (A4) | 0.25 | 62 | 0.7 | (2) | 30 | 0.8 | 120 |
| Example 14 | (1) | (A4) | 0.25 | 62 | 0.7 | (3) | 40 | 0.8 | 120 |
| Example 15 | (1) | (A4) | 0.25 | 62 | 0.7 | (5) | 60 | 0.8 | 120 |
| Example 16 | (1) | (A4) | 0.25 | 62 | 0.7 | (6) | 70 | 0.8 | 120 |
| Example 17 | (1) | (A4) | 0.25 | 62 | 0.7 | (7) | 80 | 0.8 | 120 |
| Example 18 | (1) | (A4) | 0.25 | 62 | 0.7 | (8) | 85 | 0.8 | 120 |

| | Silica particles (B1) Addition amount Part | Silica particles (B2) Average particle primary size nm | Addition amount Part | Toner M2/M1 — | Surface coverage C1 % | Surface coverage C2 % | C1/C2 — | Liberated oil % | Fluidity — |
|---|---|---|---|---|---|---|---|---|---|
| Comparative Example 1 | 1.5 | 55 | 1.7 | 1.14 | 15 | 18 | 0.83 | 0.04 | E |
| Example 1 | 1.5 | 55 | 1.7 | 1.14 | 15 | 18 | 0.83 | 0.04 | D |
| Example 2 | 1.5 | 55 | 1.7 | 1.14 | 15 | 18 | 0.83 | 0.04 | B |
| Example 3 | 1.5 | 55 | 1.7 | 1.14 | 15 | 18 | 0.83 | 0.04 | A |
| Example 4 | 1.5 | 55 | 1.7 | 1.14 | 15 | 18 | 0.83 | 0.04 | A |
| Example 5 | 1.5 | 55 | 1.7 | 1.14 | 15 | 18 | 0.83 | 0.04 | A |
| Example 6 | 1.5 | 55 | 1.7 | 1.14 | 15 | 18 | 0.83 | 0.04 | B |
| Example 7 | 1.5 | 55 | 1.7 | 1.14 | 15 | 18 | 0.83 | 0.04 | C |
| Example 8 | 1.5 | 55 | 1.7 | 1.14 | 15 | 18 | 0.83 | 0.04 | D |

TABLE 6-1-continued

| | | | | | | | | | |
|---|---|---|---|---|---|---|---|---|---|
| Comparative Example 2 | 1.5 | 55 | 1.7 | 1.14 | 15 | 18 | 0.83 | 0.04 | E |
| Example 9 | 1.5 | 55 | 1.7 | 1.14 | 10 | 18 | 0.56 | 0.04 | A |
| Example 10 | 1.5 | 55 | 1.7 | 1.14 | 16 | 18 | 0.89 | 0.04 | A |
| Example 11 | 1.5 | 55 | 1.7 | 1.14 | 17 | 18 | 0.94 | 0.04 | A |
| Example 12 | 1.5 | 55 | 1.7 | 1.14 | 15 | 18 | 0.83 | 0.04 | B |
| Example 13 | 1.5 | 55 | 1.7 | 1.14 | 15 | 18 | 0.83 | 0.04 | B |
| Example 14 | 1.5 | 55 | 1.7 | 1.14 | 15 | 18 | 0.83 | 0.04 | A |
| Example 15 | 1.5 | 55 | 1.7 | 1.14 | 15 | 18 | 0.83 | 0.04 | A |
| Example 16 | 1.5 | 55 | 1.7 | 1.14 | 15 | 18 | 0.83 | 0.04 | A |
| Example 17 | 1.5 | 55 | 1.7 | 1.14 | 15 | 22 | 0.68 | 0.04 | B |
| Example 18 | 1.5 | 55 | 1.7 | 1.14 | 15 | 22 | 0.68 | 0.04 | C |

TABLE 6-2

| | | Silica particles (A) | | | | Strontium titanate particles | | | Silica particles (B1) |
|---|---|---|---|---|---|---|---|---|---|
| | Toner particles Name — | Name — | $N_{Mo}/N_{Si}$ — | Average primary particle size nm | Addition amount Part | Name — | Average primary particle size nm | Addition amount Part | Average primary particle size nm |
| Example 19 | (1) | (A4) | 0.25 | 62 | 0.7 | (4) | 50 | 0.8 | 80 |
| Example 20 | (1) | (A4) | 0.25 | 62 | 0.7 | (4) | 50 | 0.8 | 150 |
| Example 21 | (1) | (A4) | 0.25 | 62 | 0.7 | (4) | 50 | 0.8 | 120 |
| Example 22 | (1) | (A4) | 0.25 | 62 | 0.7 | (4) | 50 | 0.8 | 120 |
| Example 23 | (1) | (A4) | 0.25 | 62 | 0.7 | (4) | 50 | 0.8 | 120 |
| Example 24 | (1) | (A4) | 0.25 | 62 | 0.7 | (4) | 50 | 0.8 | 120 |
| Example 25 | (1) | (A4) | 0.25 | 62 | 0.4 | (4) | 50 | 1.2 | 120 |
| Example 26 | (1) | (A4) | 0.25 | 62 | 0.5 | (4) | 50 | 1.1 | 120 |
| Example 27 | (1) | (A4) | 0.25 | 62 | 0.8 | (4) | 50 | 0.9 | 120 |
| Example 28 | (1) | (A4) | 0.25 | 62 | 1.0 | (4) | 50 | 0.6 | 120 |
| Example 29 | (1) | (A4) | 0.25 | 62 | 1.2 | (4) | 50 | 0.4 | 120 |
| Example 30 | (1) | (A4) | 0.25 | 62 | 3.0 | (4) | 50 | 0.3 | 120 |
| Example 31 | (1) | (A4) | 0.25 | 62 | 0.2 | (4) | 50 | 1.4 | 120 |
| Example 32 | (1) | (A4) | 0.25 | 62 | 0.5 | (4) | 50 | 1.1 | 120 |
| Example 33 | (1) | (A4) | 0.25 | 62 | 0.7 | (4) | 50 | 0.8 | 120 |
| Example 34 | (1) | (A4) | 0.25 | 62 | 0.7 | (4) | 50 | 0.8 | 120 |

| | Silica particles (B1) | Silica particles (B2) | | Toner | | | | | |
|---|---|---|---|---|---|---|---|---|---|
| | Addition amount Part | Average primary particle size nm | Addition amount Part | M2/M1 — | Surface coverage C1 % | Surface coverage C2 % | C1/C2 — | Liberated oil % | Fluidity — |
| Example 19 | 1.5 | 55 | 1.7 | 1.14 | 15 | 25 | 0.60 | 0.04 | B |
| Example 20 | 1.5 | 55 | 1.7 | 1.14 | 15 | 13 | 1.15 | 0.04 | B |
| Example 21 | 1.5 | 55 | 0.3 | 1.14 | 15 | 18 | 0.83 | 0.005 | C |
| Example 22 | 1.5 | 55 | 0.5 | 1.14 | 15 | 18 | 0.83 | 0.01 | B |
| Example 23 | 1.5 | 55 | 2.5 | 1.14 | 15 | 18 | 0.83 | 0.10 | B |
| Example 24 | 1.5 | 55 | 3.0 | 1.14 | 15 | 18 | 0.83 | 0.15 | C |
| Example 25 | 1.5 | 55 | 1.7 | 3.00 | 8 | 18 | 0.44 | 0.04 | B |
| Example 26 | 1.5 | 55 | 1.7 | 2.20 | 10 | 18 | 0.56 | 0.04 | A |
| Example 27 | 1.5 | 55 | 1.7 | 1.13 | 16 | 18 | 0.89 | 0.04 | A |
| Example 28 | 1.5 | 55 | 1.7 | 0.60 | 20 | 18 | 1.11 | 0.04 | A |
| Example 29 | 1.5 | 55 | 1.7 | 0.33 | 25 | 18 | 1.39 | 0.04 | B |
| Example 30 | 1.5 | 55 | 1.7 | 0.10 | 60 | 18 | 3.33 | 0.04 | D |
| Example 31 | 2.0 | 55 | 1.7 | 7.00 | 4 | 20 | 0.20 | 0.04 | C |
| Example 32 | 2.0 | 55 | 1.7 | 2.20 | 10 | 20 | 0.50 | 0.04 | B |
| Example 33 | 1.0 | 55 | 1.7 | 1.14 | 15 | 10 | 1.50 | 0.04 | A |
| Example 34 | 0.8 | 55 | 1.7 | 1.14 | 15 | 7.5 | 2.00 | 0.04 | C |

TABLE 7-1

| | Silica particles (A) | | | | Toner particles | | Toner | | | |
|---|---|---|---|---|---|---|---|---|---|---|
| | Name — | $N_{Mo}/N_{Si}$ — | Average primary particle size Da nm | Surface coverage C1 % | Name — | Average particle size of resin particles Dp nm | Dp/Da — | D1 (90) — | D50 (90) — | D1 (150) — |
| Example 4 | (A4) | 0.25 | 62 | 15 | (1) | 153 | 2.47 | 1.21 | 1.42 | 0.60 |
| Example 35 | (A4) | 0.25 | 62 | 13 | (2) | 163 | 2.63 | 1.35 | 1.51 | 0.63 |
| Example 36 | (A4) | 0.25 | 62 | 13 | (3) | 159 | 2.56 | 1.26 | 1.42 | 0.59 |
| Example 37 | (A4) | 0.25 | 62 | 16 | (4) | 112 | 1.81 | 1.28 | 1.47 | 0.60 |
| Example 38 | (A4) | 0.25 | 62 | 12 | (5) | 135 | 2.18 | 1.33 | 1.40 | 0.58 |
| Example 39 | (A4) | 0.25 | 62 | 13 | (6) | 291 | 4.69 | 1.27 | 1.50 | 0.53 |
| Example 40 | (A4) | 0.25 | 62 | 13 | (7) | 64 | 1.03 | 1.32 | 1.48 | 0.65 |
| Example 41 | (A4) | 0.25 | 62 | 14 | (8) | 305 | 4.92 | 1.30 | 1.46 | 0.63 |
| Example 42 | (A4) | 0.25 | 62 | 13 | (9) | 57 | 0.92 | 1.26 | 1.47 | 0.60 |
| Example 43 | (A4) | 0.25 | 62 | 14 | (10) | 153 | 2.47 | 1.27 | 1.35 | 0.52 |
| Example 44 | (A4) | 0.25 | 62 | 12 | (11) | 153 | 2.47 | 1.21 | 2.12 | 0.87 |
| Example 45 | (A4) | 0.25 | 62 | 13 | (12) | 153 | 2.47 | 1.47 | 1.61 | 0.79 |

| | Toner | | | | | | Performance of toner | | |
|---|---|---|---|---|---|---|---|---|---|
| | D50 (150) — | Difference (150) — | Difference (90) — | 30-50G' Pa | Reached temperature ° C. | Viscoelastic difference — | Fluidity | Difference in glossiness | Fixability |
| Example 4 | 1.53 | 0.93 | 0.21 | $2.5 \times 10^8$-$4.8 \times 10^8$ | 82 | 3.3 | A | 4.8 | G1 |
| Example 35 | 1.59 | 0.96 | 0.16 | $2.7 \times 10^8$-$5.3 \times 10^8$ | 85 | 3.2 | A | 7.5 | G3 |
| Example 36 | 1.62 | 1.03 | 0.16 | $2.2 \times 10^8$-$4.5 \times 10^8$ | 80 | 3.5 | A | 11.8 | G2 |
| Example 37 | 1.59 | 0.99 | 0.19 | $2.5 \times 10^8$-$4.8 \times 10^8$ | 82 | 3.3 | A | 8.2 | G2 |
| Example 38 | 1.45 | 0.87 | 0.07 | $2.5 \times 10^8$-$4.8 \times 10^8$ | 82 | 3.7 | A | 6.4 | G3 |
| Example 39 | 1.60 | 1.07 | 0.23 | $2.5 \times 10^8$-$4.8 \times 10^8$ | 82 | 3.4 | A | 7.7 | G2 |
| Example 40 | 1.57 | 0.92 | 0.16 | $2.5 \times 10^8$-$4.8 \times 10^8$ | 83 | 3.2 | A | 6.2 | G3 |
| Example 41 | 1.61 | 0.98 | 0.16 | $2.5 \times 10^8$-$4.8 \times 10^8$ | 83 | 3.5 | A− | 13.4 | G2 |
| Example 42 | 1.55 | 0.95 | 0.21 | $2.5 \times 10^8$-$4.8 \times 10^8$ | 82 | 3.3 | A− | 7.1 | G3 |
| Example 43 | 1.43 | 0.91 | 0.08 | $1.5 \times 10^8$-$4.3 \times 10^8$ | 88 | 2.5 | A | 7.4 | G2 |
| Example 44 | 1.95 | 1.08 | 0.91 | $2.9 \times 10^8$-$5.2 \times 10^8$ | 80 | 3.8 | A | 9.1 | G1 |
| Example 45 | 1.87 | 1.08 | 0.14 | $1.3 \times 10^8$-$4.2 \times 10^8$ | 74 | 3.7 | A | 11.1 | G1 |

TABLE 7-2

| | Silica particles (A) | | | | Toner particles | | Toner | | | |
|---|---|---|---|---|---|---|---|---|---|---|
| | Name — | $N_{Mo}/N_{Si}$ — | Average primary particle size Da nm | Surface coverage C1 % | Name — | Average particle size of resin particles Dp nm | Dp/Da — | D1 (90) — | D50 (90) — | D1 (150) — |
| Example 46 | (A4) | 0.25 | 62 | 13 | (13) | 153 | 2.47 | 1.26 | 1.45 | 0.65 |
| Example 47 | (A4) | 0.25 | 62 | 13 | (14) | 162 | 2.61 | 1.31 | 1.47 | 0.67 |
| Example 48 | (A4) | 0.25 | 62 | 15 | (15) | 153 | 2.47 | 1.24 | 1.47 | 0.63 |
| Example 49 | (A4) | 0.25 | 62 | 14 | (16) | 153 | 2.47 | 1.22 | 1.44 | 0.58 |
| Example 50 | (A4) | 0.25 | 62 | 15 | (17) | 153 | 2.47 | 1.25 | 1.46 | 0.58 |
| Example 51 | (A4) | 0.25 | 62 | 16 | (18) | 153 | 2.47 | 1.22 | 1.39 | 0.56 |
| Example 52 | (A4) | 0.25 | 62 | 14 | (19) | 153 | 2.47 | 1.27 | 1.53 | 0.53 |
| Example 53 | (A4) | 0.25 | 62 | 13 | (20) | 153 | 2.47 | 1.31 | 1.49 | 0.57 |

TABLE 7-2-continued

| | | | | | | | | | | |
|---|---|---|---|---|---|---|---|---|---|---|
| Example 54 | (A4) | 0.25 | 62 | 13 | (21) | 153 | 2.47 | 1.35 | 1.63 | 0.91 |
| Example 55 | (A4) | 0.25 | 62 | 14 | (22) | 153 | 2.47 | 0.55 | 0.74 | 0.63 |
| Example 56 | (A4) | 0.25 | 62 | 13 | (23) | 159 | 2.56 | 1.35 | 1.65 | 0.51 |
| Example 57 | (A4) | 0.25 | 62 | 14 | (24) | 153 | 2.47 | 1.52 | 1.83 | 0.61 |

| | Toner | | | | | | Performance of toner | | |
|---|---|---|---|---|---|---|---|---|---|
| | D50 (150) — | Difference (150) — | Difference (90) — | 30-50G' Pa | Reached temperature ° C. | Viscoelastic difference — | Fluidity | Difference in glossiness | Fixability |
| Example 46 | 1.61 | 0.96 | 0.19 | $3.2 \times 10^8$-$6.1 \times 10^8$ | 88 | 3.1 | A | 7.4 | G3 |
| Example 47 | 1.52 | 0.85 | 0.16 | $4.5 \times 10^8$-$6.8 \times 10^8$ | 89 | 1.5 | A | 7.8 | G3 |
| Example 48 | 1.55 | 0.92 | 0.23 | $3.1 \times 10^8$-$4.8 \times 10^8$ | 87 | 2.2 | A | 7.4 | G3 |
| Example 49 | 1.81 | 1.23 | 0.22 | $2.5 \times 10^8$-$4.8 \times 10^8$ | 83 | 3.1 | A | 12.1 | G2 |
| Example 50 | 1.51 | 0.93 | 0.21 | $2.7 \times 10^8$-$5.0 \times 10^8$ | 90 | 2.6 | A | 8.3 | G3 |
| Example 51 | 1.59 | 1.03 | 0.17 | $8.5 \times 10^7$-$3.2 \times 10^8$ | 79 | 2.9 | A | 12.5 | G2 |
| Example 52 | 1.57 | 1.04 | 0.26 | $2.1 \times 10^8$-$4.6 \times 10^8$ | 80 | 2.6 | A | 13.5 | G2 |
| Example 53 | 1.53 | 0.96 | 0.18 | $2.4 \times 10^8$-$4.9 \times 10^8$ | 87 | 3.8 | A | 12.1 | G2 |
| Example 54 | 2.39 | 1.48 | 0.28 | $2.8 \times 10^8$-$5.2 \times 10^8$ | 78 | 2.4 | A | 12.5 | G2 |
| Example 55 | 1.53 | 0.90 | 0.19 | $2.2 \times 10^8$-$4.5 \times 10^8$ | 84 | 3.7 | A | 8.1 | G3 |
| Example 56 | 1.98 | 1.47 | 0.30 | $1.8 \times 10^8$-$4.4 \times 10^8$ | 78 | 3.2 | A | 13.6 | G1 |
| Example 57 | 1.96 | 1.35 | 0.31 | $2.9 \times 10^8$-$5.4 \times 10^8$ | 81 | 3.7 | A− | 14.2 | G1 |

TABLE 7-3

| | Silica particles (A) | | | | Toner particles | | Toner | | | |
|---|---|---|---|---|---|---|---|---|---|---|
| | Name — | $N_{Mo}/N_{Si}$ — | Average primary particle size Da nm | Surface coverage C1 % | Name — | Average particle size of resin particles Dp nm | Dp/Da — | D1 (90) — | D50 (90) — | D1 (150) — |
| Example 58 | (A4) | 0.25 | 62 | 14 | (25) | 153 | 2.47 | 1.24 | 1.64 | 0.87 |
| Example 59 | (A4) | 0.25 | 62 | 14 | (26) | 163 | 2.63 | 1.29 | 1.43 | 0.62 |
| Example 60 | (A4) | 0.25 | 62 | 14 | (27) | 162 | 2.61 | 1.42 | 1.59 | 0.75 |
| Example 61 | (A4) | 0.25 | 62 | 14 | (28) | 153 | 2.47 | 1.22 | 1.54 | 0.64 |
| Example 62 | (A4) | 0.25 | 62 | 13 | (29) | 165 | 2.66 | 1.32 | 1.56 | 0.75 |
| Example 63 | (A4) | 0.25 | 62 | 13 | (30) | 159 | 2.56 | 1.46 | 1.67 | 0.79 |
| Example 64 | (A4) | 0.25 | 62 | 13 | (C1) | 165 | 2.66 | 1.25 | 1.44 | 0.58 |
| Example 65 | (A4) | 0.25 | 62 | 12 | (C2) | 190 | 3.06 | 1.24 | 1.84 | 0.63 |
| Example 66 | (A4) | 0.25 | 62 | 14 | (C3) | 153 | 2.47 | 1.18 | 1.38 | 0.59 |
| Example 67 | (A4) | 0.25 | 62 | 13 | (C4) | 153 | 2.47 | 1.18 | 2.23 | 0.63 |
| Example 68 | (A4) | 0.25 | 62 | 13 | (C5) | 153 | 2.47 | 1.19 | 1.64 | 0.52 |
| Comparative Example 3 | (A4) | 0.25 | 62 | 14 | (C6) | — | — | 1.26 | 2.20 | 0.91 |

| | Toner | | | | | | Performance of toner | | |
|---|---|---|---|---|---|---|---|---|---|
| | D50 (150) — | Difference (150) — | Difference (90) — | 30-50G' Pa | Reached temperature ° C. | Viscoelastic difference — | Fluidity | Difference in glossiness | Fixability |
| Example 58 | 1.95 | 1.08 | 0.40 | $2.9 \times 10^8$-$5.2 \times 10^8$ | 80 | 3.8 | A− | 6.4 | G4 |
| Example 59 | 1.62 | 1.00 | 0.14 | $3.4 \times 10^8$-$6.0 \times 10^8$ | 89 | 3.2 | A | 13.8 | G2 |
| Example 60 | 1.83 | 1.08 | 0.17 | $1.3 \times 10^8$-$4.3 \times 10^8$ | 75 | 3.6 | A− | 13.6 | G1 |

TABLE 7-3-continued

| | | | | | | | | | |
|---|---|---|---|---|---|---|---|---|---|
| Example 61 | 1.67 | 1.03 | 0.32 | $2.9 \times 10^8$-$5.1 \times 10^8$ | 81 | 3.4 | A | 11.6 | G2 |
| Example 62 | 1.89 | 1.14 | 0.24 | $2.7 \times 10^8$-$5.0 \times 10^8$ | 82 | 3.2 | A | 9.5 | G2 |
| Example 63 | 2.01 | 1.22 | 0.21 | $2.7 \times 10^8$-$5.1 \times 10^8$ | 80 | 3.0 | A | 11.1 | G2 |
| Example 64 | 2.45 | 1.67 | 0.19 | $2.5 \times 10^8$-$7.6 \times 10^8$ | 90 | 2.9 | B | 21.9 | G4 |
| Example 65 | 2.25 | 1.62 | 0.60 | $1.2 \times 10^8$-$3.6 \times 10^8$ | 72 | 2.5 | B | 23.4 | G2 |
| Example 66 | 2.14 | 1.55 | 0.20 | $2.6 \times 10^8$-$4.7 \times 10^8$ | 82 | 3.4 | B | 25.1 | G3 |
| Example 67 | 2.27 | 1.64 | 1.05 | $2.9 \times 10^8$-$5.1 \times 10^8$ | 83 | 3.1 | B | 23.9 | G2 |
| Example 68 | 2.21 | 1.69 | 0.45 | $2.1 \times 10^8$-$4.3 \times 10^8$ | 83 | 3.2 | B | 24.2 | G4 |
| Comparative Example 3 | 2.25 | 1.34 | 0.94 | $3.0 \times 10^8$-$5.3 \times 10^8$ | 72 | — | E | 25.1 | G2 |

Abbreviations in Tables 7-1 to 7-3 have the following meanings.

Difference (150): value of D50 (150)–D1 (150) of toner

Difference (90): value of D50 (90)–D1 (90) of toner 30-50G': storage elastic modulus G' of toner in a range of 30° C. or higher and 50° C. or lower Reached temperature: temperature at which the storage elastic modulus G' of toner reaches less than $1\times10^5$ Pa Viscoelastic difference: value of log G'(t90-150)–log G'(r90-150)

(((1)))

An electrostatic charge image developing toner comprising:

toner particles that contain a binder resin and resin particles; and silica particles (A) that are externally added to the toner particles and contain a nitrogen element-containing compound containing a molybdenum element, in which a ratio $N_{Mo}/N_{Si}$ of Net intensity $N_{Mo}$ of the molybdenum element measured by X-ray fluorescence analysis to Net intensity $N_{Si}$ of a silicon element measured by X-ray fluorescence analysis is 0.035 or more and 0.45 or less.

(((2)))

The electrostatic charge image developing toner according to (((1))), wherein the ratio $N_{Mo}/N_{Si}$ of the silica particles (A) is 0.05 or more and 0.30 or less.

(((3)))

The electrostatic charge image developing toner according to (((1))) or (((2))), wherein a ratio Dp/Da of an average particle size Dp of the resin particles to an average primary particle size Da of the silica particles (A) is 0.75 or more and 15 or less.

(((4)))

The electrostatic charge image developing toner according to any one of (((1))) to (((3))), wherein the resin particles are crosslinked vinyl-based resin particles.

(((5)))

The electrostatic charge image developing toner according to any one of (((1))) to (((4))), wherein the resin particles are styrene (meth)acrylic resin particles.

(((6)))

The electrostatic charge image developing toner according to any one of (((1))) to (((5))), further comprising:

silica particles (B) other than the silica particles (A), that are externally added to the toner particles.

(((7)))

The electrostatic charge image developing toner according to any one of (((1))) to (((6))), further comprising:

strontium titanate particles externally added to the toner particles.

(((8)))

The electrostatic charge image developing toner according to (((7))), wherein an average primary particle size of the strontium titanate particles is 25 nm or more and 80 nm or less.

(((9)))

The electrostatic charge image developing toner according to (((7))) or (((8))), wherein a mass-based ratio M2/M1 of a content M2 of the strontium titanate particles to a content M1 of the silica particles (A) is 0.5 or more and 1.5 or less.

(((10)))

The electrostatic charge image developing toner according to any one of (((1))) to (((9))), wherein a surface coverage C1 by the silica particles (A) in the toner particles is 10% or more and 60% or less.

(((11)))

The electrostatic charge image developing toner according to any one of (((1))) to (((10))), further comprising:

inorganic particles other than the silica particles (A), that are externally added to the toner particles, wherein, in the toner particles, a ratio C 1/C2 of a surface coverage C1 by the silica particles (A) to a surface coverage C2 by inorganic particles having a primary particle size of 80 nm or more and 150 nm or less among the inorganic particles is 0.2 or more and 1.5 or less.

(((12)))

The electrostatic charge image developing toner according to any one of (((1))) to (((11))), wherein an amount of a liberated oil contained in the electrostatic charge image developing toner is 0.01% by mass or more and 0.1% by mass or less with respect to an overall amount of the electrostatic charge image developing toner.

(((13)))

The electrostatic charge image developing toner according to any one of (((1))) to (((12))), wherein the nitrogen element-containing compound containing a molybdenum element is at least one kind of compound selected from the group consisting of a quaternary ammonium salt containing a molybdenum element and a mixture of a quaternary ammonium salt and a metal oxide containing a molybdenum element.

(((14)))

The electrostatic charge image developing toner according to any one of (((1))) to (((13))), wherein the silica particles (A) are silica particles having a coating structure that consists of a reaction product of a silane coupling agent and the nitrogen element-containing compound containing a molybdenum element that has adhered to the coating structure.

(((15)))

The electrostatic charge image developing toner according to (((14))), wherein the silane coupling agent includes alkyltrialkoxysilane.

(((16)))

The electrostatic charge image developing toner according to any one of (((1))) to (((15))), wherein in a case where a loss tangent tan δ of the electrostatic charge image developing toner determined by dynamic viscoelasticity measurement at a temperature of 90° C. and a strain of 1% is represented by D1 (90), a loss tangent tan δ of the electrostatic charge image developing toner determined by dynamic viscoelasticity measurement at a temperature of 90° C. and a strain of 50% is represented by D50 (90), a loss tangent tan δ of the electrostatic charge image developing toner determined by dynamic viscoelasticity measurement at a temperature of 150° C. and a strain of 1% is represented by D1 (150), and a loss tangent tan δ of the electrostatic charge image developing toner determined by dynamic viscoelasticity measurement at a temperature of 150° C. and a strain of 50% is represented by D50 (150), each of D1 (90), D50 (90), D1 (150), and D50 (150) is 0.5 or more and 2.5 or less, a value of D50 (150)−D1 (150) is less than 1.5, and a value of D50 (90)−D1 (90) is less than 1.0.

(((17)))

An electrostatic charge image developer comprising:

the electrostatic charge image developing toner according to any one of (((1))) to (((16))).

(((18)))

A toner cartridge comprising:

a container that contains the electrostatic charge image developing toner according to any one of (((1))) to (((16))), wherein the toner cartridge is detachable from an image forming apparatus.

(((19)))

A process cartridge comprising:

a developing unit that contains the electrostatic charge image developer according to (((17))) and develops an electrostatic charge image formed on a surface of an image holder as a toner image by using the electrostatic charge image developer, wherein the process cartridge is detachable from an image forming apparatus.

(((20)))

An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according (((17))) and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

(((21)))

An image forming method comprising:

charging a surface of an image holder;

forming an electrostatic charge image on the charged surface of the image holder;

developing the electrostatic charge image formed on the surface of the image holder as a toner image by using the electrostatic charge image developer according to (((17)));

transferring the toner image formed on the surface of the image holder to a surface of a recording medium; and fixing the toner image transferred to the surface of the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

toner particles that contain a binder resin and resin particles, wherein the binder resin is a polyester resin, and the resin particles are crosslinked vinyl-based resin particles; and silica particles (A) that are externally added to the toner particles and contain a nitrogen element-containing compound containing a molybdenum element, in which a ratio $N_{Mo}/N_{Si}$ of Net intensity $N_{Mo}$ of the molybdenum element measured by X-ray fluorescence analysis to Net intensity $N_{Si}$ of a silicon element measured by X-ray fluorescence analysis is 0.035 or more and 0.45 or less.

2. The electrostatic charge image developing toner according to claim 1, wherein the ratio $N_{Mo}/N_{Si}$ of the silica particles (A) is 0.05 or more and 0.30 or less.

3. The electrostatic charge image developing toner according to claim 1, wherein a ratio Dp/Da of an average particle size Dp of the resin particles to an average primary particle size Da of the silica particles (A) is 0.75 or more and 15 or less.

4. The electrostatic charge image developing toner according to claim 1, wherein the crosslinked vinyl-based resin particles are styrene (meth)acrylic resin particles.

5. The electrostatic charge image developing toner according to claim 1, further comprising:

silica particles (B) other than the silica particles (A), that are externally added to the toner particles.

6. The electrostatic charge image developing toner according to claim 1, further comprising:

strontium titanate particles externally added to the toner particles.

7. The electrostatic charge image developing toner according to claim 6, wherein an average primary particle size of the strontium titanate particles is 25 nm or more and 80 nm or less.

8. The electrostatic charge image developing toner according to claim 6, wherein a mass-based ratio M2/M1 of a content M2 of the strontium titanate particles to a content M1 of the silica particles (A) is 0.5 or more and 1.5 or less.

9. The electrostatic charge image developing toner according to claim 1, wherein a surface coverage C1 by the silica particles (A) in the toner particles is 10% or more and 60% or less.

10. The electrostatic charge image developing toner according to claim 1, further comprising:

inorganic particles other than the silica particles (A), that are externally added to the toner particles, wherein, in the toner particles, a ratio C1/C2 of a surface coverage C1 by the silica particles (A) to a surface coverage C2 by inorganic particles having a primary particle size of 80 nm or more and 150 nm or less among the inorganic particles is 0.2 or more and 1.5 or less.

11. The electrostatic charge image developing toner according to claim 1, wherein an amount of a liberated oil contained in the electrostatic charge image developing toner is 0.01% by mass or more and 0.1% by mass or less with respect to an overall amount of the electrostatic charge image developing toner.

12. The electrostatic charge image developing toner according to claim 1, wherein the nitrogen element-containing compound containing a molybdenum element is at least one kind of compound selected from the group consisting of a quaternary ammonium salt containing a molybdenum element and a mixture of a quaternary ammonium salt and a metal oxide containing a molybdenum element.

13. The electrostatic charge image developing toner according to claim 1, wherein the silica particles (A) are silica particles having a coating structure that consists of a reaction product of a silane coupling agent and the nitrogen element-containing compound containing a molybdenum element that has adhered to the coating structure.

14. The electrostatic charge image developing toner according to claim 1, wherein in a case where a loss tangent tan δ of the electrostatic charge image developing toner determined by dynamic viscoelasticity measurement at a temperature of 90° C. and a strain of 1% is represented by D1 (90), a loss tangent tan δ of the electrostatic charge image developing toner determined by dynamic viscoelasticity measurement at a temperature of 90° C. and a strain of 50% is represented by D50 (90), a loss tangent tan δ of the electrostatic charge image developing toner determined by dynamic viscoelasticity measurement at a temperature of 150° C. and a strain of 1% is represented by D1 (150), and a loss tangent tan δ of the electrostatic charge image developing toner determined by dynamic viscoelasticity measurement at a temperature of 150° C. and a strain of 50% is represented by D50 (150), each of D1 (90), D50 (90), D1 (150), and D50 (150) is 0.5 or more and 2.5 or less, a value of D50 (150)−D1 (150) is less than 1.5, and a value of D50 (90)−D1 (90) is less than 1.0.

15. An electrostatic charge image developer comprising:

the electrostatic charge image developing toner according to claim 1.

16. An image forming method comprising:

charging a surface of an image holder;

forming an electrostatic charge image on the charged surface of the image holder;

developing the electrostatic charge image formed on the surface of the image holder as a toner image by using the electrostatic charge image developer according to claim 15;

transferring the toner image formed on the surface of the image holder to a surface of a recording medium; and fixing the toner image transferred to the surface of the recording medium.

* * * * *